(12) United States Patent
Tsuruta et al.

(10) Patent No.: US 8,308,227 B2
(45) Date of Patent: Nov. 13, 2012

(54) STRUCTURE FOR SIDE PORTION OF VEHICLE BODY

(75) Inventors: Takayuki Tsuruta, Susono (JP); Naoya Kosaka, Susono (JP); Takashi Nakano, Odawara (JP)

(73) Assignee: Toyota Jidoshi Kabushiki Kaisha, Toyota-shi (JP)

( * ) Notice: Subject to any disclaimer, the term of this patent is extended or adjusted under 35 U.S.C. 154(b) by 148 days.

(21) Appl. No.: 12/678,759

(22) PCT Filed: Sep. 17, 2008

(86) PCT No.: PCT/JP2008/066765
§ 371 (c)(1),
(2), (4) Date: Mar. 18, 2010

(87) PCT Pub. No.: WO2009/038088
PCT Pub. Date: Mar. 26, 2009

(65) Prior Publication Data
US 2010/0207426 A1 Aug. 19, 2010

(30) Foreign Application Priority Data

Sep. 19, 2007 (JP) ................................. 2007-242903
Sep. 27, 2007 (JP) ................................. 2007-252162

(51) Int. Cl.
*B62D 25/20* (2006.01)
(52) U.S. Cl. ..................................................... 296/209
(58) Field of Classification Search ................... 296/209
See application file for complete search history.

(56) References Cited

U.S. PATENT DOCUMENTS

| 4,493,506 | A | * | 1/1985 | Alexander | 296/209 |
|---|---|---|---|---|---|
| 5,613,727 | A | * | 3/1997 | Yamazaki | 296/203.03 |
| 5,782,525 | A | * | 7/1998 | Honma et al. | 296/187.12 |
| 5,839,777 | A | | 11/1998 | Vlahovic | |
| 5,921,618 | A | * | 7/1999 | Mori et al. | 296/187.12 |
| 6,053,564 | A | * | 4/2000 | Kamata et al. | 296/187.09 |
| 6,247,287 | B1 | | 6/2001 | Takabatake | |
| 6,409,257 | B1 | * | 6/2002 | Takashina et al. | 296/209 |
| 6,709,047 | B2 | | 3/2004 | Burge | |
| 7,753,437 | B2 | * | 7/2010 | Klimek | 296/187.08 |
| 2003/0184126 | A1 | * | 10/2003 | Yamazaki et al. | 296/209 |
| 2009/0146457 | A1 | | 6/2009 | Kanagai et al. | |

FOREIGN PATENT DOCUMENTS

| DE | 41 41 689 A1 | 6/1993 |
|---|---|---|
| DE | 195 19 353 A1 | 11/1996 |
| DE | 198 29 832 A1 | 1/2000 |
| DE | 10 2007 032 2 | 1/2009 |
| JP | 63 119480 | 8/1988 |
| JP | 3 68177 | 7/1991 |
| JP | 10 7021 | 1/1998 |

(Continued)

*Primary Examiner* — Dennis Pedder
(74) *Attorney, Agent, or Firm* — Oblon, Spivak, McClelland, Maier & Neustadt, L.L.P.

(57) ABSTRACT

A side part structure of a vehicle body capable of reliably dispersing a collision load applied from the side of a vehicle is disclosed. A bulkhead arranged in a rocker has an outer bulkhead joined to an outer rocker and an inner bulkhead joined to an inner rocker. Facing walls of the outer bulkhead and the inner bulkhead are provided with proximity portions which are engageable with each other, which allow a collision load at a side collision to be reliably transmitted from the outer rocker to the inner rocker via the proximity portions formed on the mutually facing walls, thereby reliably dispersing the collision load from the side of the vehicle.

5 Claims, 33 Drawing Sheets

FOREIGN PATENT DOCUMENTS

| | | |
|---|---|---|
| JP | 11 235963 | 8/1999 |
| JP | 2001 321845 | 11/2001 |
| JP | 2003 252237 | 9/2003 |
| JP | 2004 51095 | 2/2004 |
| JP | 2004 182145 | 7/2004 |
| JP | 2006 218987 | 8/2006 |
| JP | 2006 264476 | 10/2006 |
| JP | 2007 210367 | 8/2007 |
| JP | 2007 314131 | 12/2007 |

* cited by examiner

STRUCTURE FOR SIDE PORTION OF VEHICLE BODY

TECHNICAL FIELD

The present invention relates to a side part structure of a vehicle body.

BACKGROUND ART

A structure for dispersing impact at a collision is conventionally adopted in a side part structure of a vehicle body in various vehicles, such as a passenger car. As this kind of side part structure of a vehicle body, there is known a combination structure of a center pillar in which the shape of a bulkhead is formed by an outer center pillar, and an inner panel of a side roof rail is sandwiched and combined in a sandwiched fashion by the outer center pillar and an inner center pillar (for example, refer to Patent Citation 1). Patent Citation 1: Japanese Unexamined Utility Model Registration Application Publication No. 63-119480.

DISCLOSURE OF THE INVENTION

Technical Problem

Here, in recent years, there has been a desire to disperse a collision load. Also, it is required to disperse a collision load from the side of a vehicle more efficiently as compared to the conventional technique described in the above Patent Document 1. In the conventional technique described in Patent Document 1, for example, in a case where a load caused by a side collision is input, a horizontal load, and a vertical load caused by the tension accompanying the bending of the center pillar are input to the outer rocker.

Since a bulkhead arranged in the rocker is joined to only one of the outer rocker and the inner rocker, there is a possibility that the load transmission between the outer rocker and the inner rocker may be blocked, and a reaction force against a side collision load cannot be sufficiently obtained.

The invention was made in order to solve such problems, and the object of the invention is to provide a side part structure of a vehicle body capable of reliably dispersing a collision load applied from the side of a vehicle.

Technical Solution

The side part structure of a vehicle body according to the invention is a side part structure of a vehicle body including a rocker that is a hollow member having an outer rocker and an inner rocker which are arranged at a side part of a vehicle body and extend in the anteroposterior direction of the vehicle body. The side part structure includes a first load transmission member joined to one of the outer rocker and the inner rocker. The first load transmission member, and the other of the outer rocker and the inner rocker or a second load transmission member joined to the other rocker member are formed with proximity portions which are engageable with each other.

This side part structure of a vehicle body includes a first load transmission member joined to one of the outer rocker and the inner rocker, and the first load transmission member, and the other of the outer rocker and the inner rocker or a second load transmission member joined to the other rocker member are formed with proximity portions which are engageable with each other. Therefore, a collision load at a side collision is reliably transmitted to the inner rocker from the outer rocker via the proximity portions formed in the first load transmission member, and the other of the outer rocker and the inner rocker or a second load transmission member joined to the other rocker member. As a result, a collision load from the side of the vehicle can be reliably dispersed.

Preferably, the first load transmission member includes a first facing wall formed with the proximity portion and facing the second load transmission member, and a first continuous facing wall continuous with the first facing wall and facing the second load transmission member; the second load transmission member includes a second facing wall formed with the proximity portion and facing the first load transmission member, and a second continuous facing wall continuous with the second facing wall and facing the first load transmission member; the proximity portion has a protruding portion formed on one facing wall of the first facing wall and the second facing wall and protruding toward the other facing wall; and when the first facing wall and the second facing wall are brought into contact with each other at other portions while a continuous portion between the first facing wall and the first continuous facing wall, and a continuous portion between the second facing wall and the second continuous facing wall are separated from each other, the protruding portion formed on the one facing wall is locked to the other facing wall.

In such a side part structure of a vehicle body, the first load transmission member includes a first facing wall formed with the proximity portion, and a first continuous facing wall, the second load transmission member includes a second facing wall formed with the proximity portion, and a second continuous facing wall, and the proximity portion has a protruding portion formed on one facing wall of the first facing wall and the second facing wall and protruding toward the other facing wall. Here, when the first facing wall and the second facing wall are brought into contact with each other at other portions while a continuous portion between the first facing wall and the first continuous facing wall, and a continuous portion between the second facing wall and the second continuous facing wall are separated from each other, the protruding portion formed on the one facing wall is locked to the other facing wall. For this reason, the movement of the lower side of the second load transmission member to be separated outward in the vehicle width direction is suppressed, and the upward movement of the whole second load transmission member is suppressed.

Preferably, the first load transmission member includes a first facing wall formed with the proximity portion and facing the second load transmission member; the second load transmission member includes a second facing wall formed with the proximity portion and facing the first load transmission member; the proximity portion has a protruding portion formed on one facing wall of the first facing wall and the second facing wall and protruding toward the other facing wall; and when the other end of the first facing wall and the other end of the second facing wall are brought into contact with each other while one end of the first facing wall and one end of the second facing wall are separated from each other, the protruding portion formed on one facing wall is locked to the other facing wall.

In such a side part structure of a vehicle body, the first load transmission member includes a first facing wall formed with the proximity portion, the second load transmission member includes a second facing wall formed with the proximity portion, and the proximity portion has a protruding portion formed on one facing wall of the first facing wall and the second facing wall and protruding toward the other facing wall. Here, when the other end of the first facing wall and the other end of the second facing wall are brought into contact with each other while one end of the first facing wall and one end of the second facing wall are separated from each other, the protruding portion formed on one facing wall is locked to the other facing wall. For this reason, the movement of the lower side of the outer rocker outward in the vehicle width direction is suppressed, and the upward movement of the whole second load transmission member is suppressed.

The side part structure of a vehicle body according to the invention is a side part structure of a vehicle body including a rocker that is a hollow member having an outer rocker and an inner rocker which are arranged at a side part of a vehicle body and extend in the anteroposterior direction of the vehicle body. The side part structure includes a first load transmission member joined to one of the outer rocker and the inner rocker. The first load transmission member, and the other of the outer rocker and the inner rocker or a second load transmission member joined to the other rocker member are formed with proximity portions capable of suppressing the movement such that a lower end of the outer rocker and a lower end of the inner rocker tend to separate from each other.

This side part structure of a vehicle body includes a first load transmission member joined to one of the outer rocker and the inner rocker, and the first load transmission member, and the other of the outer rocker and the inner rocker or a second load transmission member joined to the other rocker member are formed with proximity portions capable of suppressing the movement such that a lower end of the outer rocker and a lower end of the inner rocker tend to separate from each other. Therefore, a collision load at a side collision is reliably transmitted to the inner rocker from the outer rocker via the proximity portions formed in the first load transmission member, and the other of the outer rocker and the inner rocker or a second load transmission member joined to the other rocker member. As a result, a collision load from the side of the vehicle can be reliably dispersed.

The side part structure of a vehicle body according to the invention is a side part structure of a vehicle body including a rocker that is a hollow member having an outer rocker and an inner rocker which are arranged at a side part of a vehicle body and extend in the anteroposterior direction of the vehicle body. The side part structure includes a first load transmission member joined to one of the outer rocker and the inner rocker. The first load transmission member, and the other of the outer rocker and the inner rocker or a second load transmission member joined to the other rocker member are formed with proximity portions capable of suppressing the movement such that a lower end of the outer rocker and a lower end of the inner rocker tend to separate from each other, by being brought into contact with each other.

This side part structure of a vehicle body includes a first load transmission member joined to one of the outer rocker and the inner rocker, and the first load transmission member, and the other of the outer rocker and the inner rocker or a second load transmission member joined to the other rocker member are formed with proximity portions capable of suppressing the movement such that a lower end of the outer rocker and a lower end of the inner rocker tend to separate from each other, by being brought into contact with each other. Therefore, a collision load at a side collision is reliably transmitted to the inner rocker from the outer rocker via the proximity portions formed in the first load transmission member, and the other of the outer rocker and the inner rocker or a second load transmission member joined to the other rocker member. As a result, a collision load from the side of the vehicle can be reliably dispersed.

The side part structure of a vehicle body according to the invention is a side part structure of a vehicle body including a rocker that is a hollow member having an outer rocker and an inner rocker which are arranged at a side part of a vehicle body and extend in the anteroposterior direction of the vehicle body. The side part structure includes a first load transmission member joined to one of the outer rocker and the inner rocker. The first load transmission member, and the other of the outer rocker and the inner rocker or a second load transmission member joined to the other rocker member are formed with proximity portions capable of suppressing the movement such that a lower end of the outer rocker and a lower end of the inner rocker tend to separate from each other, by being locked to each other.

This side part structure of a vehicle body includes a first load transmission member joined to one of the outer rocker and the inner rocker, and the first load transmission member, and the other of the outer rocker and the inner rocker or a second load transmission member joined to the other rocker member are formed with proximity portions capable of suppressing the movement such that a lower end of the outer rocker and a lower end of the inner rocker tend to separate from each other, by being locked to each other. Therefore, a collision load at a side collision is reliably transmitted to the inner rocker from the outer rocker via the proximity portions formed in the first load transmission member, and the other of the outer rocker and the inner rocker or a second load transmission member joined to the other rocker member. As a result, a collision load from the side of the vehicle can be reliably dispersed.

The side part structure of a vehicle body according to the invention is a side part structure of a vehicle body including a rocker that is a hollow member having an outer rocker and an inner rocker which are arranged at a side part of a vehicle body and extend in the anteroposterior direction of the vehicle body. The load transmission member arranged in the rocker has a first load transmission member joined to the outer rocker, and a second load transmission member arranged so as to face the first load transmission member and joined to the inner rocker; and a facing wall of the first load transmission member which faces the second load transmission member and a facing wall of the second load transmission member which faces the first load transmission member are formed with proximity portions which are engageable with each other.

According to the side part structure of a vehicle body of the invention, since the load transmission member arranged in the rocker has a first load transmission member joined to the outer rocker, and a second load transmission member joined to the inner rocker; and facing walls of the first load transmission member and the second load transmission member are formed with proximity portions which are engageable with each other, a collision load at a side collision is reliably transmitted to the inner rocker from the outer rocker via the proximity portions formed in the mutually facing walls. As a result, a collision load from the side of the vehicle can be reliably dispersed.

Here, a preferable construction which exhibits the above effects includes a construction in which the proximity portions which are engageable with each other have a protruding portion formed on one facing wall of the facing wall of the first load transmission member and the facing wall of the second load transmission member, and protruding toward the other facing wall. As a result, the protruding portion formed on one facing wall and protruding toward the other facing wall is engaged with the other facing wall so as to thrust into the other facing wall at a side collision, and a collision load is reliably transmitted to the inner rocker from the outer rocker via this protruding portion.

Preferably, the proximity portions which are engageable with each other have an engaging hole or an engaging concave portion which is formed on the other facing wall and engages with the protruding portion at a side collision. As a result, the engaging hole or the engaging concave portion can be firmly engaged with the protruding portion, and a collision load is more reliably transmitted to the inner rocker from the outer rocker.

Preferably, the proximity portions which are engageable with each other are formed at positions separated from the center of the load transmission member in the vertical direction. As a result, the deformation caused at a side collision such that the load transmission member on the outside of a vehicle is raised up or the deformation such that the first load transmission member is separated toward the outside of a vehicle can be suppressed effectively, and a collision load is more reliably transmitted to the inner rocker from the outer rocker.

The side part structure of a vehicle body according to the invention is a side part structure of a vehicle body including a rocker that is a hollow member having an outer rocker and an inner rocker which are arranged at a side part of a vehicle body and extend in the anteroposterior direction of the vehicle body. The side part structure includes a load transmission member arranged in the rocker and joined to a first rocker that is any one of the outer rocker and the inner rocker. A facing wall of a second rocker that is the other of the outer rocker and the inner rocker, and a facing wall of the load transmission member which faces the second rocker are formed with proximity portions which are engageable with each other.

In such a side part structure of a vehicle body, the load transmission member arranged in the rocker is joined to a first rocker member that is one of the outer rocker and the inner rocker. Since a facing wall of a second rocker member that is the other of the outer rocker and the inner rocker, which faces the load transmission member, and a facing wall of the load transmission member, which faces the second rocker member, are formed with proximity portions which are engageable with each other, a collision load at a side collision is reliably transmitted to the inner rocker from the outer rocker via the proximity portions formed in the mutually facing walls. As a result, a collision load from the side of the vehicle can be reliably dispersed.

For example, in a case where the inner rocker is the first rocker member and the outer rocker is the second rocker member, the load transmission member is joined to the inner rocker. Since the facing wall of the load transmission member which faces the outer rocker and the facing wall of the outer rocker which faces the load transmission member are formed with proximity portions which are engageable with each other, a collision load at a side collision is reliably transmitted to the load transmission member from the outer rocker via the proximity portions formed in the mutually facing walls. As a result, a collision load from the side of the vehicle can be reliably dispersed.

Additionally, in a case where the outer rocker is the first rocker member and the inner rocker is the second rocker member, the load transmission member is joined to the outer rocker. Since the facing wall of the load transmission member which faces the inner rocker and the facing wall of the inner rocker which faces the load transmission member are formed with proximity portions which are engageable with each other, a collision load at a side collision is reliably transmitted to the inner rocker from the load transmission member via the proximity portions formed in the mutually facing walls. As a result, a collision load from the side of the vehicle can be reliably dispersed.

Here, the proximity portions which are engageable with each other may be engaged with each other by a load caused by a side collision. As a result, the facing walls approach each other due to a load caused by a side collision and the proximity portions engage with each other, whereby a collision load is reliably transmitted to the inner rocker from the outer rocker. As a result, a collision load from the side of the vehicle can be reliably dispersed.

Additionally, the proximity portions which are engageable with each other have a protruding portion formed on one facing wall of the facing wall of the load transmission member and the facing wall of the second rocker member, and protruding toward the other facing wall. As a result, since the protruding portion formed on one facing wall and protruding toward the other facing wall is engaged with the other facing wall so as to thrust into the other facing wall, a collision load is reliably transmitted to the inner rocker from the outer rocker via this protruding portion.

Preferably, the proximity portions which are engageable with each other have an engaging hole or an engaging concave portion which is formed on the other facing wall and engages with the protruding portion at a side collision. As a result, the engaging hole or the engaging concave portion can be firmly engaged with the protruding portion, and a collision load is more reliably transmitted to the inner rocker from the outer rocker.

Preferably, the proximity portions which are engageable with each other are formed at positions separated from the center of the load transmission member in the vertical direction. As a result, the deformation caused at a side collision such that the load transmission member on the outside of a vehicle is raised up or the deformation such that the first load transmission member is separated toward the outside of a vehicle can be suppressed effectively, and a collision load is more reliably transmitted to the inner rocker from the outer rocker.

Advantageous Effects

According to the side part structure of a vehicle body of the invention, since the proximity portions which are engageable with each other are formed in the facing walls of the first load transmission member and the second load transmission member or in the facing walls of the load transmission member and the second rocker member, a collision load at a side collision is reliably transmitted to the inner rocker from the outer rocker via the proximity portions formed in the mutually facing walls. As a result, a collision load from the side of the vehicle can be reliably dispersed.

Figure 1:
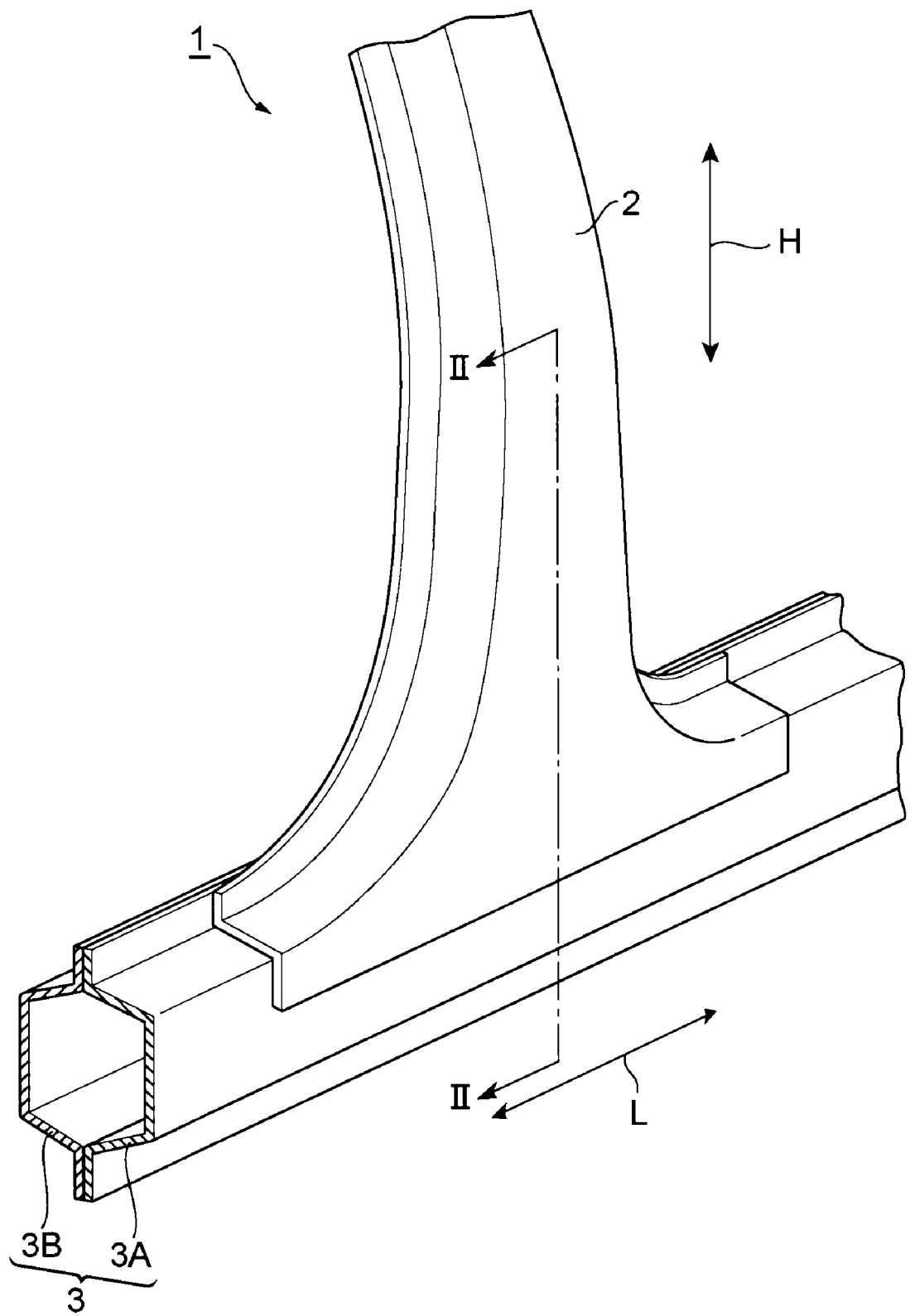
FIG. 1 is a perspective view showing a side part structure of a vehicle body related to an embodiment of the invention.

EXPLANATION OF REFERENCE 1, 11, 21, 31, 41, 51, 61, 71, 81, 91, 101, 111, 121, 131, 141, 151, 161: SIDE PART STRUCTURE OF VEHICLE BODY
2, 102: CENTER PILLAR
3, 103, 113, 123, 133, 143, 153, 163: ROCKER
3A: OUTER ROCKER
3B: INNER ROCKER
4, 104: FLOOR CROSS MEMBER
5, 15, 25, 35, 45, 55, 65, 75, 85, 95, 105, 115, 125, 135, 145, 155, 165: BULKHEAD
5A, 15A, 25A, 35A, 45A, 55A, 65A, 75A, 85A, 95A: OUTER BULKHEAD
5B, 15B, 25B, 35B, 45B, 55B, 65B, 75B, 85B, 95B: INNER BULKHEAD
6A, 16A, 26A, 36A, 46A, 56A, 66A, 76A, 86A, 96A: Facing Wall of Outer Bulkhead
6B, 16B, 26B, 36B, 46B, 56B, 66B, 76B, 86B, 96B: FACING WALL OF INNER BULKHEAD
7, 17, 27, 37, 47, 57, 67, 77, 87, 97, 107, 117, 127, 137, 147, 157, 167: ENGAGEABLE PROXIMITY PORTION
7A, 17B, 27A, 47A, 57A, 67B, 77B, 87B, 97A: CONVEX PORTION
7B, 17A, 27B, 47B, 97B: CONCAVE PORTION 57B, 67A, 77A, 87A, 117B, 127A, 147A, 157B, 167A: OPENING PORTION (ENGAGING HOLE)
103A, 113A, 123A, 163A: OUTER ROCKER (SECOND ROCKER MEMBER)
103B, 163B: INNER ROCKER (FIRST ROCKER MEMBER)
106A, 116A, 126A, 166A: FACING WALL OF OUTER ROCKER (FACING WALL OF SECOND ROCKER MEMBER WHICH FACES BULKHEAD)
106B, 116B, 126B, 136A, 146A, 156A, 166B: FACING WALL OF BULKHEAD (FACING WALL OF BULKHEAD WHICH FACES SECOND ROCKER MEMBER)
107A, 117A, 127B, 137B, 147B, 157A, 167B: CONVEX PORTION (PROTRUDING PORTION)
107B, 137A: CONCAVE PORTION (ENGAGING CONCAVE PORTION)
133A: OUTER ROCKER (FIRST ROCKER MEMBER)
133B, 143B, 153B: INNER ROCKER (SECOND ROCKER MEMBER)
136B, 146B, 156B: FACING WALL OF INNER ROCKER (FACING WALL OF SECOND ROCKER MEMBER WHICH FACES BULKHEAD)

BEST MODE FOR CARRYING OUT THE INVENTION

Preferred embodiments of a side part structure of a vehicle body of the invention will now be described referring to the drawings. In addition, in the description of the drawings, the same reference numerals will be given to the same or equivalent elements, and duplicate description will be omitted. Additionally, in the present specification, a forward direction when a vehicle moves straight forward is defined as the "front", and terms indicating directions, such as "front", "rear", "left", and "right" are used.

(First Embodiment)

First, a side part structure of a vehicle body related to a first embodiment will be described. FIG. 1 is a perspective view showing the side part structure of a vehicle body related to the embodiment of the invention, FIG. 2 is a sectional view showing the side part structure of a vehicle body related to the first embodiment of the invention, and FIG. 3 is a schematic perspective view showing the side part structure of a vehicle body related to the first embodiment of the invention.

Figure 2:
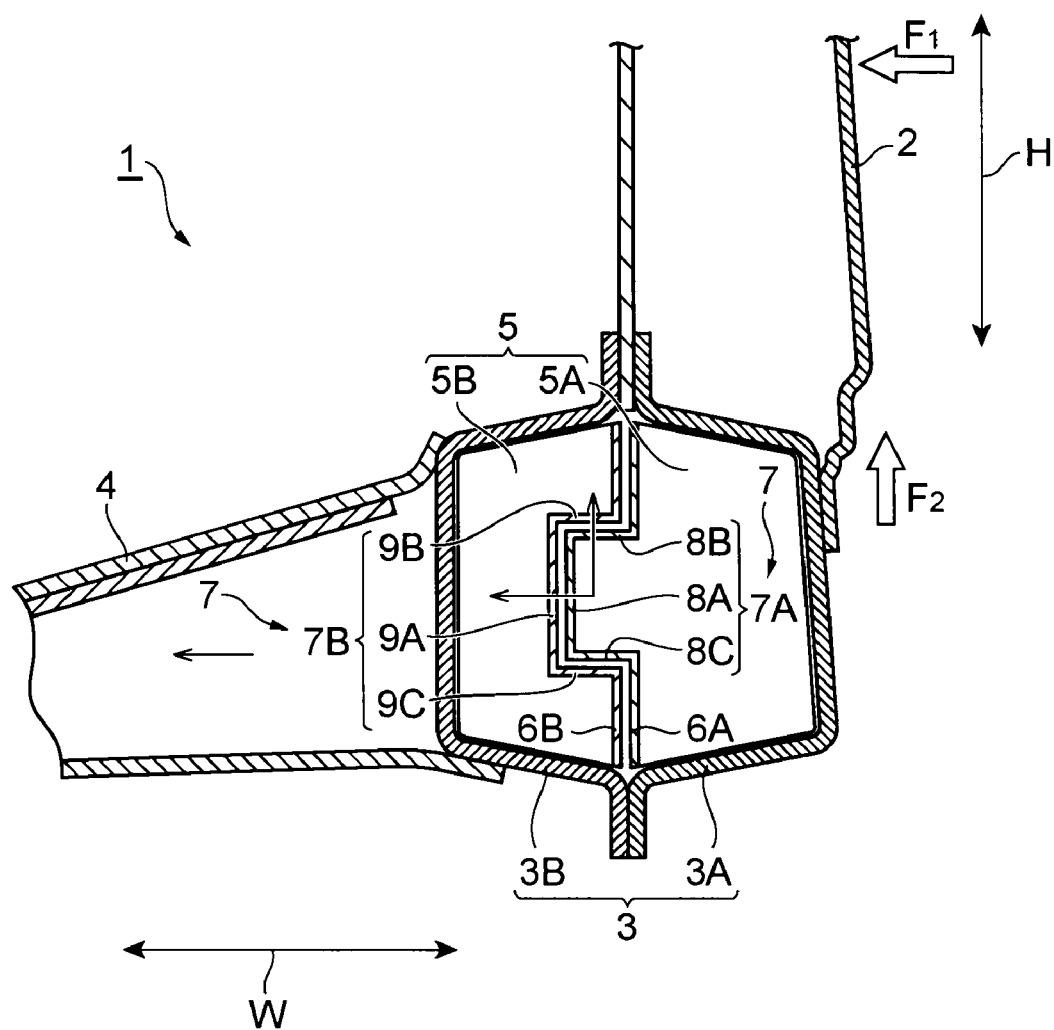
FIG. 2 is a sectional view showing a side part structure of a vehicle body related to a first embodiment of the invention.
Figure 3:
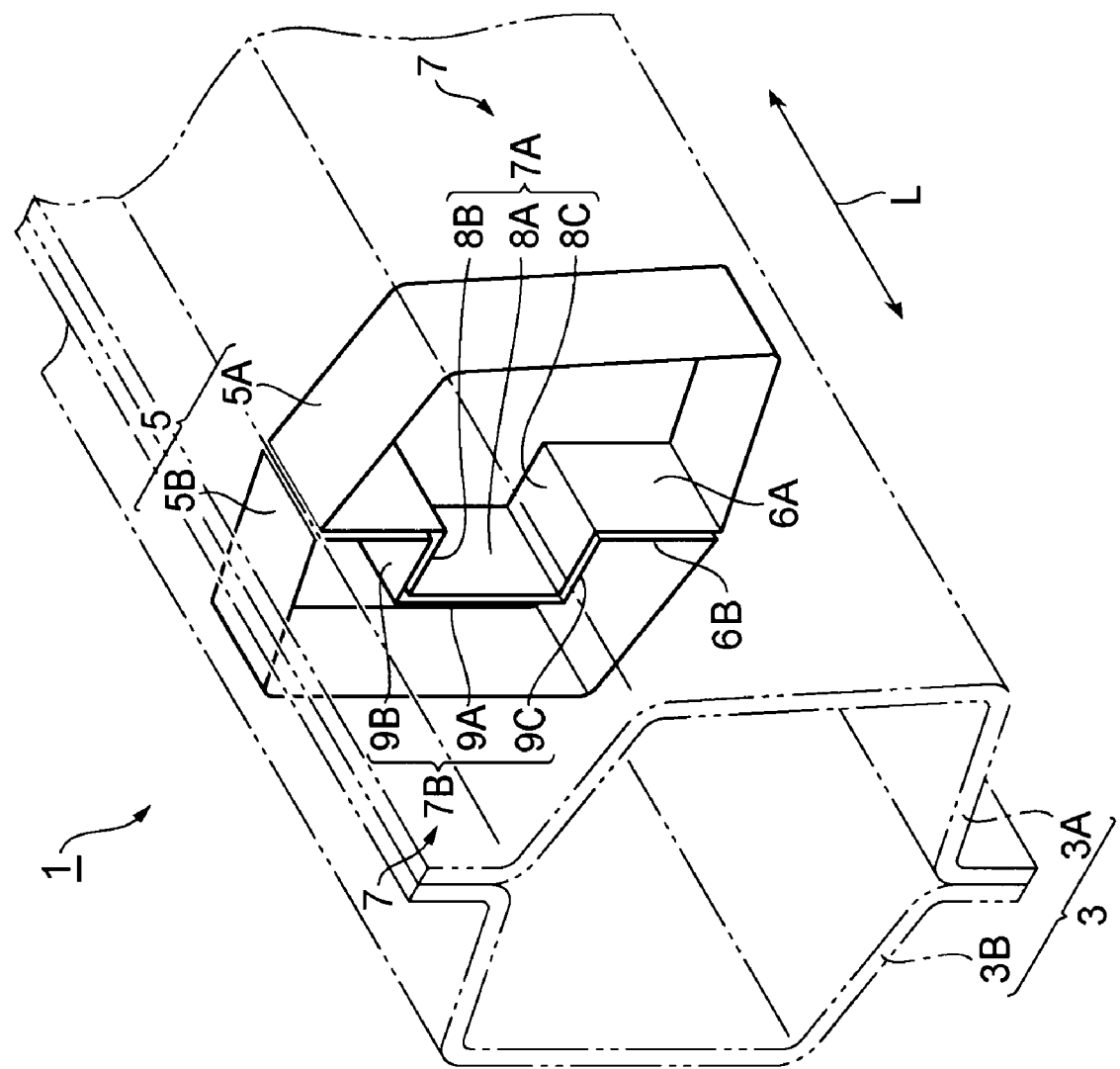
FIG. 3 is a schematic perspective view showing the side part structure of a vehicle body related to the first embodiment of the invention.

The side part structure 1 of the vehicle body shown in FIGS. 1 to 3 is, for example, a side part structure of a vehicle body, such as a passenger car (vehicle). The side part structure 1 of the vehicle body includes a rocker 3 joined to a lower end of a center pillar 2 which is arranged on both sides in a vehicle width direction W, and extends in a vertical direction H.

The rocker 3 is a hollow member with a substantially O-shaped cross-section which is arranged at a side part of the vehicle body and extends in an anteroposterior direction L of the vehicle body. The rocker 3 has an outer rocker 3A which assumes a substantially U-shaped cross-section and is arranged outside in the vehicle width direction W, and an inner rocker 3B which assumes a substantially U-shaped cross-section and is arranged inside in the vehicle width direction W, and upper and lower ends (open ends) of the outer rocker 3A and the inner rocker 3B are joined to each other to form a hollow member. That is, the above cross-section of the rocker 3 includes a pair of first opposed wall portions, and second opposed wall portions which is formed as one end and the other end of each of the pair of first opposed wall portions are bent almost at a right angle in the same direction, and one ends and the other ends face each other and are joined together. Also, as shown in FIG. 2, the lower end of the center pillar 2 is joined to an outer surface of the outer rocker 3A, and a floor cross member 4 is joined to an outer surface (an inside surface in the vehicle width direction W) of the inner rocker 3B.

Inside the rocker 3, a bulkhead 5 (a load transmission member) serving as a reinforcing member is arranged in the vicinity of a connection position (and/or a connection position between the floor cross member 4 and the inner rocker 3B) between the center pillar 2 and the outer rocker 3A. The bulkhead 5 has an outer bulkhead 5A (one of a first load transmission member and a second load transmission member, here the first load transmission member) joined to an inner surface of the outer rocker 3A, and an inner bulkhead 5B (the other of the first load transmission member and the second load transmission member, here the second load transmission member) joined to an inner surface of the inner rocker 3B. The outer bulkhead 5A has a facing wall 6A which faces the inner bulkhead 5B and extends in the vertical direction H, and the inner bulkhead 5B has a facing wall 6B which faces the outer bulkhead 5A and extends in the vertical direction H. That is, the outer bulkhead 5A and the inner bulkhead 5B are arranged so that the mutually facing walls 6A and 6B face each other.

The facing wall 6A of the outer bulkhead 5A is formed with a convex portion 7A which protrudes toward the inner bulkhead 5B and is engageable with the inner bulkhead 5B. Additionally, the facing wall 6B of the inner bulkhead 5B is formed with a concave portion 7B which is recessed inward in the vehicle width direction W. The convex portion 7A and the concave portion 7B are formed at the center of the bulkhead 5 in the vertical direction H and are made engageable with each other. Also, the convex portion 7A formed on the outer bulkhead 5A and the concave portion 7B formed in the inner bulkhead 5B constitute proximity portions 7 which are engageable with each other. In addition, the convex portion 7A and the concave portion 7B need not be formed at the center of the bulkhead 5 in the vertical direction H but, for example, may be formed below the center of the bulkhead 5.

The convex portion 7A has a vertical wall 8A which extends in the vertical direction H further inside in the vehicle width direction W than the center of the bulkhead 5, an upper wall 8B which is bent at an upper end of the vertical wall 8A and extends in the vehicle width direction W, and a lower wall 8C which is bent at a lower end of the vertical wall 8A and extends in the vehicle width direction W. Additionally, the outside (right in the drawing) end of the upper wall 8B in the vehicle width direction W is bent upward, and the outside end of the lower wall 8C in the vehicle width direction W is bent downward, both of which are connected to a portion of the facing wall 6A. In addition, the shape of the convex portion 7A may be cylindrical, for example. In short, any arbitrary shapes which allow the engagement with the inner bulkhead 5B may be adopted.

The concave portion 7B has a vertical wall 9A which extends in the vertical direction H further inside in the vehicle width direction W than the center of the bulkhead 5, an upper wall 9B which is bent at an upper end of the vertical wall 9A and extends in the vehicle width direction W, and a lower wall 9C which is bent at a lower end of the vertical wall 9A and extends in the vehicle width direction W. Additionally, the outside (right in the drawing) end of the upper wall 9B in the vehicle width direction W is bent upward, and the outside end of the lower wall 9C in the vehicle width direction W is bent downward, each of which constitutes a portion of the facing wall 6B.

Next, the dispersing action of a collision load when a vehicle including the side part structure 1 of the vehicle body constructed in this way undergoes a side collision will be described. As shown in FIG. 2, for example, when a load $F_1$ is input to the center pillar 2 due to a side collision, an upward tensile load $F_2$ is input to the outer rocker 3A, and the load input to the outer rocker 3A is transmitted to the outer bulkhead 5A.

When the tensile load $F_2$ is input to the outer bulkhead 5A, the convex portion 7A of the outer bulkhead 5A is engaged with the concave portion 7B of the inner bulkhead 5B, and the mutually facing walls 6A and 6B are brought into contact with each other, whereby the collision load is transmitted to the inner bulkhead 5B. That is, the upper walls 8B and 9B are brought into contact with each other, and the vertical walls 8A and 9A are brought into contact with each other, whereby the load is reliably transmitted.

Also, the load transmitted to the inner bulkhead 5B is transmitted to the inner rocker 3B and the floor cross member 4, so that it is possible to efficiently disperse the collision load. According to such a side part structure 1 of a vehicle body related to the first embodiment, a reaction force at a collision can be increased and a load caused by a side collision can be reliably dispersed to a skeleton member of the vehicle body.

Additionally, since the outer bulkhead 5A and the inner bulkhead 5B have the facing walls 6A and 6B and are adapted to be engageable with each other, the cross-sectional collapse of the bulkhead 5 can be prevented, and the transmission of a load to the floor cross member 4 can be efficiently performed.

Additionally, since the bulkhead 5 is split into the outer bulkhead 5A and the inner bulkhead 5B, and the shapes which are engageable with each other are formed in the facing walls 6A and 6B, an underbody can be made common to different upper bodies.

Additionally, since the outer bulkhead 5A is formed with the convex portion 7A which is engageable with the inner bulkhead 5B, and a desired engagement force is obtained by engagement during assembly, a manufacturing process can also be simplified.

(Second Embodiment)

Figure 4:
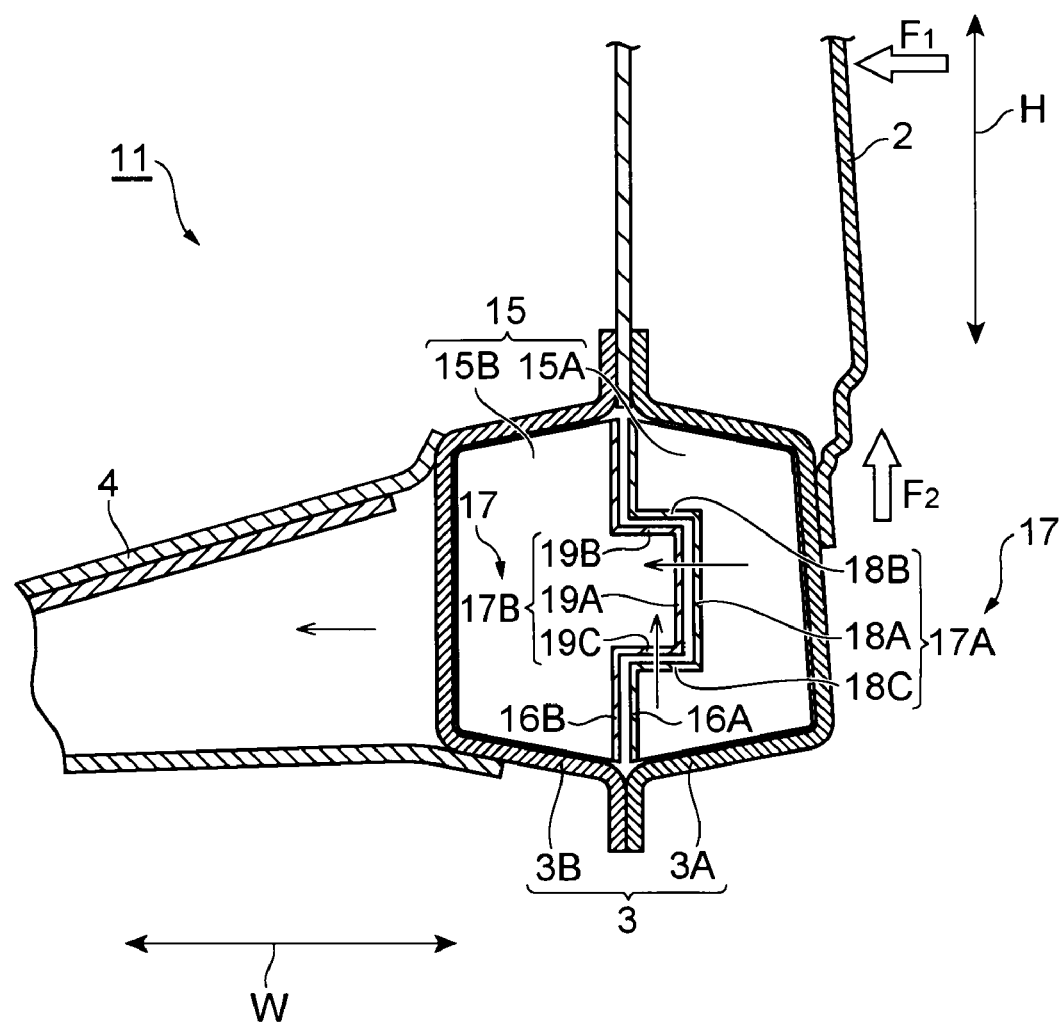
FIG. 4 is a sectional view showing a side part structure of a vehicle body related to a second embodiment of the invention.
Figure 5:
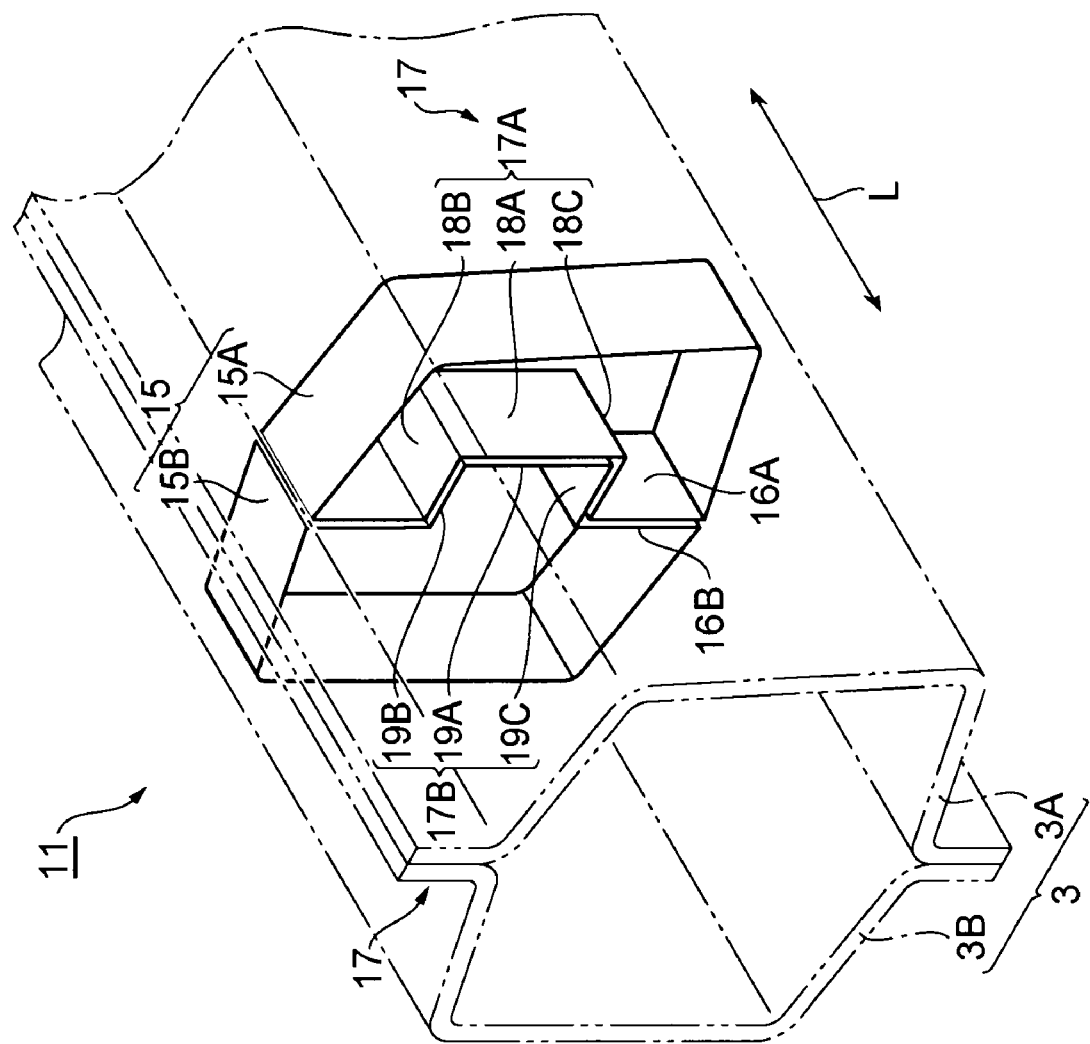
FIG. 5 is a schematic perspective view showing the side part structure of a vehicle body related to the second embodiment of the invention.

FIG. 4 is a sectional view showing a side part structure of a vehicle body related to a second embodiment of the invention, and FIG. 5 is a schematic perspective view showing the side part structure of a vehicle body related to the second embodiment of the invention. The side part structure 11 of the vehicle body of the second embodiment is different from the side part structure 1 of the vehicle body of the first embodiment in that the shapes of engageable proximity portions are different, specifically, a concave portion and a convex portion are arranged in an inverted manner.

As shown in FIGS. 4 and 5, the side part structure 11 of the vehicle body of the second embodiment includes a bulkhead 15 (a load transmission member) serving as a reinforcing member which is arranged inside the rocker 3 in the vicinity of a connection position (and/or a connection position between the floor cross member 4 and the inner rocker 3B) between the center pillar 2 and the outer rocker 3A. The bulkhead 15 has an outer bulkhead 15A (one of the first load transmission member and the second load transmission member, here the first load transmission member) joined to the inner surface of the outer rocker 3A, and an inner bulkhead 15B (the other of the first load transmission member and the second load transmission member, here the second load transmission member) joined to the inner surface of the inner rocker 3B. The outer bulkhead 15A has a facing wall 16A which faces the inner bulkhead 25B and extends in the vertical direction H, and the inner bulkhead 15B has a facing wall 16B which faces the outer bulkhead 15A and extends in the vertical direction H. That is, the outer bulkhead 15A and the inner bulkhead 15B are arranged so that the mutually facing walls 16A and 16B face each other. A predetermined gap is formed between the outer bulkhead 15A and the inner bulkhead 15B.

The facing wall 16A of the outer bulkhead 15A is formed with a concave portion 17A which is recessed outward in the vehicle width direction W. Additionally, the facing wall 16B of the inner bulkhead 15B is formed with a convex portion 17B which protrudes toward the outer bulkhead 15A and is engageable with the outer bulkhead 15A. The convex portion 17B and the concave portion 17A are formed at the center of the bulkhead 15 in the vertical direction H and are made engageable with each other. Also, the concave portion 17A formed in the outer bulkhead 15A and the convex portion 17B formed on the inner bulkhead 15B constitute proximity portions 17 which are engageable with each other.

The concave portion 17A has a vertical wall 18A which extends in the vertical direction H further outside in the vehicle width direction W than the center of the bulkhead 15, an upper wall 18B which is bent at an upper end of the vertical wall 18A and extends in the vehicle width direction W, and a lower wall 18C which is bent at a lower end of the vertical wall 18A and extends in the vehicle width direction W. Additionally, the inside (left side in the drawing) end of the upper wall 18B in the vehicle width direction W is bent upward, and the inside end of the lower wall 18C in the vehicle width direction W is bent downward, each of which constitutes a portion of the facing wall 16A.

The convex portion 17B has the vertical wall 19A extended in the vertical direction H further outside in the vehicle width direction W than the center of a bulkhead 5, the upper wall 19B which is bent at the upper end of this vertical wall 19A and extends in the vehicle width direction W, and the lower wall 19C which is bent at the lower end of the vertical wall 19A and extends in the vehicle width direction W. Additionally, the inside (left side in the drawing) end of the upper wall 19B in the vehicle width direction W is bent upward, and the inside end of the lower wall 19C in the vehicle width direction W is bent downward, each of which constitutes a portion of the facing wall 16B.

Next, the dispersing action of a collision load when a vehicle including the side part structure 11 of the vehicle body constructed in this way undergoes a side collision will be described. As shown in FIG. 4, for example, when a load $F_1$ is input to the center pillar 2 due to a side collision, an upward tensile load $F_2$ is input to the outer rocker 3A, and the load input to the outer rocker 3A is transmitted to the outer bulkhead 15A.

When the tensile load $F_2$ is input to the outer bulkhead 15A, the concave portion 17A of the outer bulkhead 15A is engaged with the convex portion 17B of the inner bulkhead 15B, and the mutually facing walls 16A and 16B are brought into contact with each other, whereby the collision load is transmitted to the inner bulkhead 15B. That is, the upper walls 18A and 19A are brought into contact with each other, and the lower walls 18C and 19C are brought into contact with each other, whereby the load is reliably transmitted.

Also, the load transmitted to the inner bulkhead 15B is transmitted to the inner rocker 3B and the floor cross member 4, so that it is possible to efficiently disperse the collision load. According to such a side part structure 11 of a vehicle body related to the second embodiment, a reaction force at a collision can be increased, and a load caused by a side collision can be reliably dispersed to a skeleton member of the vehicle body.

Additionally, since the outer bulkhead 15A and the inner bulkhead 15B have the facing walls 16A and 16B and are adapted to be engageable with each other, the cross-sectional collapse of the bulkhead 15 can be prevented, and the transmission of a load to the floor cross member 4 can be efficiently performed.

Additionally, since the bulkhead 15 is split into the outer bulkhead 15A and the inner bulkhead 15B, and the shapes which are engageable with each other are formed in the facing walls 16A and 16B, an underbody can be made common to different upper bodies.

Additionally, since the inner bulkhead 15B is formed with the convex portion 17B which is engageable with the outer bulkhead 15A, and a desired engagement force is obtained by engagement during assembly, a manufacturing process can also be simplified.

(Third Embodiment)

Figure 6:
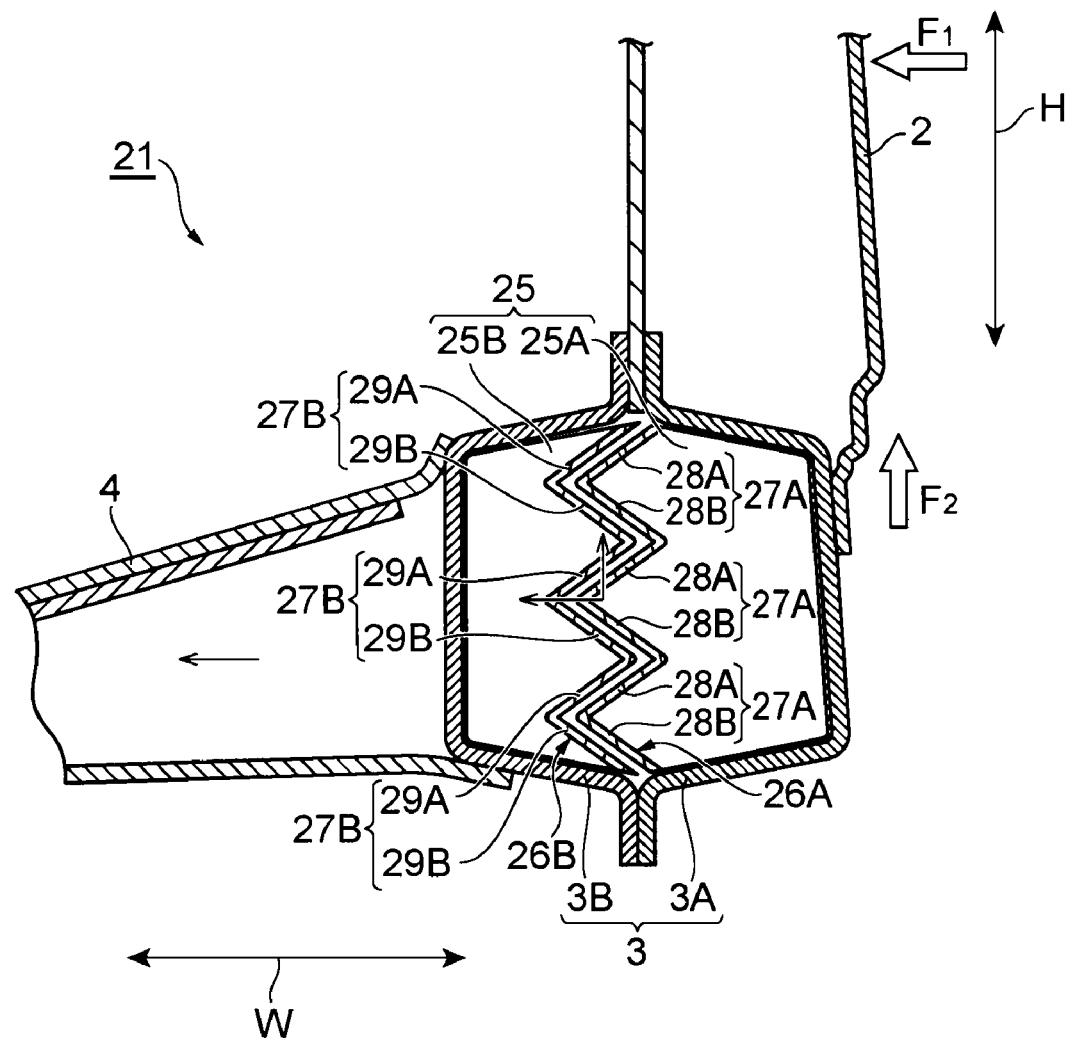
FIG. 6 is a sectional view showing a side part structure of a vehicle body related to a third embodiment of the invention.
Figure 7:
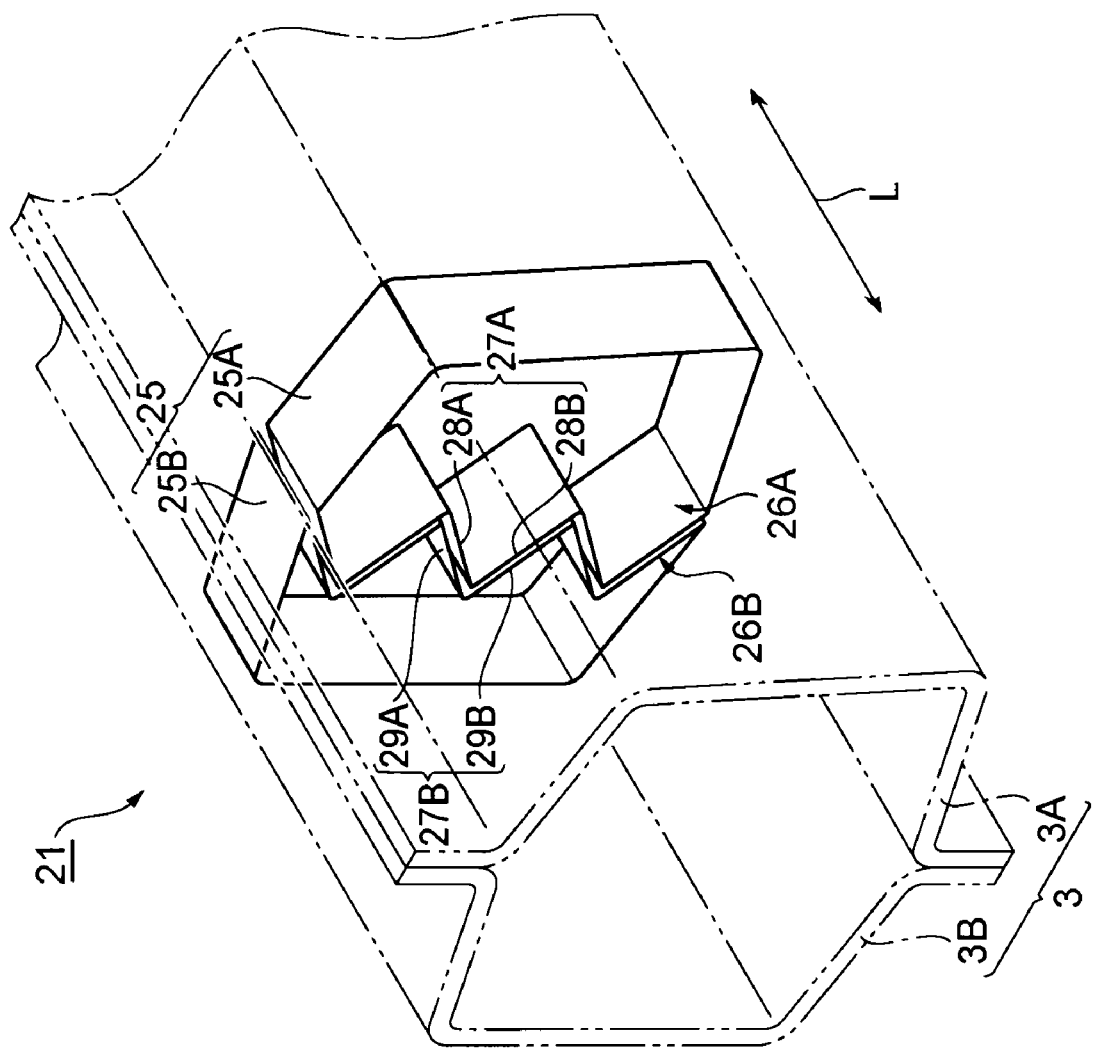
FIG. 7 is a schematic perspective view showing the side part structure of a vehicle body related to the third embodiment of the invention.

FIG. 6 is a sectional view showing a side part structure of a vehicle body related to a third embodiment of the invention, and FIG. 7 is a schematic perspective view showing the side part structure of a vehicle body related to the third embodiment of the invention. The side part structure 21 of the vehicle body of the third embodiment is different from the side part structure 1 of the vehicle body of the first embodiment in that the shapes of engageable proximity portions are different.

As shown in FIGS. 6 and 7, the side part structure 21 of the vehicle body of the third embodiment includes a bulkhead 25 (a load transmission member) serving as a reinforcing member which is arranged inside the rocker 3 in the vicinity of a connection position (and/or a connection position between the floor cross member 4 and the inner rocker 3B) between the center pillar 2 and the outer rocker 3A. The bulkhead 25 has an outer bulkhead 25A (one of the first load transmission member and the second load transmission member, here the first load transmission member) joined to the inner surface of the outer rocker 3A, and an inner bulkhead 25B (the other of the first load transmission member and the second load transmission member, here the second load transmission member) joined to the inner surface of the inner rocker 3B. The outer bulkhead 25A has a facing wall 26A which faces the inner bulkhead 25B, and the inner bulkhead 25B has a facing wall 26B which faces the outer bulkhead 25A. That is, the outer bulkhead 25A and the inner bulkhead 25B are arranged so that the mutually facing walls 26A and 26B face each other.

The facing wall 26A of the outer bulkhead 25A is formed with a plurality of chevron-shaped convex portions 27A which protrudes toward the inner bulkhead 25B and is engageable with the inner bulkhead 25B. Additionally, the facing wall 26B of the inner bulkhead 25B is formed with a plurality of V-shaped concave portions 27B which is recessed inward in the vehicle width direction W. The plurality of (for example, three) convex portions 27A and the concave portions 27B are formed in the vertical direction H, are arranged in a saw-tooth shape, and are made engageable with each other. Also, the convex portions 27A formed on the outer bulkhead 25A and the concave portions 27B formed in the inner bulkhead 25B constitute proximity portions 27 which are engageable with each other.

Each convex portion 27A includes an inclined wall 28A which is inclined so that the lower side thereof is arranged further inside in the vehicle width direction W than the upper side thereof, and an inclined wall 28B which is bent from a lower end of the inclined wall 28A and is inclined so that the lower side thereof is arranged further outside in the vehicle width direction W than the upper side thereof. These inclined walls 28A and 28B are alternately formed in the vertical direction H to constitute the facing wall 26A.

Each concave portion 27B includes an inclined wall 29A which is inclined so that the lower side thereof is arranged further inside in the vehicle width direction W than the upper side thereof, and an inclined wall 29B which is bent from a lower end of the inclined wall 29A and is inclined so that the lower side thereof is arranged further outside in the vehicle width direction W than the upper side thereof. These inclined walls 29A and 29B are alternately formed in the vertical direction H to constitute the facing wall 26B.

Next, the dispersing action of a collision load when a vehicle including the side part structure 21 of the vehicle body constructed in this way undergoes a side collision will be described. As shown in FIG. 6, for example, when a load $F_1$ is input to the center pillar 2 due to a side collision, an upward tensile load $F_2$ is input to the outer rocker 3A, and the load input to the outer rocker 3A is transmitted to the outer bulkhead 25A.

When the tensile load $F_2$ is input to the outer bulkhead 25A, the convex portions 27A of the outer bulkhead 25A come into contact with and are engaged with the concave portions 27B of the inner bulkhead 25B, whereby the collision load is transmitted to the inner bulkhead 25B. That is, the inclined walls 28A and 29A are brought into contact with each other, whereby the load is reliably transmitted.

Also, the load transmitted to the inner bulkhead 25B is transmitted to the inner rocker 3B and the floor cross member 4, so that it is possible to efficiently disperse the collision load. According to such a side part structure 21 of a vehicle body related to the third embodiment, a reaction force at a collision can be increased and a load caused by a side collision can be reliably dispersed to a skeleton member of the vehicle body.

Additionally, since the outer bulkhead 25A and the inner bulkhead 25B have the facing walls 26A and 26B and are adapted to be engageable with each other, the cross-sectional collapse of the bulkhead 25 can be prevented, and the transmission of a load to the floor cross member 4 can be efficiently performed.

Additionally, since the bulkhead 25 is split into the outer bulkhead 25A and the inner bulkhead 25B, and the shapes which are engageable with each other are formed in the facing walls 26A and 26B, an underbody can be made common to different upper bodies.

In addition, in the above embodiment, a side part structure of a vehicle body including an outer bulkhead formed with the concave portions 27B and an inner bulkhead formed with the convex portions 27A may be provided.

Additionally, since the outer bulkhead 25A is formed with the plurality of chevron-shaped convex portions 27A which are engageable with the inner bulkhead 25B, and a desired engagement force is obtained by engagement during assembly, a manufacturing process can also be simplified.

(Fourth Embodiment)

Figure 8:
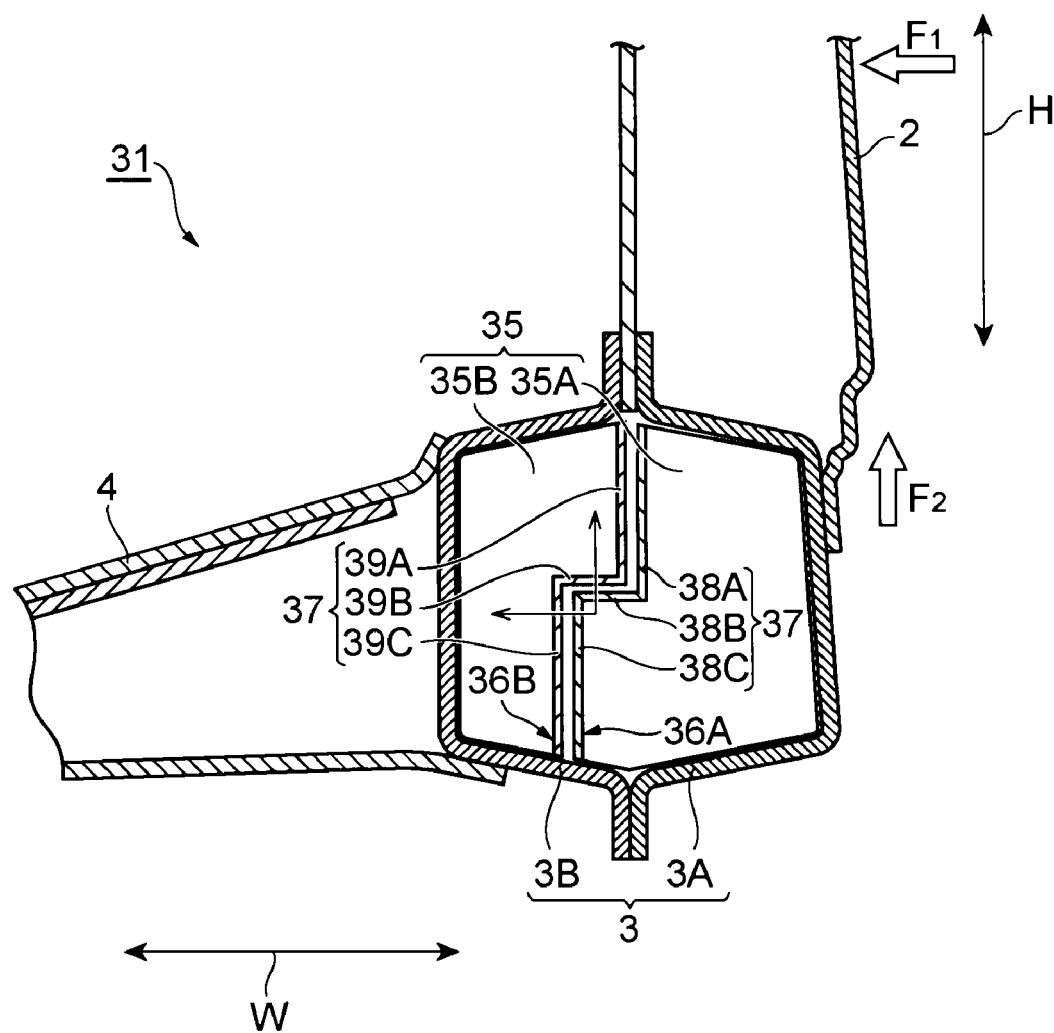
FIG. 8 is a sectional view showing a side part structure of a vehicle body related to a fourth embodiment of the invention.
Figure 9:
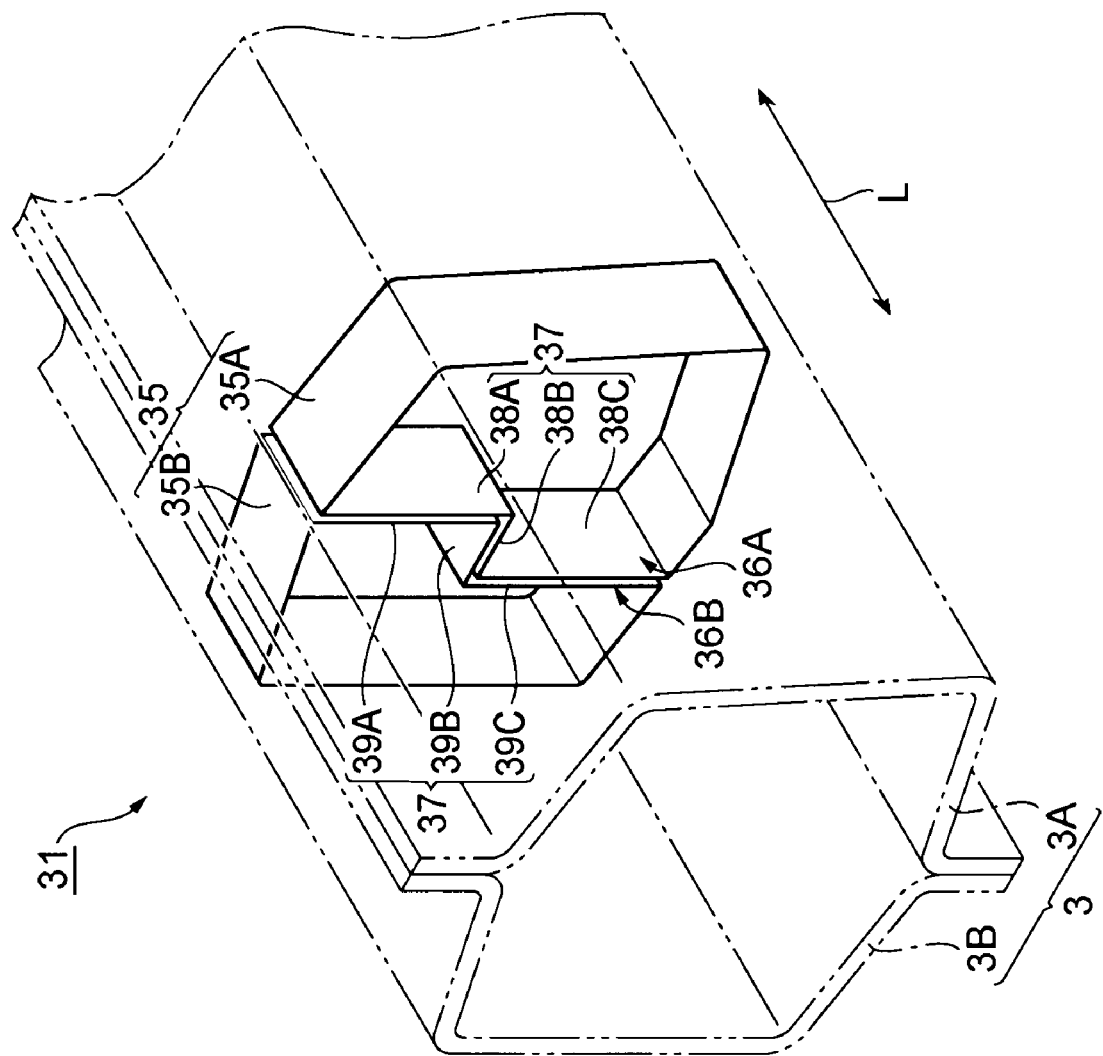
FIG. 9 is a schematic perspective view showing the side part structure of a vehicle body related to the fourth embodiment of the invention.

FIG. 8 is a sectional view showing a side part structure of a vehicle body related to a fourth embodiment of the invention, and FIG. 9 is a schematic perspective view showing the side part structure of a vehicle body related to the fourth embodiment of the invention. The side part structure 31 of the vehicle body of the fourth embodiment is different from the side part structure 1 of the vehicle body of the first embodiment in that the shapes of engageable proximity portions are different.

As shown in FIGS. 8 and 9, the side part structure 31 of the vehicle body of the fourth embodiment includes a bulkhead 35 (a load transmission member) serving as a reinforcing member which is arranged inside the rocker 3 in the vicinity of a connection position (and/or a connection position between the floor cross member 4 and the inner rocker 3B) between the center pillar 2 and the outer rocker 3A. The bulkhead 35 has an outer bulkhead 35A (one of the first load transmission member and the second load transmission member, here the first load transmission member) joined to the inner surface of the outer rocker 3A, and an inner bulkhead 35B (the other of the first load transmission member and the second load transmission member, here the second load transmission member) joined to the inner surface of the inner rocker 3B. The outer bulkhead 35A has a facing wall 36A which faces the inner bulkhead 35B, and the inner bulkhead 35B has a facing wall 36B which faces the outer bulkhead 35A. That is, the outer bulkhead 35A and the inner bulkhead 35B are arranged so that the mutually facing walls 36A and 36B face each other.

The facing wall 36A of the outer bulkhead 35A has an upper wall 38A which extends in the vertical direction H at an upper portion of the outer bulkhead 35A, an intermediate wall 38B which is bent inward in the vehicle width direction W from a lower end of the upper wall 38A, and a lower wall 38C which is bent downward from the inside of the intermediate wall 38B in the vehicle width direction W and extends in the vertical direction H.

The facing wall 36B of the inner bulkhead 35B has an upper wall 39A which extends in the vertical direction H at an upper portion of the inner bulkhead 35B, an intermediate wall 39B which is bent inward in the vehicle width direction W from a lower end of the upper wall 39A, and a lower wall 39C which is bent downward from the inside of the intermediate wall 39B in the vehicle width direction W and extends in the vertical direction H.

Also, the upper wall 38A and the upper wall 39A face each other, the intermediate wall 38B and the intermediate wall 39B face each other, the lower wall 38C and the lower wall 39C face each other, and the upper wall 38A, the intermediate wall 38B, and the lower wall 38C which are formed in the outer bulkhead 35A, and the upper wall 39A, the intermediate wall 39B, and the lower wall 39C which are formed in the inner bulkhead 35B constitute proximity portions 37 which are engageable with each other.

Next, the dispersing action of a collision load when a vehicle including the side part structure 31 of the vehicle body constructed in this way undergoes a side collision will be described. As shown in FIG. 8, for example, when a load $F_1$ is input to the center pillar 2 due to a side collision, an upward tensile load $F_2$ is input to the outer rocker 3A, and the load input to the outer rocker 3A is transmitted to the outer bulkhead 35A.

When the tensile load $F_2$ is input to the outer bulkhead 35A, the mutually facing walls 36A and 36B come into contact with and are engaged with each other, whereby the collision load is transmitted to the inner bulkhead 35B. That is, the upper walls 38A and 39A are brought into contact with each other, and the intermediate walls 38B and 39B are brought into contact with each other, whereby the load is reliably transmitted.

Also, the load transmitted to the inner bulkhead 35B is transmitted to the inner rocker 3B and the floor cross member 4, so that it is possible to efficiently disperse the collision load. According to such a side part structure 31 of a vehicle body related to the fourth embodiment, a reaction force at a collision can be increased and a load caused by a side collision can be reliably dispersed to a skeleton member of the vehicle body.

Additionally, since the outer bulkhead 35A and the inner bulkhead 35B have the facing walls 36A and 36B and are adapted to be engageable with each other, the cross-sectional collapse of the bulkhead 35 can be prevented, and the transmission of a load to the floor cross member 4 can be efficiently performed.

Additionally, since the bulkhead 35 is split into the outer bulkhead 35A and the inner bulkhead 35B, and the shapes which are engageable with each other are formed in the facing walls 36A and 36B, an underbody can be made common to different upper bodies.

Additionally, since the outer bulkhead 35A and the inner bulkhead 35B are formed with the proximity portions 37 which are engageable with each other, and a desired engagement force is obtained by engagement during assembly, a manufacturing process can also be simplified.

(Fifth Embodiment)

Figure 10:
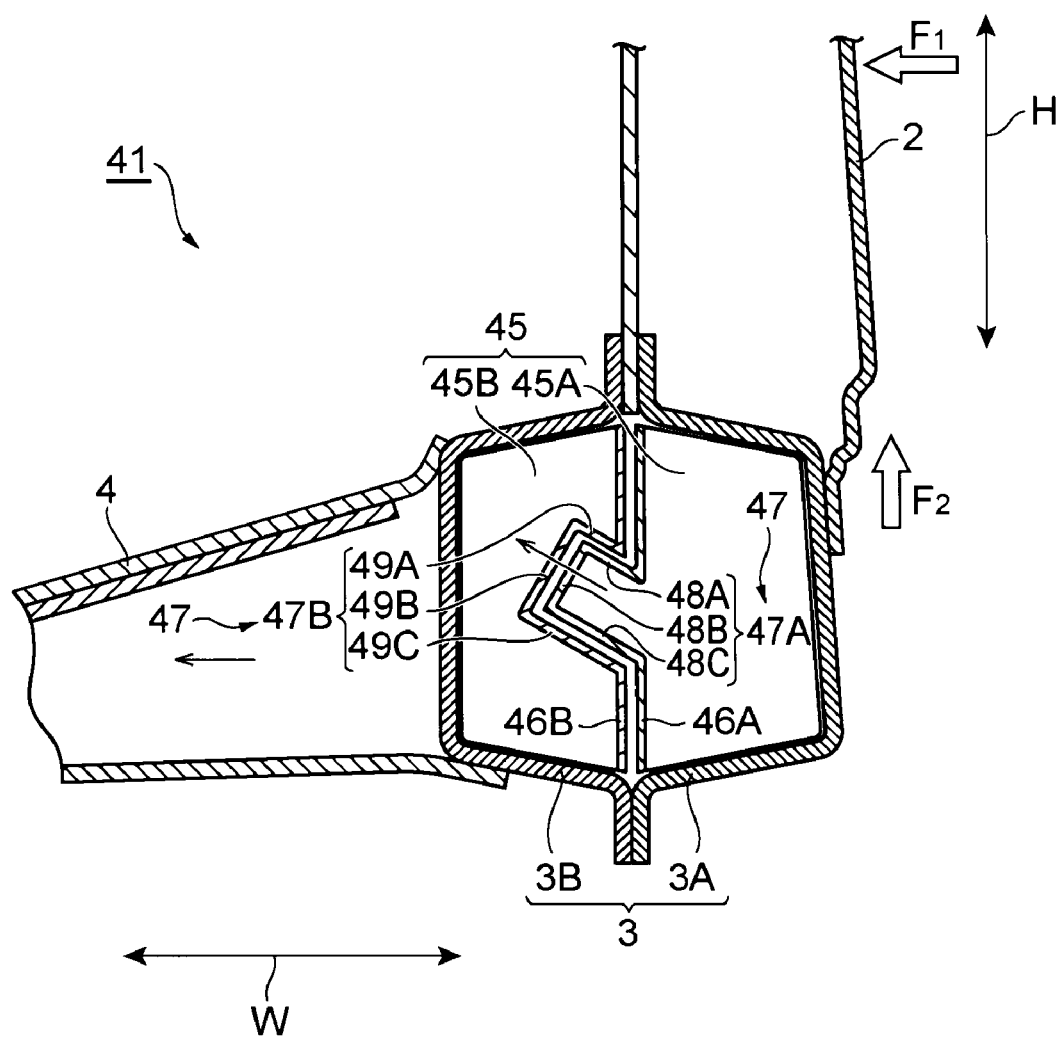
FIG. 10 is a sectional view showing a side part structure of a vehicle body related to a fifth embodiment of the invention.
Figure 11:
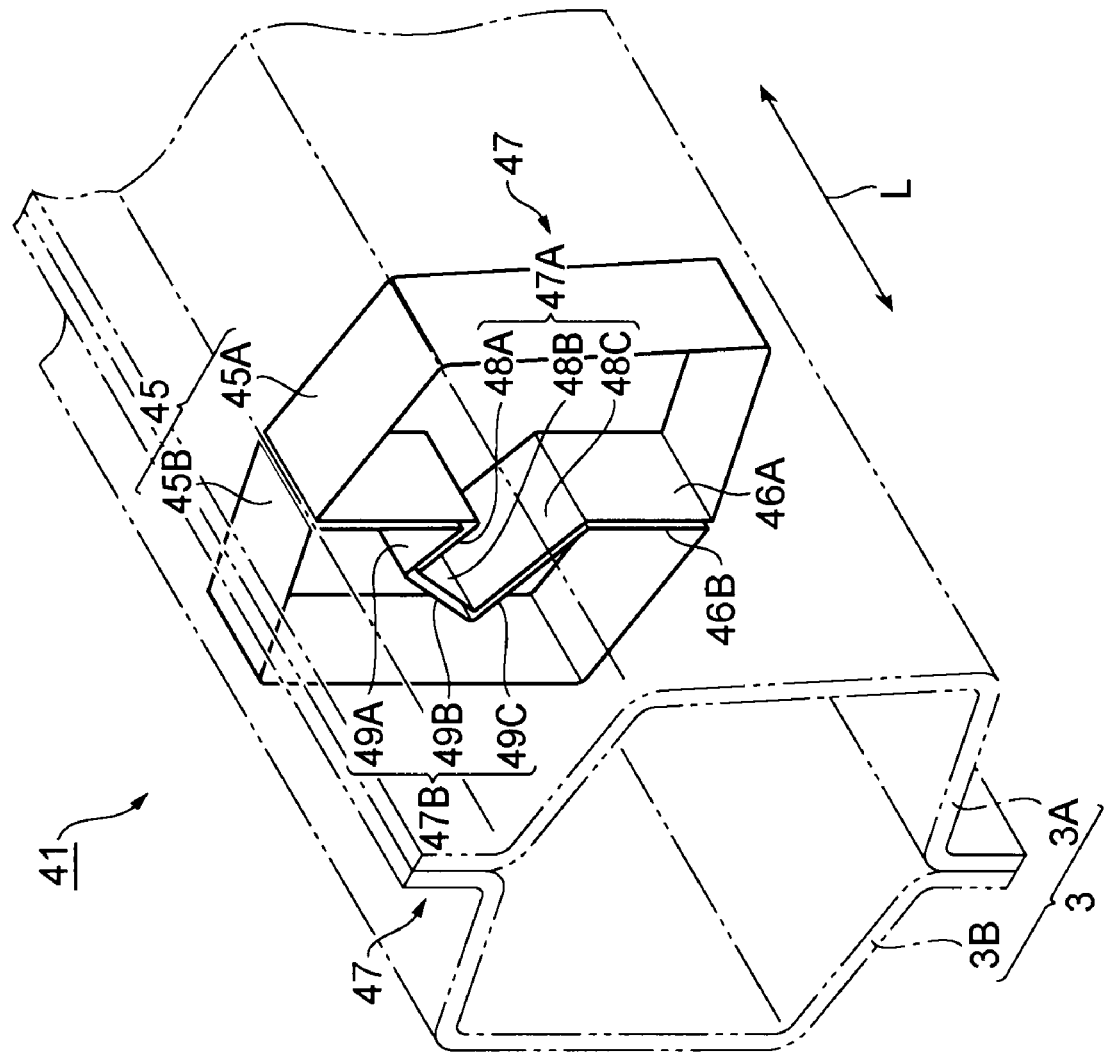
FIG. 11 is a schematic perspective view showing the side part structure of a vehicle body related to the fifth embodiment of the invention.

FIG. 10 is a sectional view showing a side part structure of a vehicle body related to a fifth embodiment of the invention, and FIG. 11 is a schematic perspective view showing the side part structure of a vehicle body related to the fifth embodiment of the invention. The side part structure 41 of the vehicle body of the fifth embodiment is different from the side part structure 1 of the vehicle body of the first embodiment in that the shapes of engageable proximity portions are different.

As shown in FIGS. 10 and 11, the side part structure 41 of the vehicle body of the fifth embodiment includes a bulkhead 45 (a load transmission member) serving as a reinforcing member which is arranged inside the rocker 3 in the vicinity of a connection position (and/or a connection position between the floor cross member 4 and the inner rocker 3B) between the center pillar 2 and the outer rocker 3A. The bulkhead 45 has an outer bulkhead 45A (one of the first load transmission member and the second load transmission member, here the first load transmission member) joined to the inner surface of the outer rocker 3A, and an inner bulkhead 45B (the other of the first load transmission member and the second load transmission member, here the second load transmission member) joined to the inner surface of the inner rocker 3B. The outer bulkhead 45A has a facing wall 46A which faces the inner bulkhead 45B, and the inner bulkhead 45B has a facing wall 46B which faces the outer bulkhead 45A. That is, the outer bulkhead 45A and the inner bulkhead 45B are arranged so that the mutually facing walls 46A and 46B face each other.

The facing wall 46A of the outer bulkhead 45A is formed with a convex portion 47A which protrudes toward the inner bulkhead 45B and is engageable with the inner bulkhead 45B. The convex portion 47A protrudes obliquely upward. Additionally, the facing wall 46B of the inner bulkhead 45B is formed with a concave portion 47B which is recessed inward in the vehicle width direction W. The convex portion 47A and the concave portion 47B are formed at the center of the bulkhead 45 in the vertical direction H and are made engageable with each other. Also, the convex portion 47A formed on the outer bulkhead 45A and the concave portion 47B formed in the inner bulkhead 45B constitute proximity portions 47 which are engageable with each other.

The convex portion 47A has an inclined wall 48A which is bent inward in the vehicle width direction W from the facing wall 46A of the upper side which extends in the vertical direction H and which has the inside thereof in the vehicle width direction W arranged above the outside thereof, an inclined wall 48B which is bent downward from the inside of the inclined wall 48A in the vehicle width direction W and which has the lower side thereof arranged further inside in the vehicle width direction W than the upper side thereof, and an inclined wall 48C which is bent outward in the vehicle width direction W from a lower end of the inclined wall 48B and which has the outside thereof in the vehicle width direction W arranged below the inside thereof. Additionally, a lower end of the inclined wall 48C is bent downward, and is connected to the lower side of the facing wall 46A which extends in the vertical direction H.

The concave portion 47B has an inclined wall 49A which is bent inward in the vehicle width direction W from the facing wall 46B of the upper side which extends in the vertical direction H and which has the inside thereof in the vehicle width direction W arranged above the outside thereof, an inclined wall 49B which is bent downward from the inside of the inclined wall 49A in the vehicle width direction W and which has the lower side thereof arranged further inside in the vehicle width direction W than the upper side thereof, and an inclined wall 49C which is bent outward in the vehicle width direction W from a lower end of the inclined wall 49B and which has the outside thereof in the vehicle width direction W arranged below the inside thereof. Additionally, a lower end of the inclined wall 49C is bent downward, and is connected to the lower side of the facing wall 46B which extends in the vertical direction H.

Figure 12:
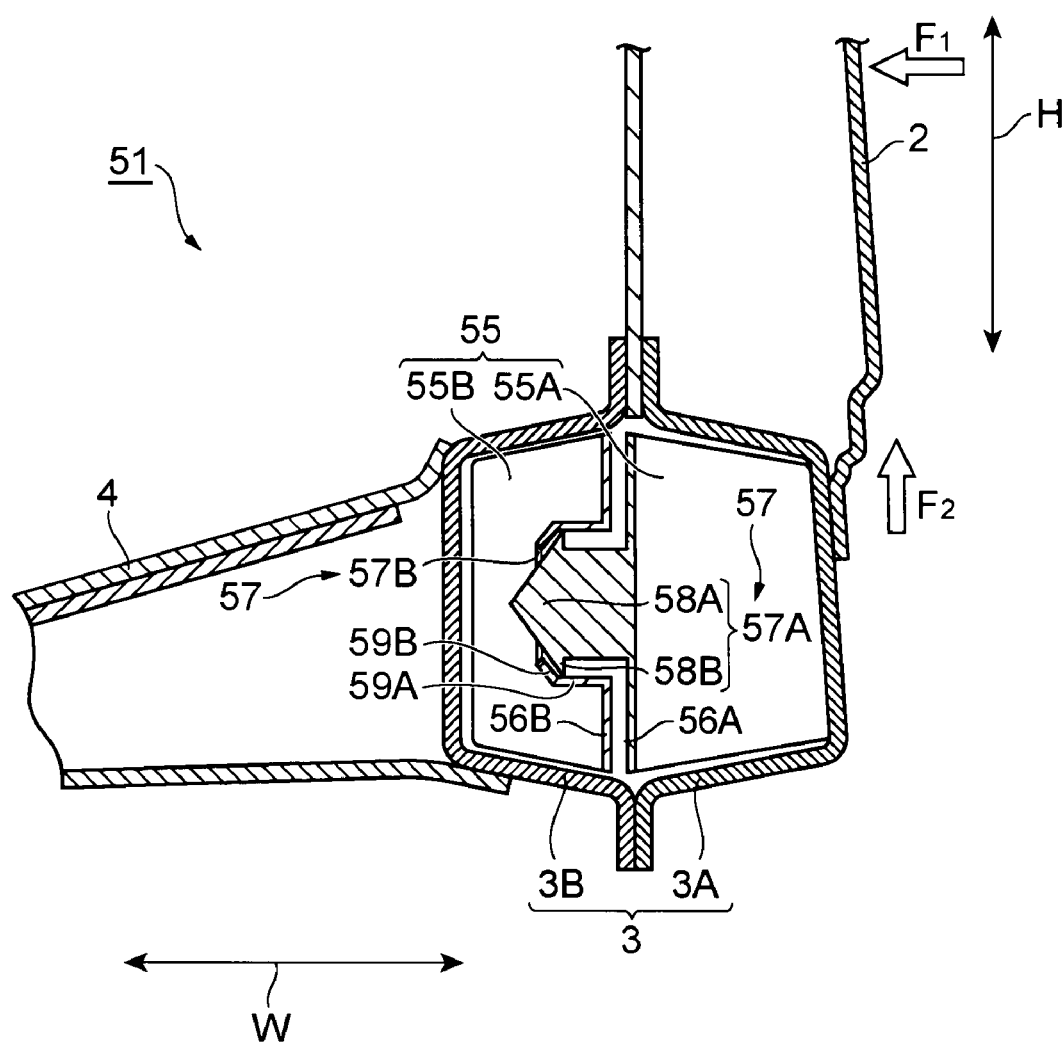
FIG. 12 is a sectional view showing a side part structure of a vehicle body related to a sixth embodiment of the invention, and showing a state before locking of proximity portions.

Next, the dispersing action of a collision load when a vehicle including the side part structure 41 of the vehicle body constructed in this way undergoes a side collision will be described. As shown in FIG. 12, for example, when a load $F_1$ is input to the center pillar 2 due to a side collision, an upward tensile load $F_2$ is input to the outer rocker 3A, and the load input to the outer rocker 3A is transmitted to the outer bulkhead 45A.

When the tensile load $F_2$ is input to the outer bulkhead 45A, the convex portion 47A of the outer bulkhead 45A is engaged with the concave portion 47B of the inner bulkhead 45B, and the mutually facing walls 46A and 46B are brought into contact with each other, whereby the collision load is transmitted to the inner bulkhead 45B. That is, the inclined walls 48B and 49B are brought into contact with each other, whereby the load is reliably transmitted. By inclining the convex portion 47A in a direction along an input load in this way, it is possible to receive a load, which has been received as bending by the convex portion 7A of the first embodiment, as an axial load, and it is possible to further increase a reaction force. Additionally, the convex portion 47A and the concave portion 47B are brought into contact with each other at the inclined wall 48C of the convex portion 47A and the inclined wall 49C of the concave portion 47B, so that it is possible to suppress the movement such that a lower end of the outer rocker 3A and a lower end of the inner rocker 3B tend to separate from each other.

Also, the load transmitted to the inner bulkhead 45B is transmitted to the inner rocker 3B and the floor cross member 4, so that it is possible to efficiently disperse the collision load. As a result, a reaction force at a collision can be increased and a load caused by a side collision can be reliably dispersed to a skeleton member of the vehicle body.

Additionally, since the outer bulkhead 45A and the inner bulkhead 45B have the facing walls 46A and 46B and are adapted to be engageable with each other, the cross-sectional collapse of the bulkhead 45 can be prevented, and the transmission of a load to the floor cross member 4 can be efficiently performed.

Additionally, since the bulkhead 45 is split into the outer bulkhead 45A and the inner bulkhead 45B, and the shapes which are engageable with each other are formed in the facing walls 46A and 46B, an underbody can be made common to different upper bodies.

Additionally, since the outer bulkhead 45A is formed with the convex portion 47A which is engageable with the inner bulkhead 45B, and a desired engagement force is obtained by engagement during assembly, a manufacturing process can also be simplified.

(Sixth Embodiment)

Figure 13:
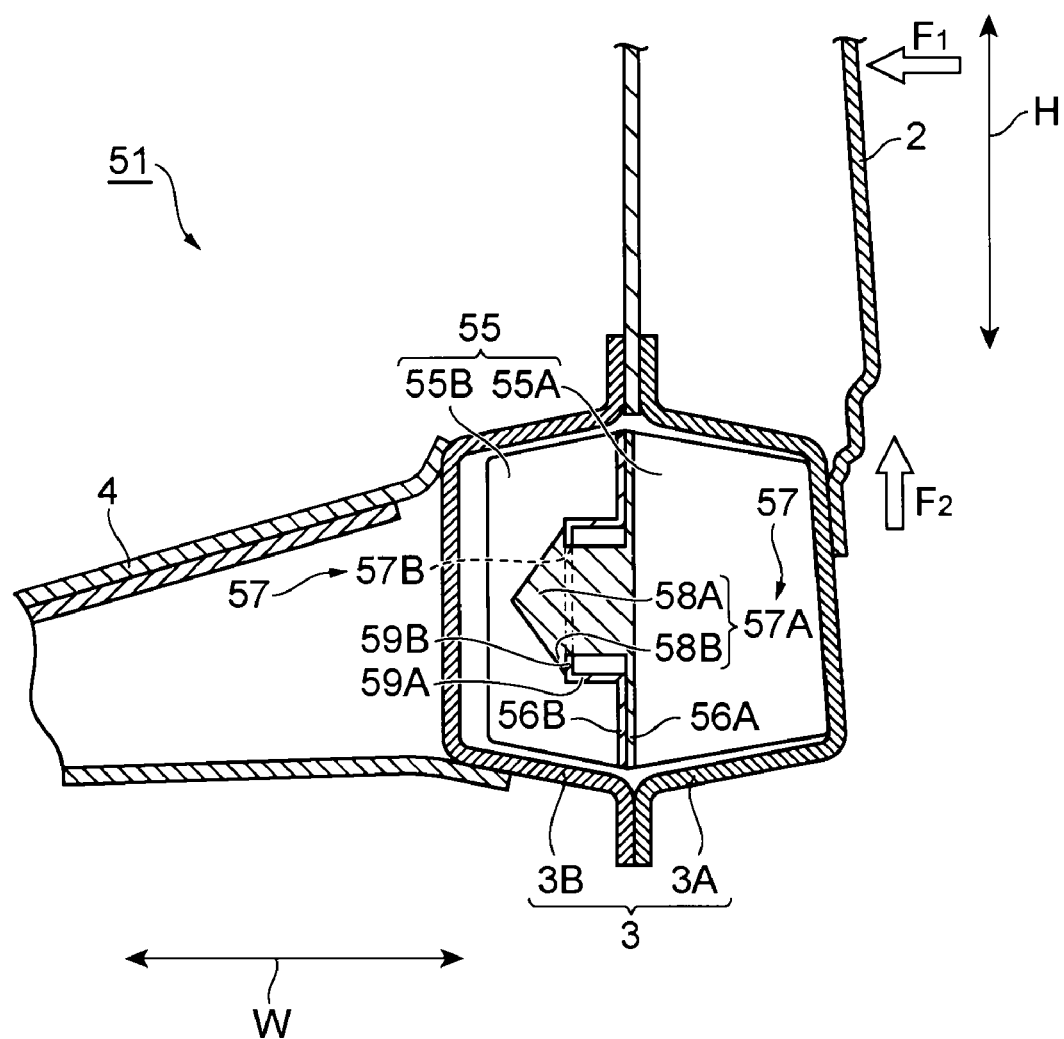
FIG. 13 is a sectional view showing the side part structure of a vehicle body related to the sixth embodiment of the invention, and showing a locking state of the proximity portions.

FIG. 12 is a sectional view showing a side part structure of a vehicle body related to a sixth embodiment of the invention, and showing a state before locking of proximity portions, and FIG. 13 is a sectional view showing the side part structure of a vehicle body related to the sixth embodiment of the invention, and showing a locking state of the proximity portions. The side part structure 51 of the vehicle body of the sixth embodiment is different from the side part structure 1 of the vehicle body of the first embodiment in that the shapes of engageable proximity portions are different.

As shown in FIGS. 12 and 13, the side part structure 51 of the vehicle body of the sixth embodiment includes a bulkhead 55 (a load transmission member) serving as a reinforcing member which is arranged inside the rocker 3 in the vicinity of a connection position (and/or a connection position between the floor cross member 4 and the inner rocker 3B) between the center pillar 2 and the outer rocker 3A. The bulkhead 55 has an outer bulkhead 55A (one of the first load transmission member and the second load transmission member, here the first load transmission member) joined to the inner surface of the outer rocker 3A, and an inner bulkhead 55B (the other of the first load transmission member and the second load transmission member, here the second load transmission member) joined to the inner surface of the inner rocker 3B. The outer bulkhead 55A has a facing wall 56A which faces the inner bulkhead 55B, and the inner bulkhead 55B has a facing wall 56B which faces the outer bulkhead 55A. That is, the outer bulkhead 55A and the inner bulkhead 55B are arranged so that the mutually facing walls 56A and 56B face each other.

The facing wall 56A of the outer bulkhead 55A is formed with a convex portion 57A which protrudes toward the inner bulkhead 55B and is engageable with the inner bulkhead 55B. Additionally, the facing wall 56B of the inner bulkhead 55B is formed with an opening portion 57B corresponding to the convex portion 57A of the outer bulkhead 55A. The convex portion 57A and the opening portion 57B are formed at the center of the bulkhead 55 in the vertical direction H and are made engageable with each other. Also, the convex portion 57A formed on the outer bulkhead 55A and the opening portion 57B formed in the inner bulkhead 55B constitute proximity portions 57 which are engageable with each other.

The convex portion 57A has an arrow-shaped tip portion 58A. The tip portion 58A is formed with a locking claw 58B which protrudes in a direction (vertical direction in the drawing) which intersects the vehicle width direction W.

The facing wall 56B is formed with a peripheral edge wall 59A which extends inward in the vehicle width direction W and surrounds the opening portion 57B. A locking piece 59B which has flexibility and locks the locking claw 58B of the convex portion 57A is formed at the inside end of the peripheral edge wall 59A in the vehicle width direction W. The locking piece 59B is formed so as to be bent inward of the opening portion 57B from the peripheral edge wall 59A.

Next, the dispersing action of a collision load when a vehicle including the side part structure 51 of the vehicle body constructed in this way undergoes a side collision will be described. As shown in FIG. 12, for example, when a load $F_1$ is input to the center pillar 2 due to a side collision, an upward tensile load $F_2$ is input to the outer rocker 3A, and the load input to the outer rocker 3A is transmitted to the outer bulkhead 55A.

The outer bulkhead 55A is pushed inward and moves toward the inner bulkhead 55B, due to a load in the vehicle width direction W in an early stage of collision, and as shown in FIG. 13, the convex portion 57A enters and is locked to the opening portion 57B. Specifically, the locking claw 58B advances inward in the vehicle width direction W over the locking piece 59B, and the locking claw 58B is locked to the locking piece 59B, whereby the collision load is transmitted to the inner bulkhead 55B. That is, the outer bulkhead 55A and the inner bulkhead 55B reliably mesh into each other, whereby the load is reliably transmitted. For this reason, the convex portion 57A and the opening portion 57B are locked to each other, so that it is possible to suppress the movement such that a lower end of the outer rocker 3A and a lower end of the inner rocker 3B tend to separate from each other.

Also, the load transmitted to the inner bulkhead 55B is transmitted to the inner rocker 3B and the floor cross member 4, so that it is possible to efficiently disperse the collision load. According to such a side part structure 51 of a vehicle body related to the sixth embodiment, a reaction force at a collision can be increased and a load caused by a side collision can be reliably dispersed to a skeleton member of the vehicle body.

Additionally, since the outer bulkhead 55A and the inner bulkhead 55B have the facing walls 56A and 56B and are adapted to be engageable with each other, the cross-sectional collapse of the bulkhead 55 can be prevented, and the transmission of a load to the floor cross member 4 can be efficiently performed.

Additionally, since the bulkhead 55 is split into the outer bulkhead 55A and the inner bulkhead 55B, and the shapes which are engageable with each other are formed in the facing walls 56A and 56B, an underbody can be made common to different upper bodies.

Additionally, since the outer bulkhead 55A is formed with the convex portion 57A which is engageable with the inner bulkhead 55B, and a desired engagement force is obtained by engagement during assembly, a manufacturing process can also be simplified.

(Seventh Embodiment)

Figure 14:
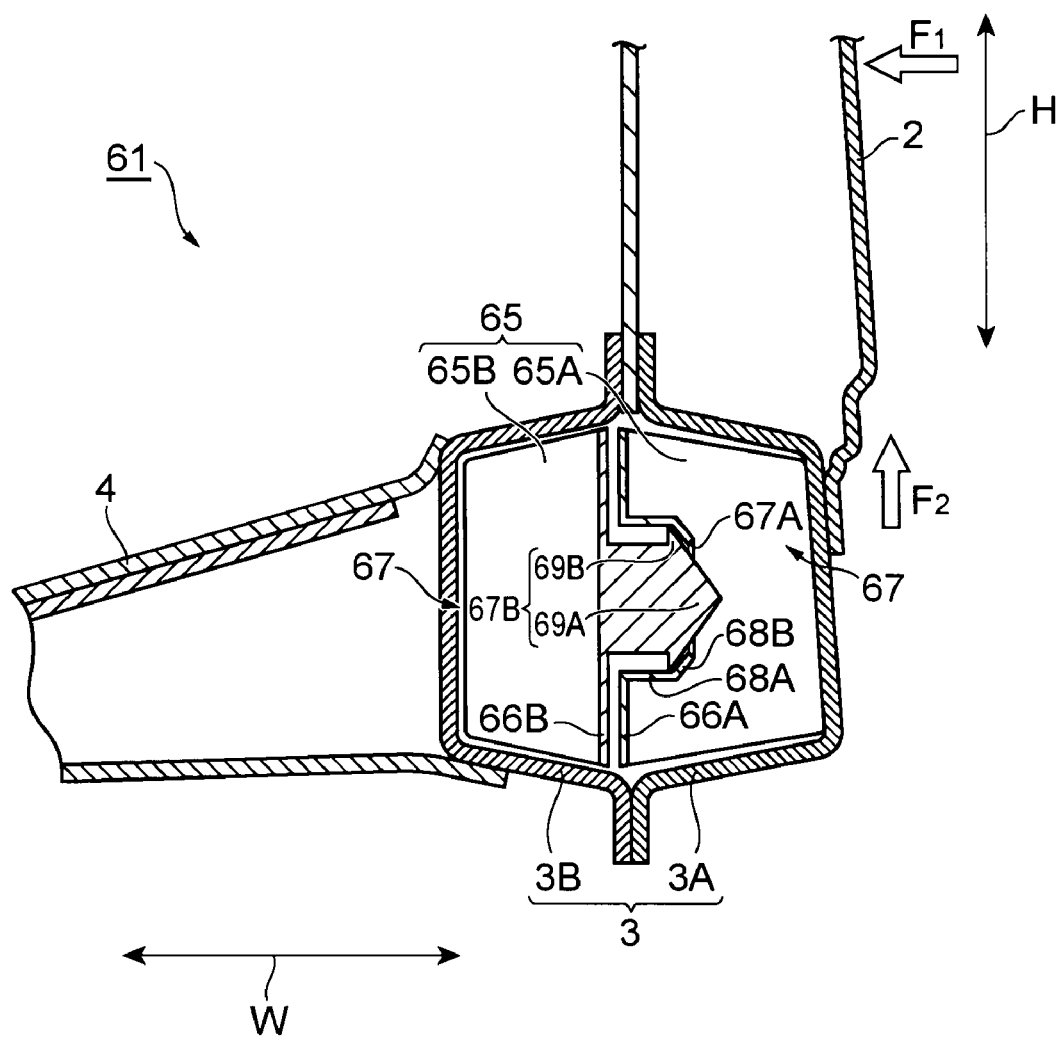
FIG. 14 is a sectional view showing a side part structure of a vehicle body related to a seventh embodiment of the invention, and showing a state before locking of proximity portions.
Figure 15:
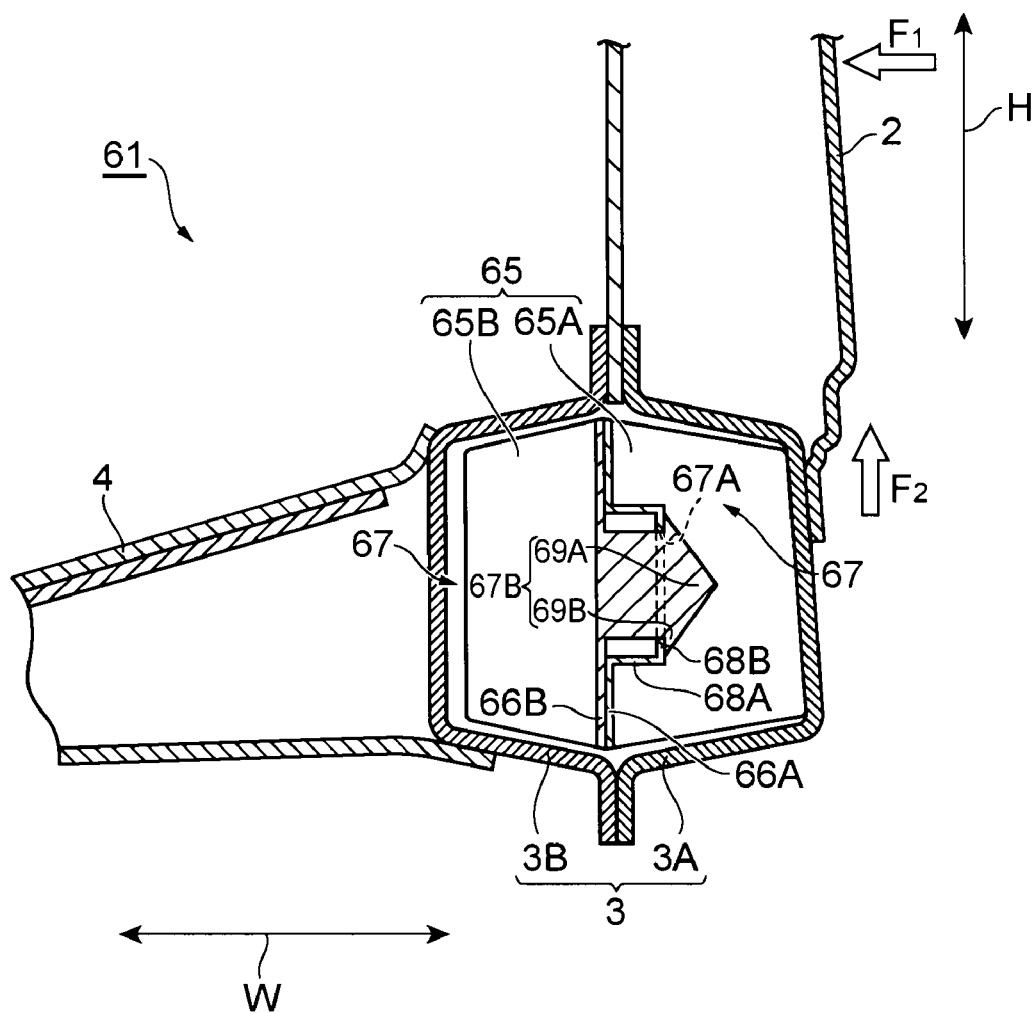
FIG. 15 is a sectional view showing the side part structure of a vehicle body related to the seventh embodiment of the invention, and showing a locking state of proximity portions.

FIG. 14 is a sectional view showing a side part structure of a vehicle body related to a seventh embodiment of the invention, and showing a state before locking of proximity portions, and FIG. 15 is a sectional view showing the side part structure of a vehicle body related to the seventh embodiment of the invention, and showing a locking state of the proximity portions. The side part structure 61 of the vehicle body of the seventh embodiment is different from the side part structure 51 of the vehicle body of the sixth embodiment in that the shapes of engageable proximity portions are different, specifically, a concave portion and an opening portion are arranged in an inverted manner.

As shown in FIGS. 14 and 15, the side part structure 61 of the vehicle body of the seventh embodiment includes a bulkhead 65 (a load transmission member) serving as a reinforcing member which is arranged inside the rocker 3 in the vicinity of a connection position (and/or a connection position between the floor cross member 4 and the inner rocker 3B) between the center pillar 2 and the outer rocker 3A. The bulkhead 65 has an outer bulkhead 65A (one of the first load transmission member and the second load transmission member, here the first load transmission member) joined to the inner surface of the outer rocker 3A, and an inner bulkhead 65B (the other of the first load transmission member and the second load transmission member, here the second load transmission member) joined to the inner surface of the inner rocker 3B. The outer bulkhead 65A has a facing wall 66A which faces the inner bulkhead 65B, and the inner bulkhead 65B has a facing wall 66B which faces the outer bulkhead 65A. That is, the outer bulkhead 65A and the inner bulkhead 65B are arranged so that the mutually facing walls 66A and 66B face each other.

The facing wall 66B of the inner bulkhead 65B is formed with a convex portion 67B which protrudes toward the outer bulkhead 65A, and is engageable with the outer bulkhead 65A. Additionally, the facing wall 66A of the outer bulkhead 65A is formed with an opening portion 67A corresponding to the convex portion 67B of the inner bulkhead 65B. The convex portion 67B and the opening portion 67A are formed substantially at the center of the bulkhead 65 in the vertical direction H and are made engageable with each other. Also, the opening portion 67A formed in the outer bulkhead 65A and the convex portion 67B formed on the inner bulkhead 65B constitute proximity portions 67 which are engageable with each other.

The convex portion 67B has an arrow-shaped tip portion 69A. The tip portion 69A is formed with a locking claw 68B which protrudes in a direction (vertical direction in the drawing) which intersects the vehicle width direction W.

The facing wall 66A is formed with a peripheral edge wall 68A which extends outward in the vehicle width direction W and surrounds the opening portion 67A. A locking piece 68B which has flexibility and locks the locking claw 69B of the convex portion 67B is formed at the outside end of the peripheral edge wall 68A in the vehicle width direction W. The locking piece 68B is formed so as to be bent inward of the opening portion 67A from the peripheral edge wall 68A.

Next, the dispersing action of a collision load when a vehicle including the side part structure 61 of the vehicle body constructed in this way undergoes a side collision will be described. As shown in FIG. 14, for example, when a load $F_1$ is input to the center pillar 2 due to a side collision, an upward tensile load $F_2$ is input to the outer rocker 3A, and the load input to the outer rocker 3A is transmitted to the outer bulkhead 65A.

The outer bulkhead 65A is pushed inward and moves toward the inner bulkhead 65B, due to a load in the vehicle width direction W in an early stage of collision, and as shown in FIG. 15, the convex portion 67B enters and is locked to the opening portion 67A. Specifically, the locking piece 68B moves inward in the vehicle width direction W over the locking claw 69B, and the locking claw 69B is locked to the locking piece 68B, whereby the collision load is transmitted to the inner bulkhead 65B. That is, the outer bulkhead 65A and the inner bulkhead 65B reliably mesh into each other, whereby the load is reliably transmitted. For this reason, the convex portion 67B and the opening portion 67A are locked to each other, so that it is possible to suppress the movement such that a lower end of the outer rocker 3A and a lower end of the inner rocker 3B tend to separate from each other.

Also, the load transmitted to the inner bulkhead 65B is transmitted to the inner rocker 3B and the floor cross member 4, so that it is possible to efficiently disperse the collision load. According to such a side part structure of a vehicle body related to the seventh embodiment, since the outer bulkhead 65A and the inner bulkhead 65B reliably mesh into each other and do not easily come apart, a reaction force can be further increased and a load caused by a side collision can be reliably dispersed to a skeleton member of the vehicle body.

Additionally, since the outer bulkhead 65A and the inner bulkhead 65B have the facing walls 66A and 66B and are adapted to be engageable with each other, the cross-sectional collapse of the bulkhead 65 can be prevented, and the transmission of a load to the floor cross member 4 can be efficiently performed.

Additionally, since the bulkhead 65 is split into the outer bulkhead 65A and the inner bulkhead 65B, and the shapes which are engageable with each other are formed in the facing walls 66A and 66B, an underbody can be made common to different upper bodies.

Additionally, since the inner bulkhead 65B is formed with the convex portion 67B which is engageable with the outer bulkhead 65A, and a desired engagement force is obtained by engagement during assembly, a manufacturing process can also be simplified.

(Eighth Embodiment)

Figure 16:
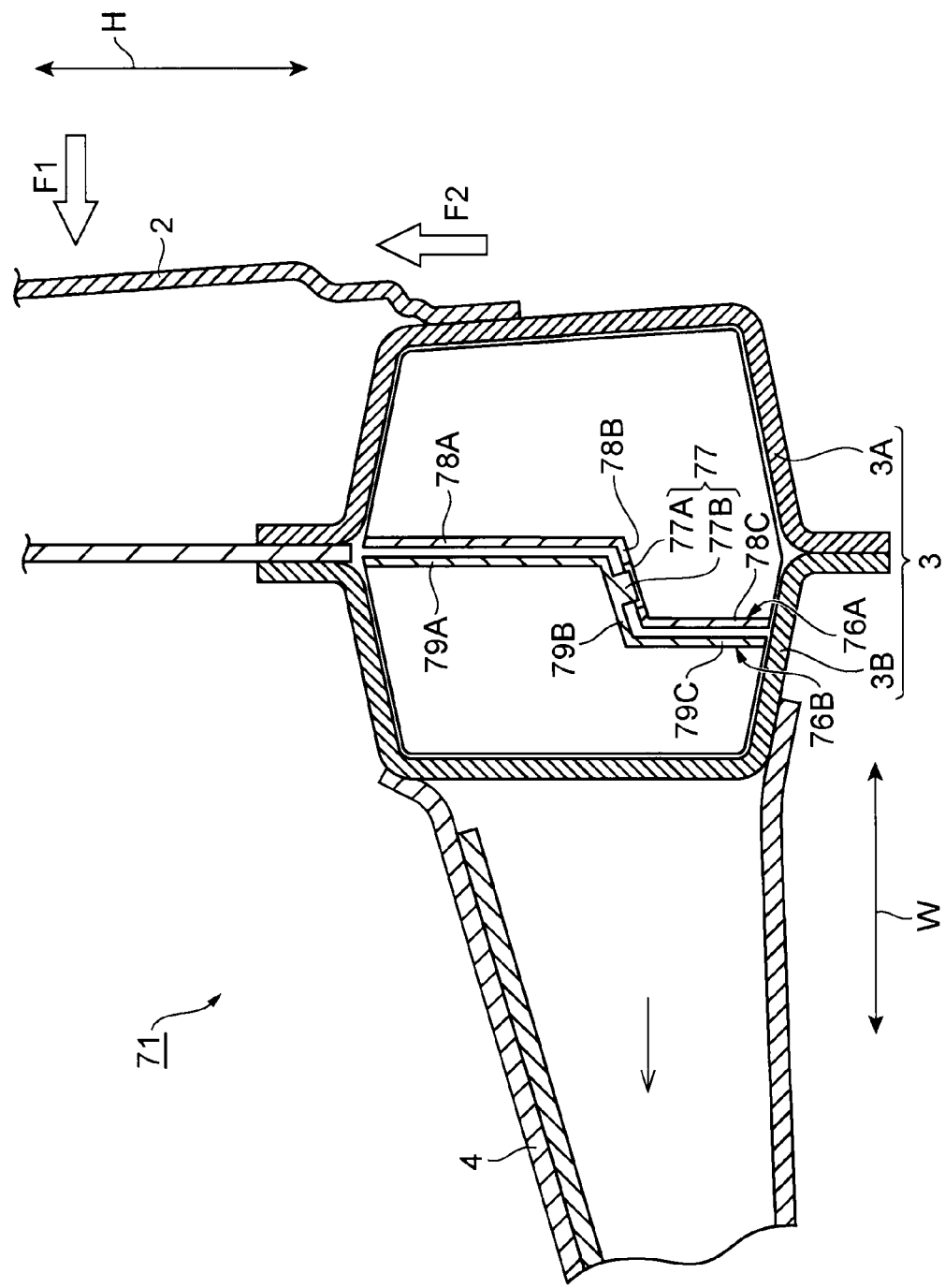
FIG. 16 is a sectional view showing a side part structure of a vehicle body related to an eighth embodiment of the invention.
Figure 17:
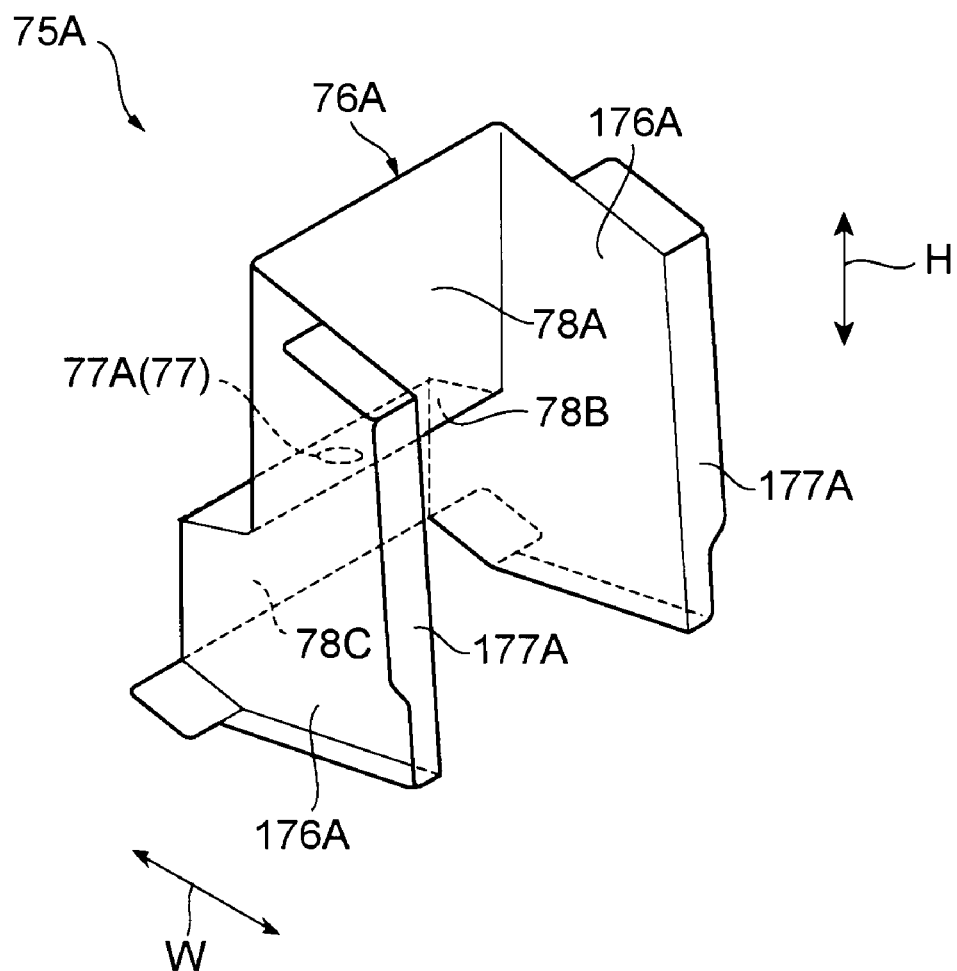
FIG. 17 is a schematic perspective view showing an outer bulkhead in FIG. 16.
Figure 18:
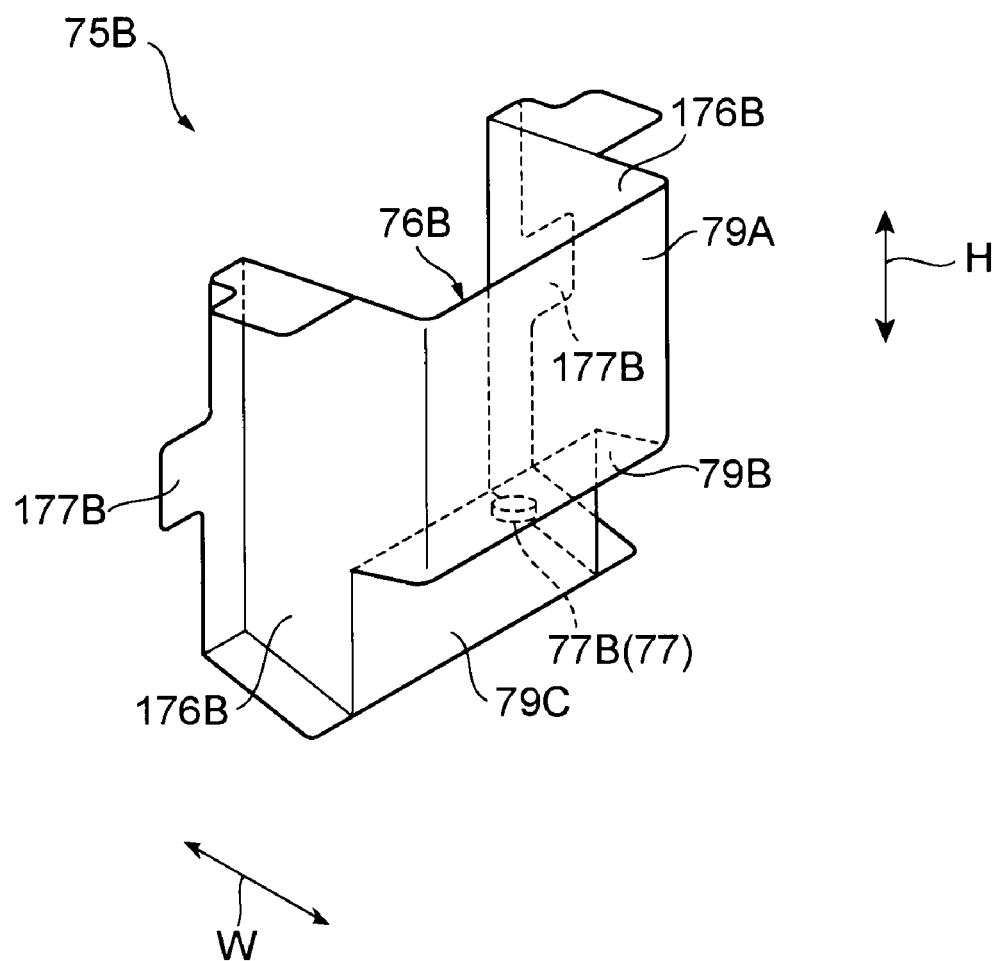
FIG. 18 is a schematic perspective view showing an inner bulkhead in FIG. 16.

FIG. 16 is a sectional view showing a side part structure of a vehicle body related to an eighth embodiment of the invention, FIG. 17 is a schematic perspective view showing an outer bulkhead in FIG. 16, and FIG. 18 is a schematic perspective view showing an inner bulkhead in FIG. 16. The side part structure 71 of the vehicle body of the eighth embodiment is different from the side part structure 1 of the vehicle body of the first embodiment in that the shapes of engageable proximity portions are different.

As shown in FIG. 16, the side part structure 71 of the vehicle body of the eighth embodiment includes a bulkhead 75 (a load transmission member) serving as a reinforcing member which is arranged inside the rocker 3 in the vicinity of a connection position (and/or a connection position between the floor cross member 4 and the inner rocker 3B) between the center pillar 2 and the outer rocker 3A. The bulkhead 75 has an outer bulkhead 75A (one of the first load transmission member and the second load transmission member, here the first load transmission member) joined to the inner surface of the outer rocker 3A, and an inner bulkhead 75B (the other of the first load transmission member and the second load transmission member, here the second load transmission member) joined to the inner surface of the inner rocker 3B. The outer bulkhead 75A has a facing wall 76A which faces the inner bulkhead 75B, and the inner bulkhead 75B has a facing wall 76B which faces the outer bulkhead 75A. That is, the outer bulkhead 75A and the inner bulkhead 75B are arranged so that the mutually facing walls 76A and 76B face each other.

The facing wall 76A of the outer bulkhead 75A, as shown in FIGS. 16 and 17, has an upper wall 78A which extends in the vertical direction H at an upper portion of the outer bulkhead 75A, an intermediate wall 78B which is bent inward in the vehicle width direction W from a lower end of the upper wall 78A, and a lower wall 78C which is bent downward from the inside of the intermediate wall 78B in the vehicle width direction W and extends in the vertical direction H.

A lower end of the upper wall 78A is located, for example, substantially at the center of the rocker 3 in the vertical direction H. The intermediate wall 78B is bent inward in the vehicle width direction W from the lower end of the upper wall 78A, and the intermediate wall 78B is inclined so that the end of the intermediate wall 78B on the inside in the vehicle width direction W is lower than the outside end of the intermediate wall. Additionally, the intermediate wall 78B is formed with an opening portion 77A. The opening portion 77A is formed at a position where a convex portion 77B (which will be described later) of the inner bulkhead 75B is engageable therewith.

Additionally, as shown in FIG. 17, the outer bulkhead 75A includes side walls 176A which are bent from both ends (in the anteroposterior direction of a vehicle) of the facing wall 76A, and extend in the vehicle width direction W. A joining piece 177A joined to the outer rocker 3A is bent and formed at a peripheral edge of the side wall 176A. The joining piece 177A is fixed to an inner surface of the outer rocker 3A by, for example, welding.

The facing wall 76B of the inner bulkhead 75B, as shown in FIGS. 16 and 18, has an upper wall 79A which extends in the vertical direction H at an upper portion of the inner bulkhead 75B, an intermediate wall 79B which is bent inward in the vehicle width direction W from a lower end of the upper wall 79A, and a lower wall 79C which is bent downward from the inside of the intermediate wall 79B in the vehicle width direction W and extends in the vertical direction H.

A lower end of the upper wall 79A is located, for example, substantially at the center of the rocker 3 in the vertical direction H. The intermediate wall 79B is bent inward in the vehicle width direction W from the lower end of the upper wall 79A, and the intermediate wall 79B is inclined so that the inside end of the intermediate wall 79B in the vehicle width direction W is lower than the outside end of the intermediate wall. Additionally, the intermediate wall 79B is formed with a convex portion 77B. The convex portion 77B is made engageable with the opening portion 77A formed in the outer bulkhead 75A.

Additionally, as shown in FIG. 18, the inner bulkhead 75B includes side walls 176B which are bent from both ends (in the anteroposterior direction of a vehicle) of the facing wall 76B, and extend in the vehicle width direction W. A joining piece 177B joined to the inner rocker 3B is bent and formed at a peripheral edge of the side wall 176B. The joining piece 177B is fixed to an inner surface of the inner rocker 3B by, for example, welding.

Also, the upper wall 78A and the upper wall 79A face each other, the intermediate wall 78B and the intermediate wall 79B face each other, and the lower wall 78C and the lower wall 79C face each other. Also, the opening portion 77A formed in the intermediate wall 78B of the outer bulkhead 75A and the convex portion 77B formed on the intermediate wall 79D of the inner bulkhead 75B constitute proximity portions 77 which are engageable with each other. Additionally, the opening portion 77A and the convex portion 77B are formed at positions separated from the center of the bulkhead 75. Additionally, it is preferable that the opening portion 77A and the convex portion 77B be arranged lower than the center of the bulkhead 75 and further inside in the vehicle width direction W than the center of the bulkhead.

Next, the dispersing action of a collision load when a vehicle including the side part structure 71 of the vehicle body constructed in this way undergoes a side collision will be described. As shown in FIG. 16, for example, when a load $F_1$ is input to the center pillar 2 due to a side collision, an upward tensile load $F_2$ is input to the outer rocker 3A, and the load input to the outer rocker 3A is transmitted to the outer bulkhead 75A.

When the tensile load $F_2$ is input to the outer bulkhead 75A, the convex portion 77B of the inner bulkhead 75B is locked to the opening portion 77A of the outer bulkhead 75A, and the mutually facing walls 76A and 76B are brought into contact with each other, whereby the collision load is transmitted to the inner bulkhead 75B. That is, the upper end of the upper wall 78A is pressed against the upper end of the upper wall 79A, whereby the load is reliably transmitted. Additionally, the convex portion 77B is locked to the opening portion 77A, the movement of the lower side of the outer bulkhead 75A separated outward in the vehicle width direction W is suppressed, and the upward movement of the whole outer bulkhead 75A is suppressed. Additionally, the opening portion 77A and the convex portion 77B are locked to each other, so that it is possible to suppress the movement such that a lower end of the outer rocker 3A and a lower end of the inner rocker 3B tend to separate from each other.

Also, the load transmitted to the inner bulkhead 75B is transmitted to the inner rocker 3B and the floor cross member 4, so that it is possible to efficiently disperse the collision load. According to such a side part structure 71 of a vehicle body related to the eighth embodiment, a reaction force at a collision can be increased and a load caused by a side collision can be reliably dispersed to a skeleton member of the vehicle body.

Additionally, since the outer bulkhead 75A and the inner bulkhead 75B have the facing walls 76A and 76B and are adapted to be engageable with each other, the cross-sectional collapse of the bulkhead 75 can be prevented, and the transmission of a load to the floor cross member 4 can be efficiently performed.

Additionally, since the bulkhead 75 is split into the outer bulkhead 75A and the inner bulkhead 75B, and the shapes which are engageable with each other are formed in the facing walls 76A and 76B, an underbody can be made common to different upper bodies.

In addition, in the above eighth embodiment, the outer bulkhead 75A is formed with the opening portion 77A and the inner bulkhead 75B is formed with the convex portion 77B. However, the outer bulkhead may be formed with a convex portion, and the inner bulkhead 75B may be formed with an opening portion. Additionally, a concave portion may be formed instead of the opening portion.

Additionally, since the inner bulkhead 75B is formed with the convex portion 77B which is engageable with the outer bulkhead 75A, and a desired engagement force is obtained by engagement during assembly, a manufacturing process can also be simplified.

(Ninth Embodiment)

Figure 19:
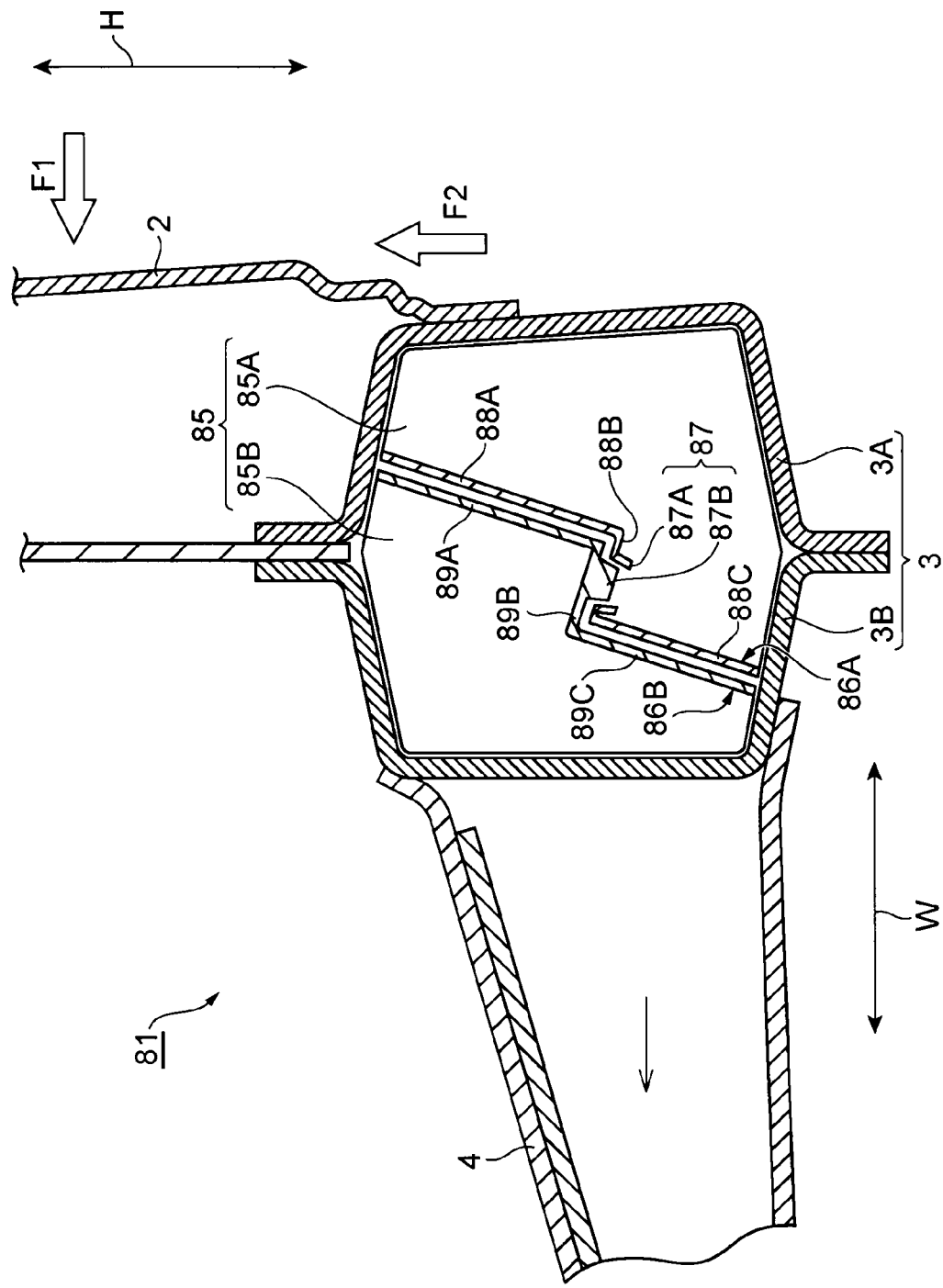
FIG. 19 is a sectional view showing a side part structure of a vehicle body related to a ninth embodiment of the invention.
Figure 20:
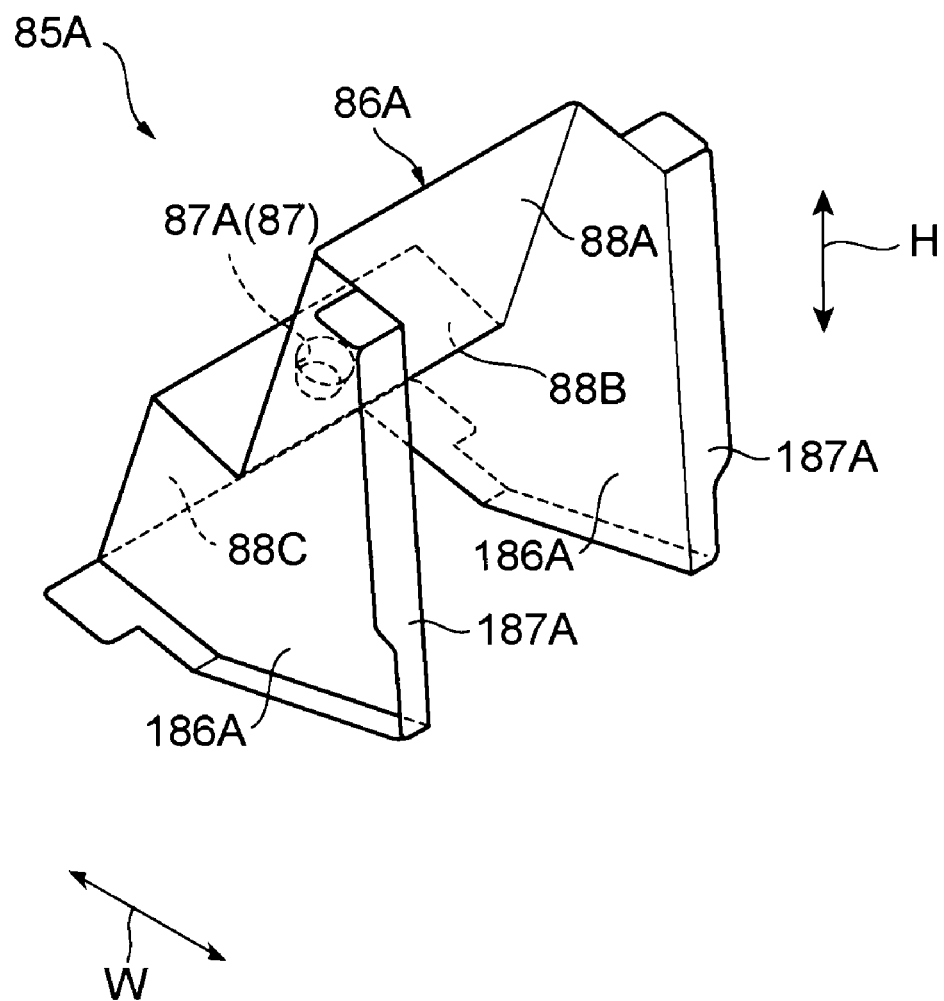
FIG. 20 is a schematic perspective view showing an outer bulkhead in FIG. 19.
Figure 21:
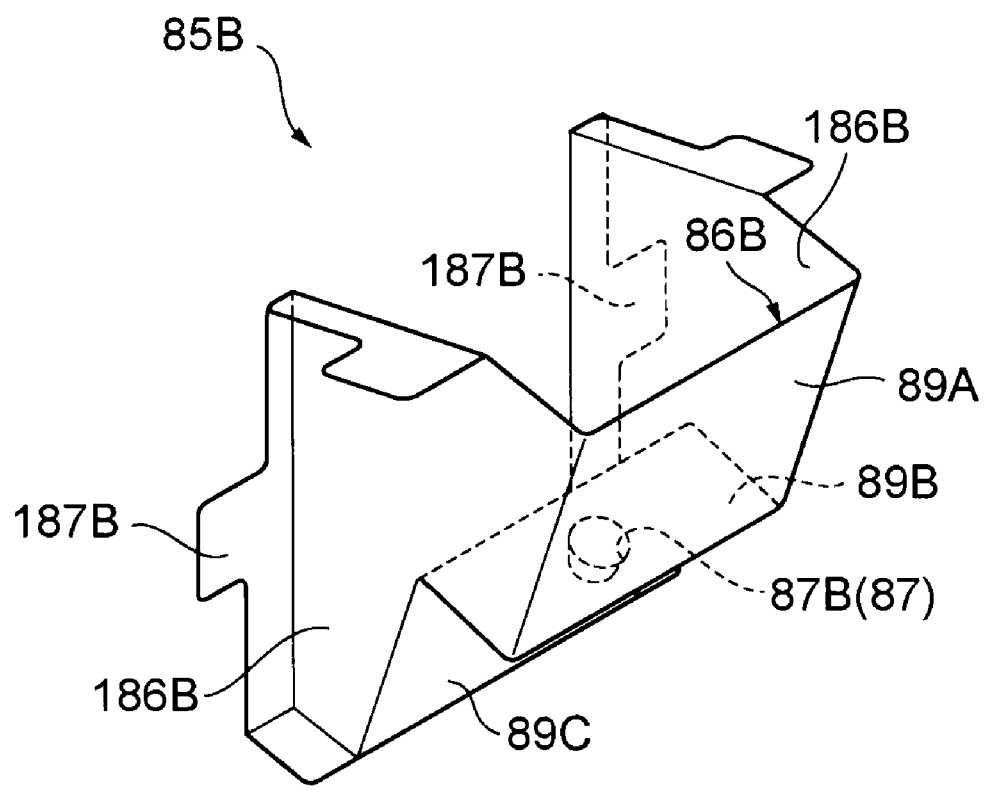
FIG. 21 is a schematic perspective view showing an inner bulkhead in FIG. 19.

FIG. 19 is a sectional view showing a side part structure of a vehicle body related to a ninth embodiment of the invention, FIG. 20 is a schematic perspective view showing an outer bulkhead in FIG. 19, and FIG. 21 is a schematic perspective view showing an inner bulkhead in FIG. 19. The side part structure 81 of the vehicle body of the ninth embodiment is different from the side part structure 1 of the vehicle body of the first embodiment in that the shapes of engageable proximity portions are different.

As shown in FIG. 19, the side part structure 81 of the vehicle body of the ninth embodiment includes a bulkhead 85 (a load transmission member) serving as a reinforcing member which is arranged inside the rocker 3 in the vicinity of a connection position (and/or a connection position between the floor cross member 4 and the inner rocker 3B) between the center pillar 2 and the outer rocker 3A. The bulkhead 85 has an outer bulkhead 85A (one of the first load transmission member and the second load transmission member, here the first load transmission member) joined to the inner surface of the outer rocker 3A, and an inner bulkhead 85B (the other of the first load transmission member and the second load transmission member, here the second load transmission member) joined to the inner surface of the inner rocker 3B. The outer bulkhead 85A has a facing wall 86A which faces the inner bulkhead 85B, and the inner bulkhead 85B has a facing wall 86B which faces the outer bulkhead 85A. That is, the outer bulkhead 85A and the inner bulkhead 85B are arranged so that the mutually facing walls 86A and 86B face each other.

The facing wall 86A of the outer bulkhead 85A, as shown in FIGS. 19 and 20, has an upper wall 88A which is obliquely arranged at an upper portion of the outer bulkhead 85A, an intermediate wall 88B which is bent inward in the vehicle width direction W from a lower end of the upper wall 88A, and a lower wall 88C which is bent downward from the inside of the intermediate wall 88B in the vehicle width direction W and is obliquely arranged.

The upper wall 88A is inclined so that the upper end side of the upper wall 88A is located further outside in the vehicle width direction W than the lower end side of the upper wall. The intermediate wall 88B is bent inward in the vehicle width direction W from the lower end of the upper wall 88A, and is inclined so that the inside end of the intermediate wall 88B in the vehicle width direction W is higher than the outside end of the intermediate wall. Additionally, the intermediate wall 88B is formed with an opening portion 87A. The opening portion 87A is formed at a position where a convex portion 87B (which will be described later) of the inner bulkhead 85B is engageable therewith. Additionally, the lower wall 88C is bent downward from the inside end of the intermediate wall 88B in the vehicle width direction W, and is inclined so that the lower end of the lower wall 88C is inclined so as to be further inside in the vehicle width direction than the upper end of the lower wall.

Additionally, as shown in FIG. 20, the outer bulkhead 85A includes side walls 186A which are bent from both ends (in the anteroposterior direction of a vehicle) of the facing wall 86A, and extend in the vehicle width direction W. A joining piece 187A joined to the outer rocker 3A is bent and formed at a peripheral edge of the side wall 186A. The joining piece 187A is fixed to an inner surface of the outer rocker 3A by, for example, welding.

The facing wall 86B of the inner bulkhead 85B, as shown in FIGS. 19 and 21, has an upper wall 89A which is obliquely arranged at an upper portion of the inner bulkhead 85B, an intermediate wall 89B which is bent inward in the vehicle width direction W from a lower end of the upper wall 89A, and a lower wall 89C which is bent downward from the inside of the intermediate wall 89B in the vehicle width direction W and is obliquely arranged.

The upper wall 89A is inclined so that the upper end side of the upper wall 89A is located further outside in the vehicle width direction W than the lower end side of the upper wall. The intermediate wall 89B is bent inward in the vehicle width direction W from the lower end of the upper wall 89A, and is inclined so that the inside end of the intermediate wall 89B in the vehicle width direction W is higher than the outside end of the intermediate wall. Additionally, the intermediate wall 89B is formed with a convex portion 87B. The convex portion 87B is made engageable with the opening portion 87A formed in the outer bulkhead 85A. Additionally, the lower wall 89C is bent downward from the inside end of the intermediate wall 89B in the vehicle width direction W, and is inclined so that the lower end of the lower wall 89C is located further inside in the vehicle width direction than the upper end of the lower wall. In addition, it is preferable that the convex portion 87B obliquely protrude inward in the vehicle width direction W than the lower side in the vertical direction H.

Additionally, as shown in FIG. 21, the inner bulkhead 85B includes side walls 186B which are bent from both ends (in the anteroposterior direction of a vehicle) of the facing wall 86B, and extend in the vehicle width direction W. A joining piece 187B joined to the inner rocker 3B is bent and formed at a peripheral edge of the side wall 186B. The joining piece 187B is fixed to an inner surface of the inner rocker 3B by, for example, welding.

Also, the upper wall 88A and the upper wall 89A face each other, the intermediate wall 88B and the intermediate wall 89B face each other, and the lower wall 88C and the lower wall 89C face each other. Also, the opening portion 87A formed in the intermediate wall 88B of the outer bulkhead 85A and the convex portion 87B formed on the intermediate wall 89D of the inner bulkhead 85B constitute proximity portions 87 which are engageable with each other. Additionally, it is preferable that the opening portion 87A and the convex portion 87B be arranged lower than the center of the bulkhead 85 and further inside in the vehicle width direction W than the center of the bulkhead.

Next, the dispersing action of a collision load when a vehicle including the side part structure 81 of the vehicle body constructed in this way undergoes a side collision will be described. As shown in FIG. 19, for example, when a load $F_1$ is input to the center pillar 2 due to a side collision, an upward tensile load $F_2$ is input to the outer rocker 3A, and the load input to the outer rocker 3A is transmitted to the outer bulkhead 85A.

When the tensile load $F_2$ is input to the outer bulkhead 85A, the convex portion 87B of the inner bulkhead 85B is locked to the opening portion 87A of the outer bulkhead 85A, and the mutually facing walls 86A and 86B are brought into contact with each other, whereby the collision load is transmitted to the inner bulkhead 85B. That is, the upper end of the upper wall 88A is pressed against the upper end of the upper wall 89A, whereby the load is reliably transmitted. Additionally, the convex portion 87B is locked to the opening portion 87A, the movement of the lower side of the outer bulkhead 85A separated outward in the vehicle width direction W is suppressed, and the upward movement of the whole outer bulkhead 85A is suppressed. Additionally, the opening portion 87A and the convex portion 87B are locked to each other, so that it is possible to suppress the movement such that a lower end of the outer rocker 3A and a lower end of the inner rocker 3B tend to separate from each other.

Also, the load transmitted to the inner bulkhead 85B is transmitted to the inner rocker 3B and the floor cross member 4, so that it is possible to efficiently disperse the collision load. According to such a side part structure 81 of a vehicle body related to the ninth embodiment, a reaction force at a collision can be increased and a load caused by a side collision can be reliably dispersed to a skeleton member of the vehicle body.

Additionally, since the outer bulkhead 85A and the inner bulkhead 85B have the facing walls 86A and 86B and are adapted to be engageable with each other, the cross-sectional collapse of the bulkhead 85 can be prevented, and the transmission of a load to the floor cross member 4 can be efficiently performed.

Additionally, since the bulkhead 85 is split into the outer bulkhead 85A and the inner bulkhead 85B, and the shapes which are engageable with each other are formed in the facing walls 86A and 86B, an underbody can be made common to different upper bodies.

In addition, in the above ninth embodiment, the outer bulkhead 85A is formed with the opening portion 87A and the inner bulkhead 85B is formed with the convex portion 87B. However, the outer bulkhead 85A may be formed with a convex portion, and the inner bulkhead 85B may be formed with an opening portion. Additionally, a concave portion may be formed instead of the opening portion.

Additionally, since the inner bulkhead 85B is formed with the convex portion 87B which is engageable with the outer bulkhead 85A, and a desired engagement force is obtained by engagement during assembly, a manufacturing process can also be simplified.

(Tenth Embodiment)

Figure 22:
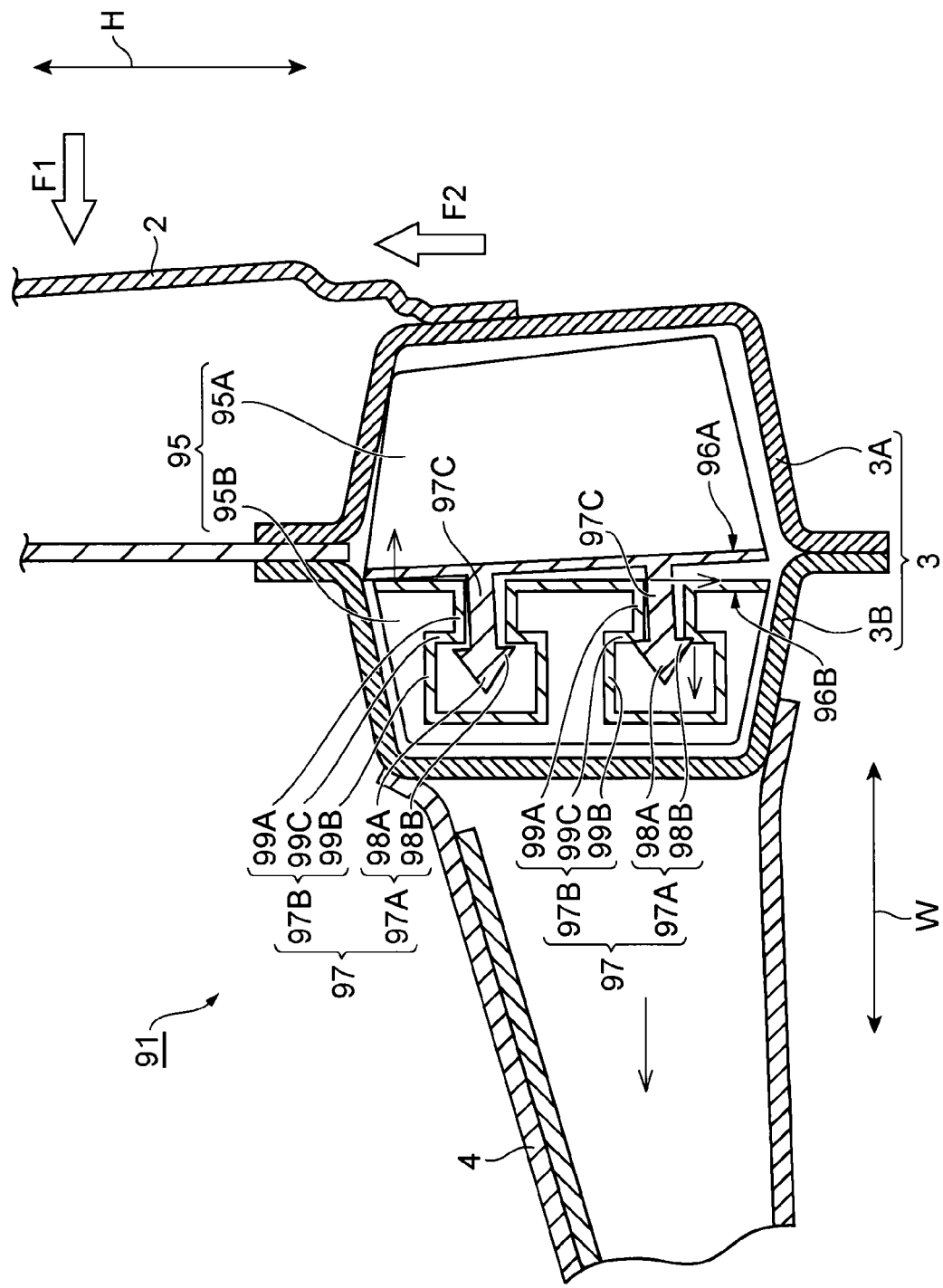
FIG. 22 is a sectional view showing a side part structure of a vehicle body related to a tenth embodiment of the invention.

FIG. 22 is a sectional view showing a side part structure of a vehicle body according to a tenth embodiment of the invention. The side part structure 91 of the vehicle body of the tenth embodiment is different from the side part structure 1 of the vehicle body of the first embodiment in that the shapes of engageable proximity portions are different.

As shown in FIG. 22, the side part structure 91 of the vehicle body of the tenth embodiment includes a bulkhead 95 (a load transmission member) serving as a reinforcing member which is arranged inside the rocker 3 in the vicinity of a connection position (and/or a connection position between the floor cross member 4 and the inner rocker 3B) between the center pillar 2 and the outer rocker 3A. The bulkhead 95 has an outer bulkhead 95A (one of the first load transmission member and the second load transmission member, here the first load transmission member) joined to the inner surface of the outer rocker 3A, and an inner bulkhead 95B (the other of the first load transmission member and the second load transmission member, here the second load transmission member) joined to the inner surface of the inner rocker 3B. The outer bulkhead 95A has a facing wall 96A which faces the inner bulkhead 95B, and the inner bulkhead 95B has a facing wall 96B which faces the outer bulkhead 95A. That is, the outer bulkhead 95A and the inner bulkhead 95B are arranged so that the mutually facing walls 96A and 96B face each other. In addition, FIG. 22 shows a state where the outer bulkhead 95A is deformed due to a collision load. Additionally, deformation of the center pillar 2, the rocker 3, etc. is omitted for simplification of the drawing.

The facing wall 96A of the outer bulkhead 95A is formed with a convex portion 97A which protrudes toward the inner bulkhead 95B and is engageable with the inner bulkhead 95B. Additionally, the facing wall 96B of the inner bulkhead 95B is formed with a concave portion 97B corresponding to the convex portion 97A of the outer bulkhead 95A. Additionally, the convex portion 97A and the concave portion 97B are made engageable with each other and formed at positions deviated from the center of the bulkhead 95. In this embodiment, a plurality of the convex portions 97A and the concave portions 97B are juxtaposed in the vertical direction. Also, the convex portions 97A formed on the outer bulkhead 95A and the concave portions 97B formed in the inner bulkhead 95B constitute proximity portions 97 which are engageable with each other.

The convex portion 97A has an arrow-shaped tip portion 98A. The tip portion 98A is formed with a locking claw 98B which protrudes in a direction (vertical direction in the drawing) which intersects the vehicle width direction W. The locking claw 98B is adapted to be engageable with a stepped surface 99C formed in the concave portion 97B.

The concave portion 97B is formed inward in the vehicle width direction W from the facing wall 96B. The inner bulkhead 95B has peripheral edge walls 99A and 99B which extend in the vehicle width direction W to form the concave portion 97B. The stepped surface 99C is formed between the peripheral edge walls 99A and 99B. The locking claw 98B can be locked to the stepped surface 99C.

Additionally, in the vehicle width direction W, the peripheral edge wall 99A is arranged closer to the facing wall 96B, and the peripheral edge wall 99B is arranged farther from the facing wall 96B. In the vertical direction in the drawing, the width of the concave portion 97B formed by the peripheral edge wall 99A is made smaller than the width (the distance between the ends in the vertical direction in the drawing) of the locking claw 98B of the convex portion 97A. The peripheral edge wall 99A functions as a guide when the convex portion 97A is inserted into the concave portion 97B.

Next, the dispersing action of a collision load when a vehicle including the side part structure 91 of the vehicle body constructed in this way undergoes a side collision will be described. As shown in FIG. 22, for example, when a load $F_1$ is input to the center pillar 2 due to a side collision, an upward tensile load $F_2$ is input to the outer rocker 3A, and the load input to the outer rocker 3A is transmitted to the outer bulkhead 95A.

When the tensile load $F_2$ is input to the outer bulkhead 95A, the convex portion 97A of the inner bulkhead 95B is engaged with the concave portion 97B of the outer bulkhead 95A, and the mutually facing walls 96A and 96B are brought into contact with each other, whereby the collision load is transmitted to the inner bulkhead 95B. That is, the upper end of the facing wall 96A is pressed against the upper end of the facing wall 96B, whereby the load is reliably transmitted. Additionally, the locking claw 98B is locked to the stepped surface 99C, and a root portion 97C of the convex portion 97A is brought into contact with the peripheral edge wall 99A of the concave portion 97B. As a result, the movement of the lower side of the outer bulkhead 85A separated outward in the vehicle width direction W is suppressed, and the upward movement of the whole outer bulkhead 85A is suppressed. Additionally, the convex portion 97A and the concave portion 97B are locked to each other, so that it is possible to suppress the movement such that a lower end of the outer rocker 3A and a lower end of the inner rocker 3B tend to separate from each other.

Also, the load transmitted to the inner bulkhead 95B is transmitted to the inner rocker 3B and the floor cross member 4, so that it is possible to efficiently disperse the collision load. According to such a side part structure 91 of a vehicle body related to the tenth embodiment, a reaction force at a collision can be increased and a load caused by a side collision can be reliably dispersed to a skeleton member of the vehicle body.

Additionally, since the outer bulkhead 95A and the inner bulkhead 95B have the facing walls 96A and 96B and are adapted to be engageable with each other, the cross-sectional collapse of the bulkhead 95 can be prevented, and the transmission of a load to the floor cross member 4 can be efficiently performed.

Additionally, since the bulkhead 95 is split into the outer bulkhead 95A and the inner bulkhead 95B, and the shapes which are engageable with each other are formed in the facing walls 96A and 96B, an underbody can be made common to different upper bodies.

Additionally, since the outer bulkhead 95A is formed with the convex portion 97A which is engageable with the inner bulkhead 95B, and a desired engagement force is obtained by engagement during assembly, a manufacturing process can also be simplified.

(Eleventh Embodiment)

Figure 23:
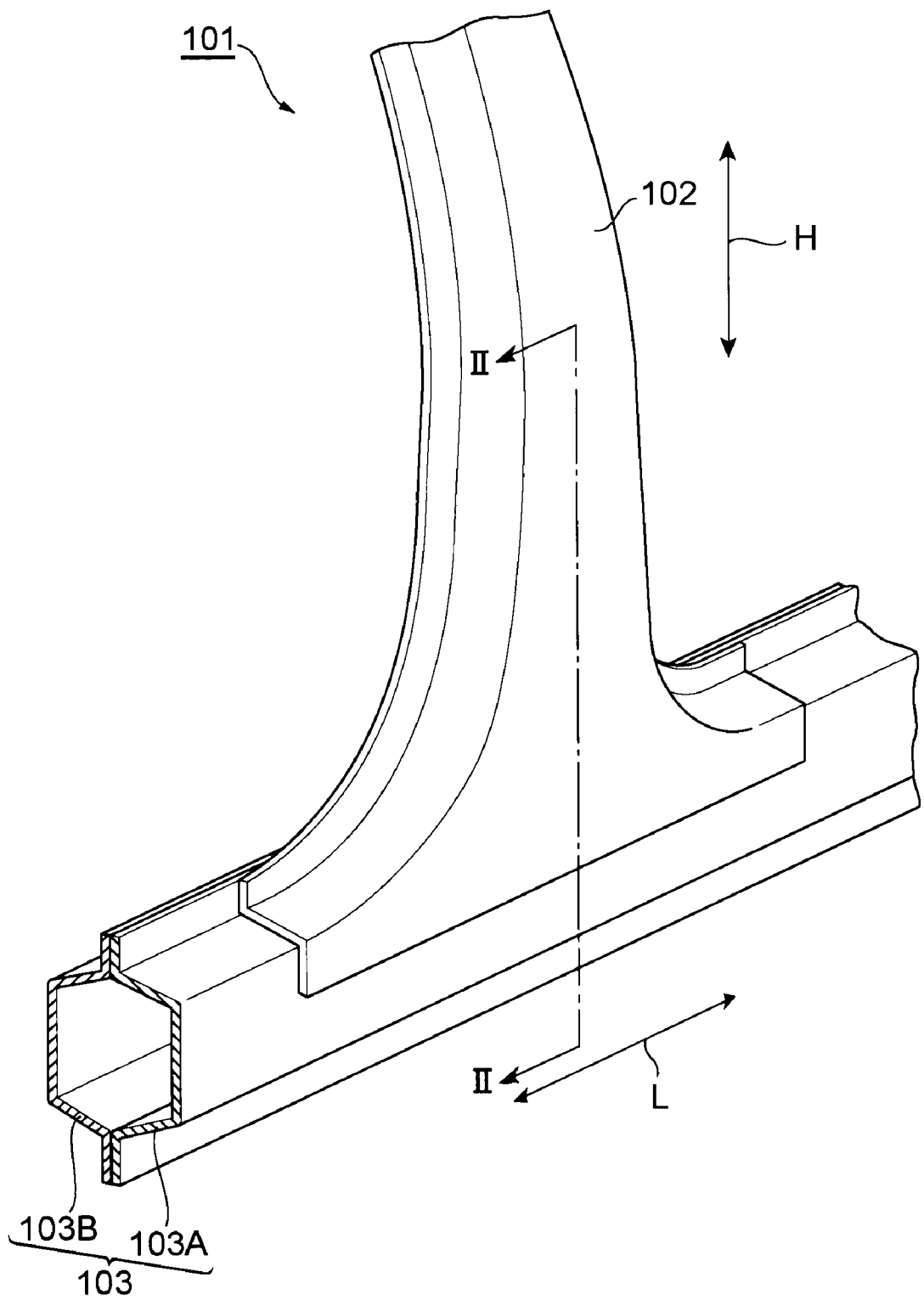
FIG. 23 is a perspective view showing a side part structure of a vehicle body related to an embodiment of the invention.

Next, a side part structure of a vehicle body related to an eleventh embodiment will be described. FIG. 23 is a perspective view showing a side part structure of a vehicle body related to an embodiment of the invention, and FIG. 24 is a sectional view showing the side part structure of a vehicle body related to the eleventh embodiment of the invention.

Figure 24:
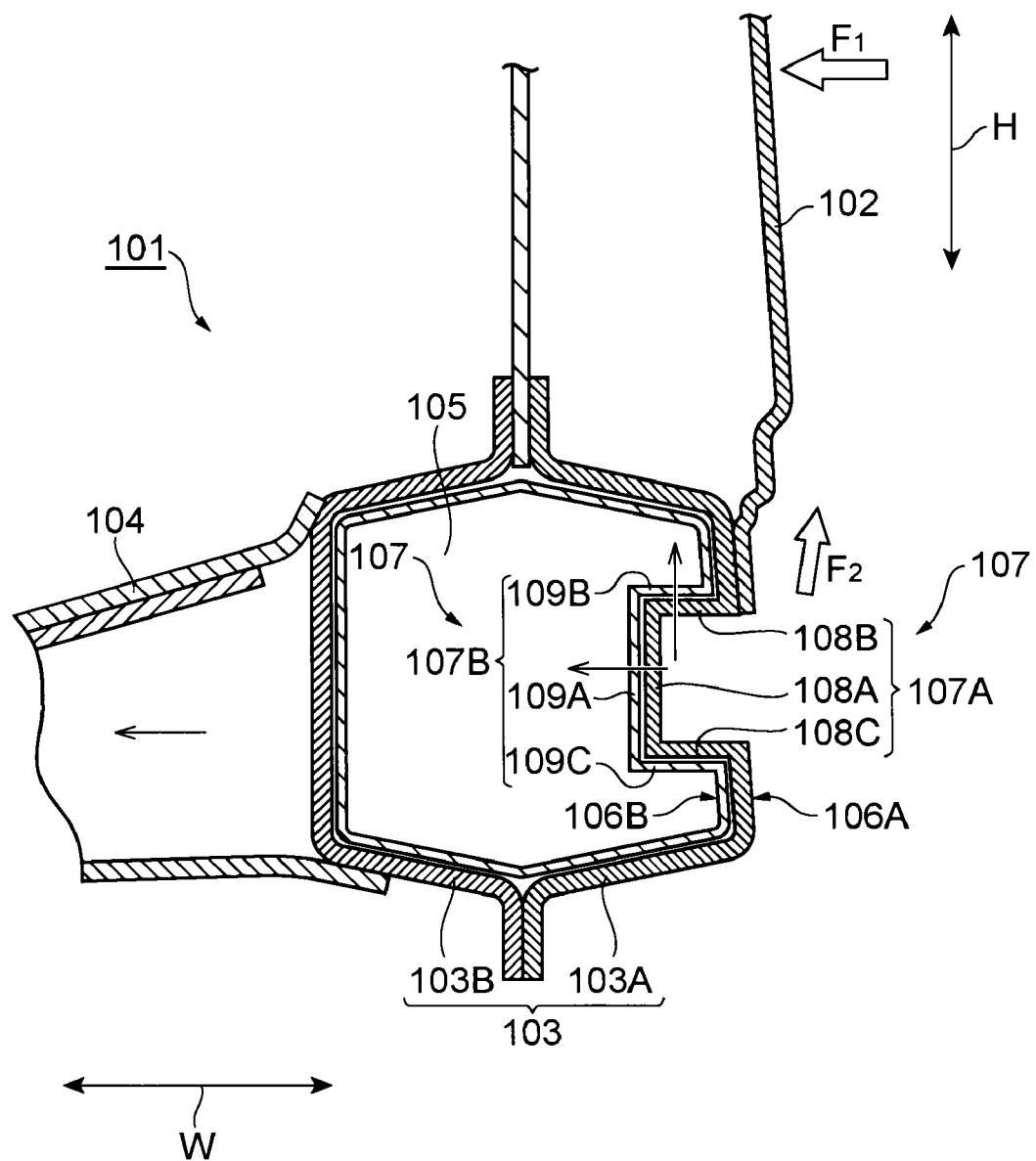
FIG. 24 is a sectional view showing a side part structure of a vehicle body related to an eleventh embodiment of the invention.

The side part structure 101 of the vehicle body shown in FIGS. 23 to 24 is, for example, a side part structure of a vehicle body, such as a passenger car (vehicle). The side part structure 101 of the vehicle body includes a rocker 103 joined to a lower end of a center pillar 102 which is arranged on both sides in a vehicle width direction W, and extends in a vertical direction H.

The rocker 103 is a hollow member with a substantially O-shaped cross-section which is arranged at a side part of the vehicle body and extends in a longitudinal direction L of the vehicle body. The rocker 103 has an outer rocker 103A which assumes a substantially U-shaped cross-section and is arranged outside in the vehicle width direction W, and an inner rocker 103B which assumes a substantially U-shaped cross-section and is arranged inside in the vehicle width direction W, and upper or lower ends (open ends) of the outer rocker 103A and the inner rocker 103B are joined to each other to form a hollow member. That is, the above cross-section of the rocker 103 includes a pair of the first opposed wall portions, and a pair of the second opposed wall portions which is formed as one end and the other end of each of the pair of first opposed wall portions are bent almost at a right angle in the same direction, and one ends and the other ends face each other and are joined together. Also, as shown in FIG. 24, the lower end of the center pillar 102 is joined to an outer surface of the outer rocker 103A, and a floor cross member 104 is joined to an outer surface (an inside surface in the vehicle width direction W) of the inner rocker 103B.

Inside the rocker 103, a bulkhead 105 (a load transmission member) serving as a reinforcing member which is joined to the inner rocker 103B (the first rocker member) is arranged in the vicinity of a connection position (and/or a connection position between the floor cross member 104 and the inner rocker 103B) between the center pillar 102 and the outer rocker 103A. The outer rocker 103A (the second rocker member) has a facing wall 106A which faces the bulkhead 105 and extends in the vertical direction H, and the bulkhead 105 has a facing wall 106B which faces the outer rocker 103A and extends in the vertical direction H. That is, the facing wall 106A of the outer rocker 103A and the facing wall 106B of the bulkhead 105 face each other.

The facing wall 106A of the outer rocker 103A is formed with a convex portion 107A which protrudes toward the bulkhead 105 and is engageable with the bulkhead 105 (in addition, in FIG. 23, illustration of the convex portion 107A is omitted for simplification of the drawing). Additionally, the facing wall 106B of the bulkhead 105 is formed with a concave portion 107B which is recessed inward in the vehicle width direction W. The convex portion 107A and the concave portion 107B are formed at the center of the bulkhead 105 in the vertical direction H and are made engageable with each other. Also, the convex portion 107A formed on the outer rocker 103A and the concave portion 107B formed in the bulkhead 105 constitute proximity portions 107 which are engageable with each other. In addition, the convex portion 107A and the concave portion 107B need not be formed at the center of the bulkhead 105 in the vertical direction H but, for example, may be formed below the center of the bulkhead 105.

The convex portion 107A has a vertical wall 108A which extends in the vertical direction H further inside in the vehicle width direction W than the facing wall 106A, an upper wall 108B which is bent outward at an upper end of the vertical wall 108A and extends in the vehicle width direction W, and a lower wall 108C which is bent outward at a lower end of the vertical wall 108A and extends in the vehicle width direction W. Additionally, the outside (right in the drawing) end of the upper wall 108B in the vehicle width direction W is bent upward, and the outside end of the lower wall 108C in the vehicle width direction W is bent downward, and is connected to a portion of the facing wall 106A. In addition, the shape of the convex portion 107A may be cylindrical, for example. In short, any arbitrary shapes which allow the engagement with the bulkhead 105 may be adopted.

The concave portion 107B has a vertical wall 109A which extends in the vertical direction H further inside in the vehicle width direction W than the facing wall 106B, an upper wall 109B which is bent outward at an upper end of the vertical wall 109A and extends in the vehicle width direction W, and a lower wall 109C which is bent outward at a lower end of the vertical wall 109A and extends in the vehicle width direction W. Additionally, the outside (right in the drawing) end of the upper wall 109B in the vehicle width direction W is bent upward, and the outside end of the lower wall 109C in the vehicle width direction W is bent downward, and constitutes a portion of the facing wall 106B.

Next, the dispersing action of a collision load when a vehicle including the side part structure 101 of the vehicle body constructed in this way undergoes a side collision will be described. As shown in FIG. 24, for example, when a load $F_1$ is input to the center pillar 102 due to a side collision, an upward tensile load $F_2$ is input to the outer rocker 103A.

When the tensile load $F_2$ is input to the outer rocker 103A, the convex portion 107A of the outer rocker 103A is locked to the concave portion 107B of the bulkhead 105, and the mutually facing walls 106A and 106B are brought into contact with each other, whereby the collision load is transmitted to the bulkhead 105. That is, the upper walls 108B and 109B are brought into contact with each other, and the intermediate walls 108A and 109A are brought into contact with each other, whereby the load is reliably transmitted.

Also, the load transmitted to the bulkhead 105 is transmitted and efficiently dispersed to the inner rocker 103B and the floor cross member 104. According to such a side part structure 101 of a vehicle body related to the eleventh embodiment, a reaction force at a collision can be increased and a load caused by a side collision can be reliably dispersed to a skeleton member of the vehicle body.

Additionally, since the outer rocker 103A has the facing wall 106A, the bulkhead 105 has the facing wall 106B, and the outer rocker and the bulkhead are adapted to be engageable with each other, it is possible to efficiently perform the load transmission to the floor cross member 104 from the center pillar 102, and it is possible to prevent the cross-sectional collapse of the rocker 103 and the bulkhead 105.

Additionally, since the outer rocker 103A is formed with the convex portion 107A which is engageable with the bulkhead 105, and a desired engagement force is obtained by engagement during assembly, a manufacturing process can also be simplified.

(Twelfth Embodiment)

Figure 25:
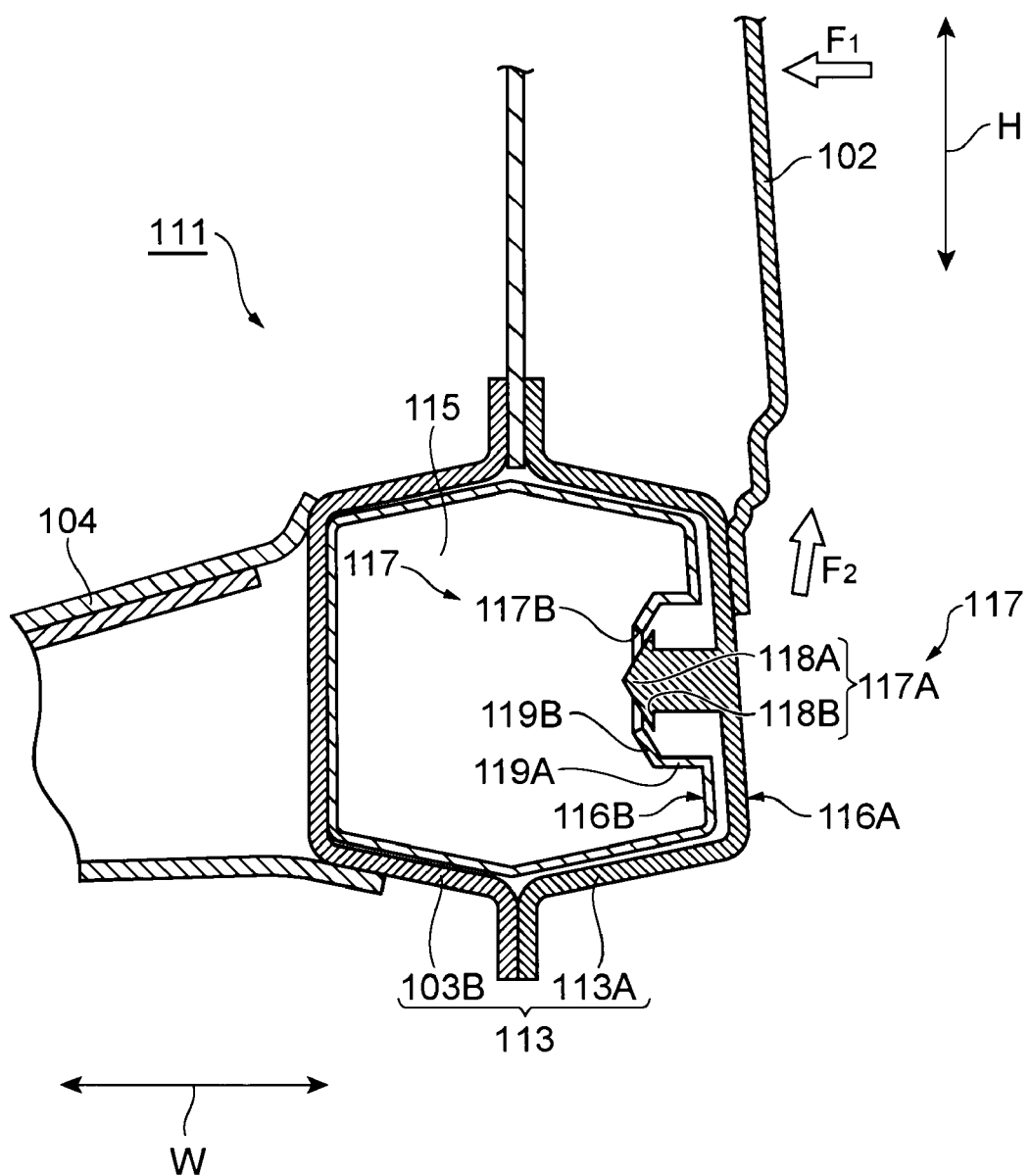
FIG. 25 is a sectional view showing a side part structure of a vehicle body related to a twelfth embodiment of the invention, and showing a state before locking of proximity portions.
Figure 26:
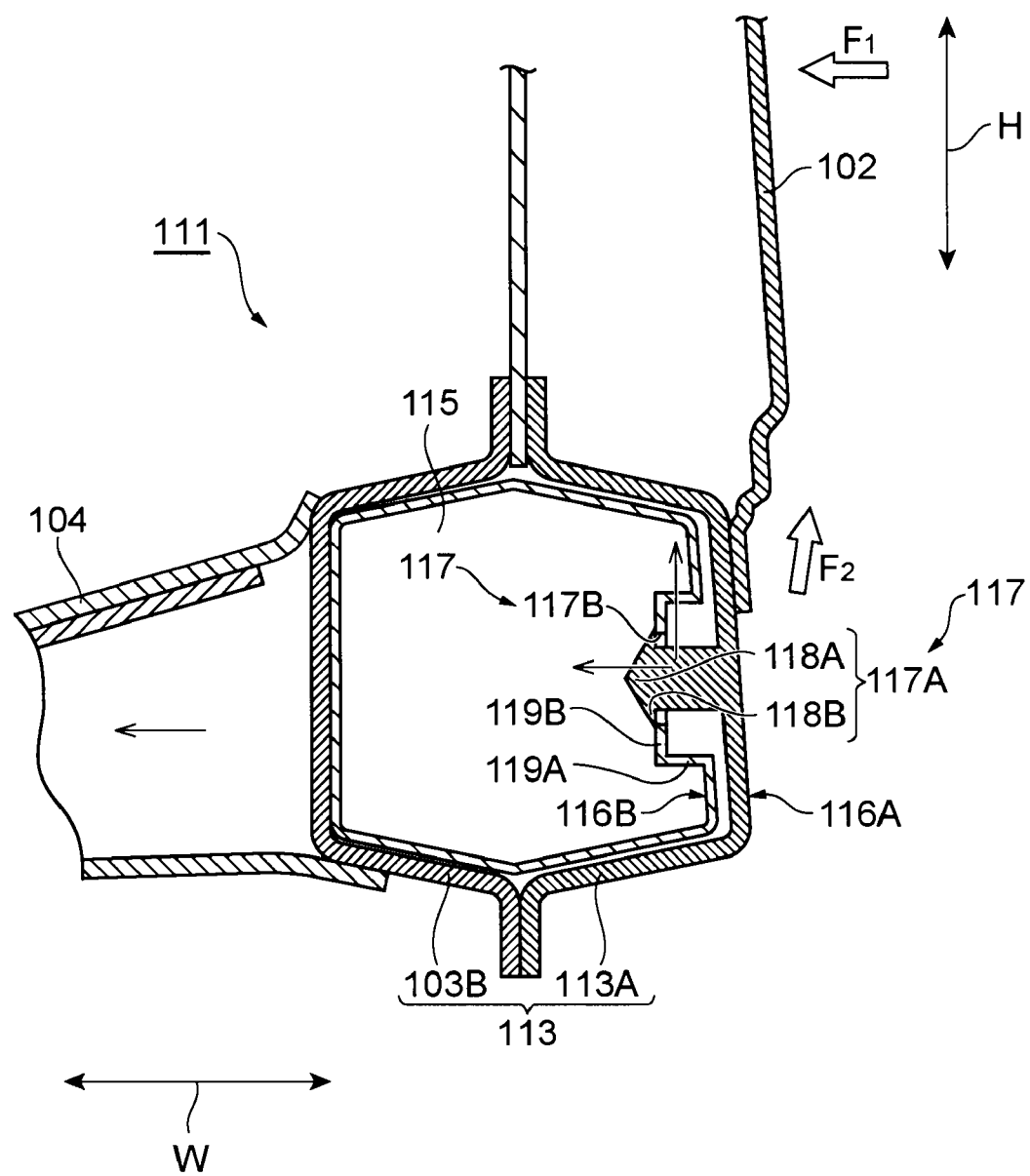
FIG. 26 is a sectional view showing the side part structure of a vehicle body related to the twelfth embodiment of the invention, and showing a locking state of the proximity portions.

FIG. 25 is a sectional view showing a side part structure of a vehicle body related to a twelfth embodiment of the invention, and showing a state before locking of proximity portions, and FIG. 26 is a sectional view showing the side part structure of a vehicle body related to the twelfth embodiment of the invention, and showing a locking state of the proximity portions. The side part structure 111 of the vehicle body of the twelfth embodiment is different from the side part structure 101 of the vehicle body of the eleventh embodiment in that the shapes of engageable proximity portions are different. As shown in FIGS. 25 and 26, the side part structure 111 of the vehicle body of the twelfth embodiment includes a rocker 113 joined to a lower end of a center pillar 102 which is arranged on both sides in a vehicle width direction W, and extends in a vertical direction H.

The rocker 113 is a hollow member with a substantially O-shaped cross-section which is arranged at a side part of the vehicle body and extends in a anteroposterior direction L of the vehicle body. The rocker 113 has an outer rocker 113A which assumes a substantially U-shaped cross-section and is arranged outside in the vehicle width direction W, and an inner rocker 103B which assumes a substantially U-shaped cross-section and is arranged inside in the vehicle width direction W, and upper or lower ends of the outer rocker 113A and the inner rocker 103B are joined to each other to form a hollow member. Also, the lower end of the center pillar 102 is joined to an outer surface of the outer rocker 113A, and a floor cross member 104 is joined to an outer surface (an inside surface in the vehicle width direction W) of the inner rocker 103B.

A bulkhead 115 (a load transmission member) serving as a reinforcing member which is joined to the inner rocker 103B (the first rocker member) is arranged inside the rocker 113 in the vicinity of a connection position (and/or a connection position between the floor cross member 104 and the inner rocker 103B) between the center pillar 102 and the outer rocker 103A. The outer rocker 113A (the second rocker member) has a facing wall 116A which faces the bulkhead 115 and extends in the vertical direction H, and the bulkhead 115 has a facing wall 116B which faces the outer rocker 113A and extends in the vertical direction H. That is, the facing wall 116A of the outer rocker 113A and the facing wall 116B of the bulkhead 115 face each other.

The facing wall 116A of the outer rocker 113A is formed with a convex portion 117A which protrudes toward the bulkhead 115 and is engageable with the bulkhead 115. Additionally, the facing wall 116B of the bulkhead 115 is formed with an opening portion 117B corresponding to the convex portion 117A of the outer rocker 113A. The convex portion 117A and the opening portion 117B are formed at the center of the bulkhead 115 in the vertical direction H and are made engageable with each other. Also, the convex portion 117A formed on the outer rocker 113A and the opening portion 117B formed in the bulkhead 115 constitute proximity portions 117 which are engageable with each other.

The convex portion 117A has an arrow-shaped tip portion 118A. The tip portion 118A is formed with a locking claw 118B which protrudes in a direction (vertical direction in the drawing) which intersects the vehicle width direction W.

The facing wall 116B is formed with a peripheral edge wall 119A which extends inward in the vehicle width direction W and surrounds the opening portion 117B. A locking piece 119B which has flexibility and locks the locking claw 118B of the convex portion 117A is formed at the inside end of the peripheral edge wall 119A in the vehicle width direction W. The locking piece 119B is formed so as to be bent inward of the opening portion 117B from the peripheral edge wall 119A.

Next, the dispersing action of a collision load when a vehicle including the side part structure 111 of the vehicle body constructed in this way undergoes a side collision will be described. As shown in FIG. 25, for example, when a load $F_1$ is input to the center pillar 102 due to a side collision, an upward tensile load $F_2$ is input to the outer rocker 113A.

The facing wall 116A of the outer rocker 113A is pushed inward and moves toward the bulkhead 115, due to a load in the vehicle width direction W in an early stage of collision, and as shown in FIG. 26, the convex portion 117A enters and is locked to the opening portion 117B. Specifically, the locking claw 118B advances inward in the vehicle width direction W over the locking piece 119B, and the locking claw 118B is locked to the locking piece 119B, whereby the collision load is transmitted to the bulkhead 115. That is, the outer rocker 113A and the bulkhead 115 reliably mesh into each other, whereby the load is reliably transmitted. For this reason, the convex portion 117A and the opening portion 117B are locked to each other, so that it is possible to suppress the movement such that a lower end of the outer rocker 113A and a lower end of the inner rocker 113B tend to separate from each other.

Also, the load transmitted to the bulkhead 115 is transmitted and efficiently dispersed to the inner rocker 103B and the floor cross member 104. According to such a side part structure 111 of a vehicle body related to the twelfth embodiment, a reaction force at a collision can be increased and a load caused by a side collision can be reliably dispersed to a skeleton member of the vehicle body.

Additionally, since the outer rocker 113A has the facing wall 116A, the bulkhead 115 has the facing wall 116B, and the outer rocker and the bulkhead are adapted to be engageable with each other, it is possible to efficiently perform the load transmission to the floor cross member 104 from the center pillar 102, and it is possible to prevent the cross-sectional collapse of the rocker 113 and the bulkhead 115.

Additionally, since the outer rocker 113A is formed with the convex portion 117A which is engageable with the bulkhead 115, and a desired engagement force is obtained by engagement during assembly, a manufacturing process can also be simplified.

(Thirteenth Embodiment)

Figure 27:
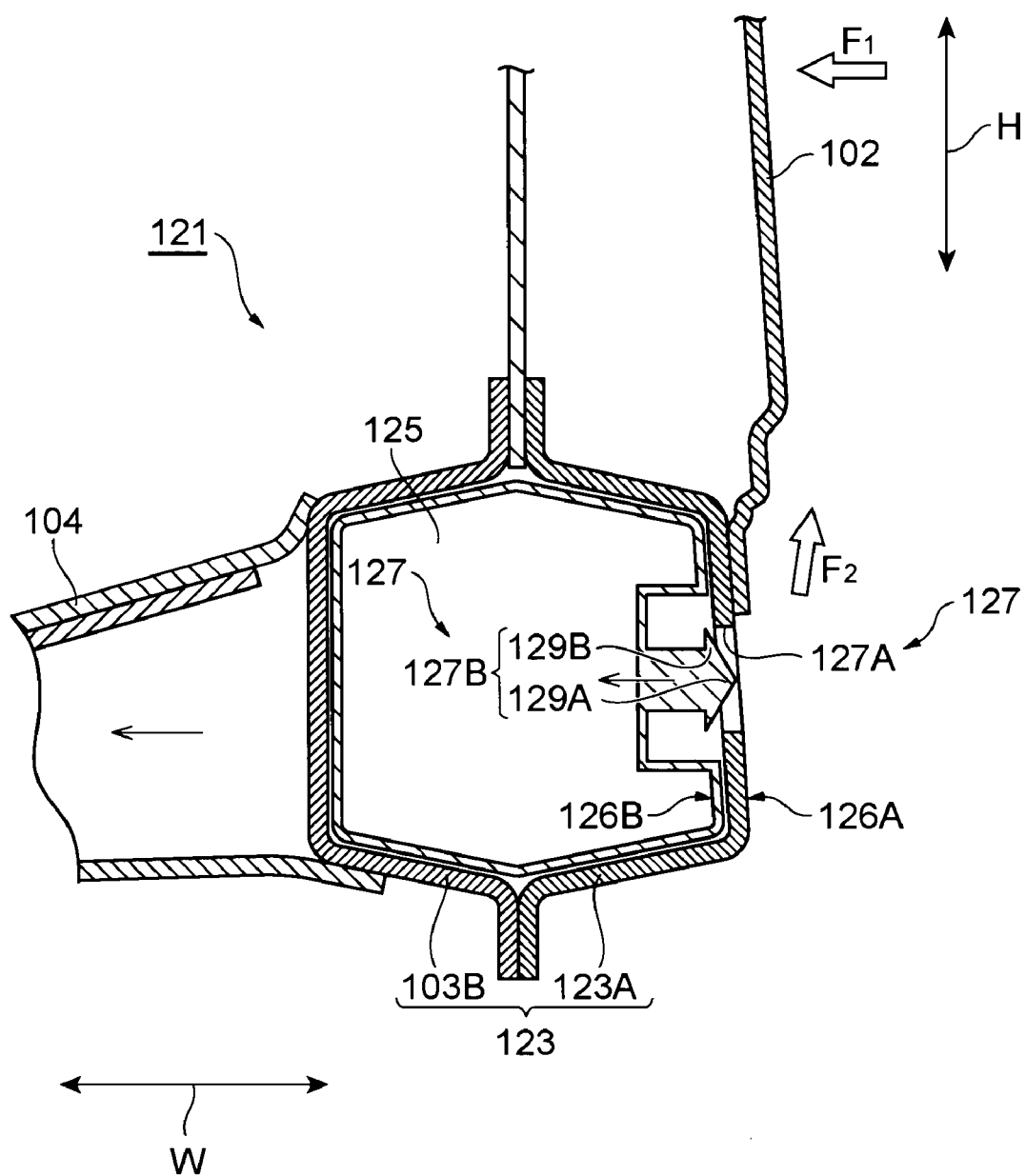
FIG. 27 is a sectional view showing a side part structure of a vehicle body related to a thirteenth embodiment of the invention, and showing a state before locking of proximity portions.

FIG. 27 is a sectional view showing a side part structure of a vehicle body related to a thirteenth embodiment of the invention, and showing a state before locking of proximity portions. The side part structure 121 of the vehicle body of the thirteenth embodiment is different from the side part structure 111 of the vehicle body of the twelfth embodiment in that the shapes of engageable proximity portions are different, specifically, a convex portion is provided on a bulkhead (a load transmission member) as a reinforcing member, and an opening portion is provided in an outer rocker. As shown in FIG.

27, the side part structure 121 of the vehicle body of the thirteenth includes a rocker 123 joined to a lower end of a center pillar 102 which is arranged on both sides in a vehicle width direction W, and extends in a vertical direction H.

The rocker 123 is a hollow member with a substantially O-shaped cross-section which is arranged at a side part of the vehicle body and extends in a anteroposterior direction L of the vehicle body. The rocker 123 has an outer rocker 123A which assumes a U-shaped cross-section and is arranged outside in the vehicle width direction W, and an inner rocker 103B which assumes a substantially U-shaped cross-section and is arranged inside in the vehicle width direction W, and upper or lower ends of the outer rocker 123A and the inner rocker 103B are joined to each other to form a hollow member. Also, the lower end of the center pillar 102 is joined to an outer surface of the outer rocker 123A, and a floor cross member 104 is joined to an outer surface (an inside surface in the vehicle width direction W) of the inner rocker 103B.

The bulkhead 125 which is joined to the inner rocker 103B (the first rocker member) is arranged inside the rocker 123 in the vicinity of a connection position (and/or a connection position between the floor cross member 104 and the inner rocker 103B) between the center pillar 102 and the outer rocker 123A. The outer rocker 123A (the second rocker member) has a facing wall 126A which faces the bulkhead 125 and extends in the vertical direction H, and the bulkhead 125 has a facing wall 126B which faces the outer rocker 123A and extends in the vertical direction H. That is, the facing wall 126A of the outer rocker 123A and the facing wall 126B of the bulkhead 125 face each other.

The facing wall 126B of the bulkhead 125 is formed with a convex portion 127B which protrudes toward the outer rocker 123A, and is engageable with the outer rocker 123A. Additionally, the facing wall 126A of the outer rocker 123A is formed with an opening portion 127A corresponding to the convex portion 127B of the bulkhead 125. The convex portion 127B and the opening portion 127A are formed at the center of the bulkhead 125 in the vertical direction H and are made engageable with each other. Also, the opening portion 127A formed in the outer rocker 123A and the convex portion 127B formed on the bulkhead 125 constitute proximity portions 127 which are engageable with each other.

The convex portion 127B has an arrow-shaped tip portion 129A. The tip portion 129A is formed with a locking claw 129B which protrudes in a direction (vertical direction in the drawing) which intersects the vehicle width direction W.

Next, the dispersing action of a collision load when a vehicle including the side part structure 121 of the vehicle body constructed in this way undergoes a side collision will be described. As shown in FIG. 27, for example, when a load $F_1$ is input to the center pillar 102 due to a side collision, an upward tensile load $F_2$ is input to the outer rocker 123A.

The facing wall 126A of the outer rocker 123A is pushed inward and moves toward the bulkhead 125 due to a load in the vehicle width direction W in an early stage of collision, and as shown in FIG. 27, the convex portion 127B enters and is locked to the opening portion 127A. Specifically, the locking claw 129B advances outward of the peripheral edge of the opening portion 127A, and the locking claw 129B is locked to the peripheral edge of the opening portion 127A, whereby the collision load is transmitted to the bulkhead 125. That is, the outer rocker 123A and the bulkhead 125 reliably mesh into each other, whereby the collision load is reliably transmitted. For this reason, the convex portion 127B and the opening portion 127A are locked to each other, so that it is possible to suppress the movement such that a lower end of the outer rocker 123A and a lower end of the inner rocker 103B tend to separate from each other.

Also, the collision load transmitted to the bulkhead 125 is transmitted and efficiently dispersed to the inner rocker 103B and the floor cross member 104. According to such a side part structure 121 of a vehicle body related to the thirteenth embodiment, a reaction force at a collision can be increased and a load caused by a side collision can be reliably dispersed to a skeleton member of the vehicle body.

Additionally, since the outer rocker 123A has the facing wall 126A, the bulkhead 125 has the facing wall 126B, and the outer rocker and the bulkhead are adapted to be engageable with each other, it is possible to efficiently perform the load transmission to the floor cross member 104 from the center pillar 102, and it is possible to prevent the cross-sectional collapse of the rocker 123 and the bulkhead 125.

Additionally, since the bulkhead 125 is formed with the convex portion 127B which is engageable with the outer rocker 123A, and a desired engagement force is obtained by engagement during assembly, a manufacturing process can also be simplified.

(Fourteenth Embodiment)

Figure 28:
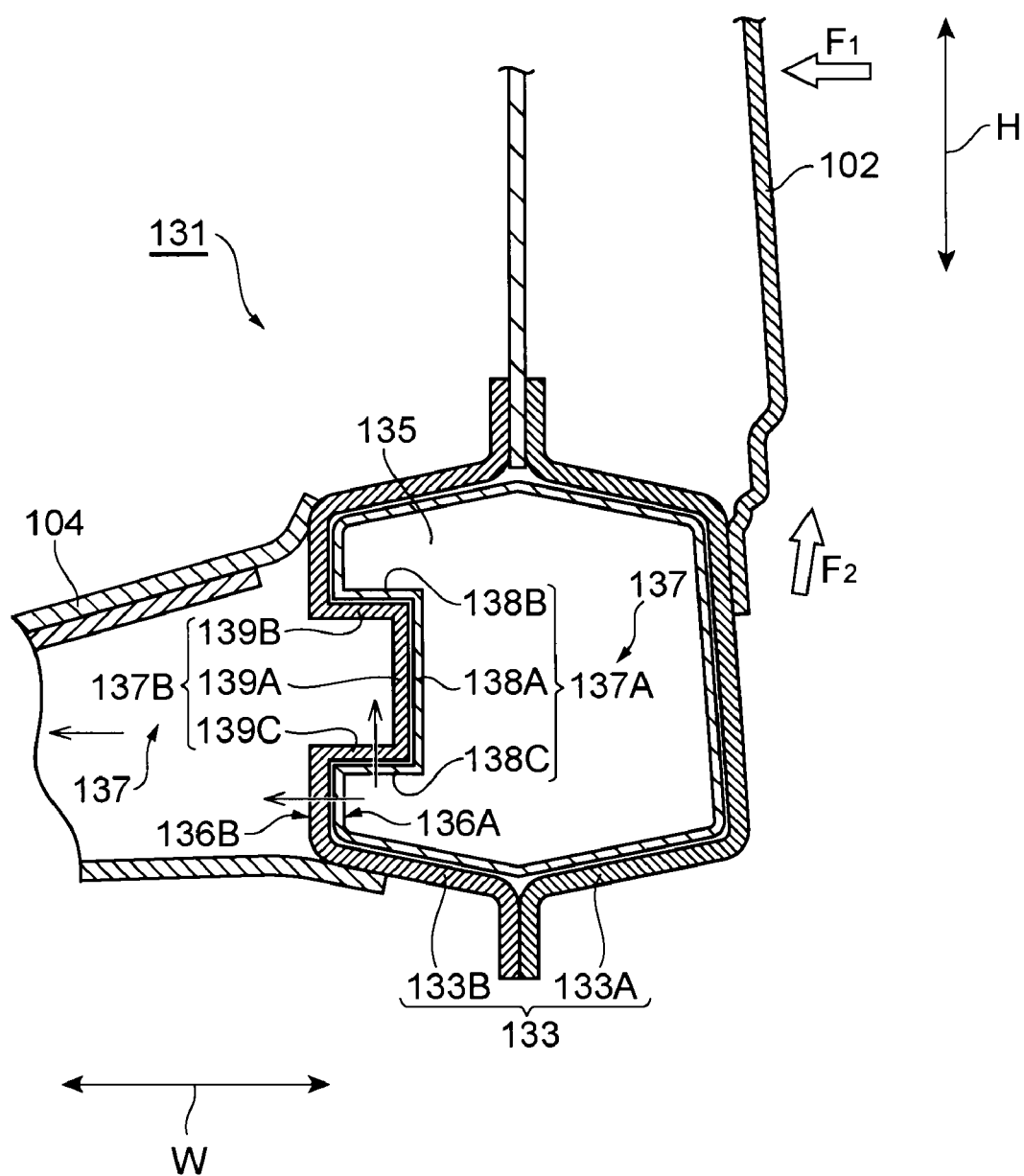
FIG. 28 is a sectional view showing a side part structure of a vehicle body related to a fourteenth embodiment of the invention.

FIG. 28 is a sectional view showing a side part structure of a vehicle body according to a fourteenth embodiment of the invention. The side part structure 131 of the vehicle body of the fourteenth embodiment is different from the side part structure 101 of the vehicle body of the eleventh embodiment in that a bulkhead (a load transmission member) serving as a reinforcing member is joined to an inner rocker, and the shapes of engageable proximity portions are different. As shown in FIG. 28, the side part structure 131 of the vehicle body of the fourteenth includes a rocker 133 joined to a lower end of a center pillar 102 which is arranged on both sides in a vehicle width direction W, and extends in a vertical direction H.

The rocker 133 is a hollow member with a substantially O-shaped cross-section which is arranged at a side part of the vehicle body and extends in a anteroposterior direction L of the vehicle body. The rocker 133 has an outer rocker 133A which assumes a substantially U-shaped cross-section and is arranged outside in the vehicle width direction W, and an inner rocker 133B which assumes a substantially U-shaped cross-section and is arranged inside in the vehicle width direction W, and upper or lower ends of the outer rocker 133A and the inner rocker 133B are joined to each other to form a hollow member. Also, the lower end of the center pillar 102 is joined to an outer surface of the outer rocker 133A, and a floor cross member 104 is joined to an outer surface (an inside surface in the vehicle width direction W) of the inner rocker 133B.

The bulkhead 135 which is joined to the outer rocker 133A (the first rocker member) is arranged inside the rocker 133 in the vicinity of a connection position (and/or a connection position between the floor cross member 104 and the inner rocker 133B) between the center pillar 102 and the outer rocker 133A. The inner rocker 133B (the second rocker member) has a facing wall 136B which faces the bulkhead 135 and extends in the vertical direction H, and the bulkhead 135 has a facing wall 136A which faces the inner rocker 133B and extends in the vertical direction H. That is, the facing wall 136A of the bulkhead 135 and the facing wall 136B of the inner rocker 133B face each other.

The facing wall 136B of the inner rocker 133B is formed with a convex portion 137B which protrudes toward the bulkhead 135 and is engageable with the bulkhead 135. Additionally, the facing wall 136A of the bulkhead 135 is formed with a concave portion 137A which is recessed outward in the vehicle width direction W. The convex portion 137B and the concave portion 137A are formed at the center of the bulkhead 135 in the vertical direction H and are made engageable with each other. Also, the convex portion 137B formed on the inner rocker 133B and the concave portion 137A formed in the bulkhead 135 constitute proximity portions 137 which are engageable with each other. In addition, the convex portion 137B and the concave portion 137A need not be formed at the center of the bulkhead 135 in the vertical direction H but, for example, may be formed below the center of the bulkhead 135.

The convex portion 137B has a vertical wall 139A which extends in the vertical direction H further outside in the vehicle width direction W than the facing wall 136B, an upper wall 139B which is bent inward at an upper end of the vertical wall 139A and extends in the vehicle width direction W, and a lower wall 139C which is bent inward at a lower end of the vertical wall 139A and extends in the vehicle width direction W. Additionally, the end of the upper wall 139B on the inside (left side in the drawing) in the vehicle width direction W is bent upward, and the inside end of the lower wall 139C in the vehicle width direction W is bent downward, and is connected to a portion of the facing wall 136B. In addition, the shape of the convex portion 137B may be cylindrical, for example. In short, any arbitrary shapes which allow the engagement with the bulkhead 135 may be adopted.

The concave portion 137A has a vertical wall 138A which extends in the vertical direction H further outside in the vehicle width direction W than the facing wall 136A, an upper wall 138B which is bent inward at an upper end of the vertical wall 138A and extends in the vehicle width direction W, and a lower wall 138C which is bent inward at a lower end of the vertical wall 138A and extends in the vehicle width direction W. Additionally, the end of the upper wall 138B on the inside (left side in the drawing) in the vehicle width direction W is bent upward, and the inside end of the lower wall 138C in the vehicle width direction W is bent downward, and constitutes a portion of the facing wall 136A.

Next, the dispersing action of a collision load when a vehicle including the side part structure 131 of the vehicle body constructed in this way undergoes a side collision will be described. As shown in FIG. 28, for example, when a load $F_1$ is input to the center pillar 102 due to a side collision, an upward tensile load $F_2$ is input to the outer rocker 133A, and the load input to the outer rocker 133A is transmitted to the bulkhead 135.

When the tensile load $F_2$ is input to the bulkhead 135, the concave portion 137A of the bulkhead 135 is engaged with the convex portion 137B of the inner rocker 133B, and the mutually facing walls 136A and 136B are brought into contact with each other, whereby the collision load is transmitted to the inner rocker 133B. That is, the upper walls 138A and 139A are brought into contact with each other, and the intermediate walls 138C and 139C are brought into contact with each other, whereby the load is reliably transmitted.

Also, the load transmitted to the inner rocker 133B is transmitted and efficiently dispersed to the floor cross member 104. According to such a side part structure 131 of a vehicle body related to the fourteenth embodiment, a reaction force at a collision can be increased and a load caused by a side collision can be reliably dispersed to a skeleton member of the vehicle body.

Additionally, since the bulkhead 135 has the facing wall 136A, the inner rocker 133B has the facing wall 136B, and the outer rocker and the bulkhead are adapted to be engageable with each other, it is possible to efficiently perform the load transmission to the floor cross member 104 from the center pillar 102, and it is possible to prevent the cross-sectional collapse of the rocker 133 and the bulkhead 135.

Additionally, since the inner rocker 133B is formed with the convex portion 137B which is engageable with the bulkhead 135, and a desired engagement force is obtained by engagement during assembly, a manufacturing process can also be simplified.

(Fifteenth Embodiment)

Figure 29:
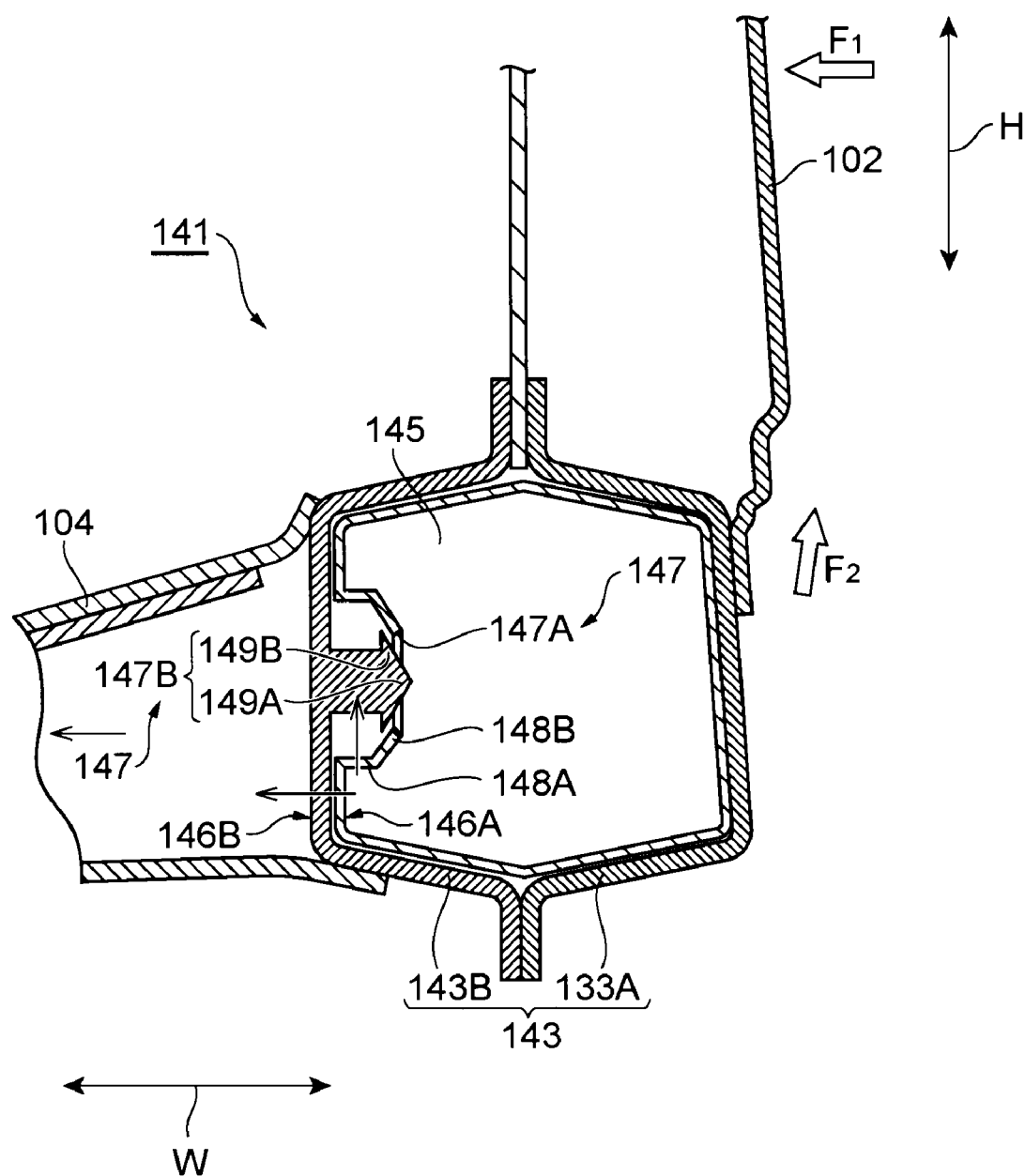
FIG. 29 is a sectional view showing a side part structure of a vehicle body related to a fifteenth embodiment of the invention, and showing a state before locking of proximity portions.
Figure 30:
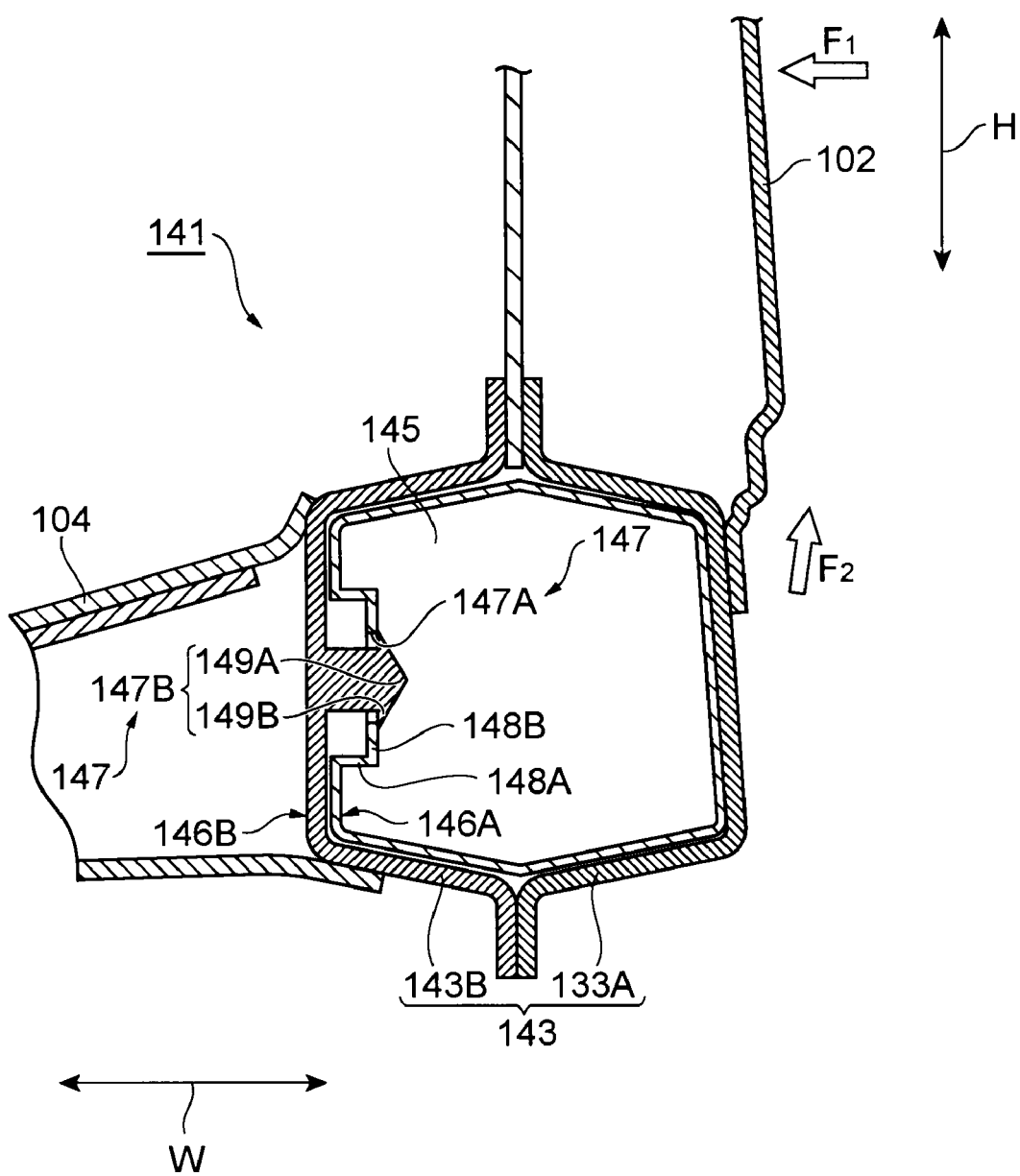
FIG. 30 is a sectional view showing the side part structure of a vehicle body related to the fifteenth embodiment of the invention, and showing a locking state of the proximity portions.

FIG. 29 is a sectional view showing a side part structure of a vehicle body related to a fifteenth embodiment of the invention, and showing a state before locking of proximity portions, and FIG. 30 is a sectional view showing the side part structure of a vehicle body related to the fifteenth embodiment of the invention, and showing a locking state of the proximity portions. The side part structure 141 of the vehicle body of the fifteenth embodiment is different from the side part structure 131 of the vehicle body of the fourteenth embodiment in that the shapes of engageable proximity portions are different. As shown in FIGS. 29 and 30, the side part structure 141 of the vehicle body of the fifteenth embodiment includes a rocker 143 joined to a lower end of a center pillar 102 which is arranged on both sides in a vehicle width direction W, and extends in a vertical direction H.

The rocker 143 is a hollow member with a substantially O-shaped cross-section which is arranged at a side part of the vehicle body and extends in a anteroposterior direction L of the vehicle body. The rocker 143 has an outer rocker 133A which assumes a substantially U-shaped cross-section and is arranged outside in the vehicle width direction W, and an inner rocker 143B which assumes a substantially U-shaped cross-section and is arranged inside in the vehicle width direction W, and upper or lower ends of the outer rocker 133A and the inner rocker 143B are joined to each other to form a hollow member.

Also, the lower end of the center pillar 102 is joined to an outer surface of the outer rocker 133A, and a floor cross member 104 is joined to an outer surface (an inside surface in the vehicle width direction W) of the inner rocker 143B.

A bulkhead 145 (a load transmission member) serving as a reinforcing member which is joined to the outer rocker 133A (the first rocker member) is arranged inside the rocker 143 in the vicinity of a connection position (and/or a connection position between the floor cross member 104 and the inner rocker 143B) between the center pillar 102 and the outer rocker 133A. The inner rocker 143B (the second rocker member) has a facing wall 146B which faces the bulkhead 145 and extends in the vertical direction H, and the bulkhead 145 has a facing wall 146A which faces the inner rocker 143B and extends in the vertical direction H. That is, the facing wall 146A of the bulkhead 145 and the facing wall 146B of the inner rocker 143B face each other.

The facing wall 146B of the inner rocker 143B is formed with a convex portion 147B which protrudes toward the bulkhead 145 and is engageable with the bulkhead 145. Additionally, the facing wall 146A of the bulkhead 145 is formed with an opening portion 147A corresponding to the convex portion 147B of the inner rocker 143B. The convex portion 147B and the opening portion 147A are formed at the center of the bulkhead 145 in the vertical direction H and are made engageable with each other. Also, the opening portion 147A formed in the bulkhead 145 and the convex portion 147B formed on the inner rocker 143B constitute proximity portions 147 which are engageable with each other.

The convex portion 147B has an arrow-shaped tip portion 149A. The tip portion 149A is formed with a locking claw 149B which protrudes in a direction (vertical direction in the drawing) which intersects the vehicle width direction W.

The facing wall 146A is formed with a peripheral edge wall 148A which extends outward in the vehicle width direction W and surrounds the opening portion 147A. A locking piece 148B which has flexibility and locks the locking claw 149B of the convex portion 147B is formed at the outside end of the peripheral edge wall 148A in the vehicle width direction W. The locking piece 148B is formed so as to be bent inward of the opening portion 147A from the peripheral edge wall 148A.

Next, the dispersing action of a collision load when a vehicle including the side part structure 141 of the vehicle body constructed in this way undergoes a side collision will be described. As shown in FIG. 29, for example, when a load $F_1$ is input to the center pillar 102 due to a side collision, an upward tensile load $F_2$ is input to the outer rocker 133A, and the load input to the outer rocker 133A is transmitted to the bulkhead 145.

The facing wall 146A of the bulkhead 145 is pushed inward and moves toward the inner rocker 143B due to a load in the vehicle width direction W in an early stage of collision, and as shown in FIG. 30, the convex portion 147B enters and is locked to the opening portion 147A. Specifically, the locking claw 149B advances inward in the vehicle width direction W over the locking piece 148B, and the locking claw 149B is locked to the locking piece 148B, whereby the collision load is transmitted to the inner rocker 143B. That is, the bulkhead 145 and the inner rocker 143B reliably mesh into each other, whereby the load is reliably transmitted. For this reason, the convex portion 147B and the opening portion 147A are locked to each other, so that it is possible to suppress the movement such that a lower end of the outer rocker 133A and a lower end of the inner rocker 143B tend to separate from each other.

Also, the load transmitted to the inner rocker 143B is transmitted and efficiently dispersed to the floor cross member 104. According to such a side part structure 141 of a vehicle body related to the fifteenth embodiment, a reaction force at a collision can be increased and a load caused by a side collision can be reliably dispersed to a skeleton member of the vehicle body.

Additionally, since the bulkhead 145 has the facing wall 146A, the inner rocker 143B has the facing wall 146B, and the outer rocker and the bulkhead are adapted to be engageable with each other, it is possible to efficiently perform the load transmission to the floor cross member 104 from the center pillar 102, and it is possible to prevent the cross-sectional collapse of the rocker 143 and the bulkhead 145.

Additionally, since the inner rocker 143B is formed with the convex portion 147B which is engageable with the bulkhead 145, and a desired engagement force is obtained by engagement during assembly, a manufacturing process can also be simplified.

(Sixteenth Embodiment)

Figure 31:
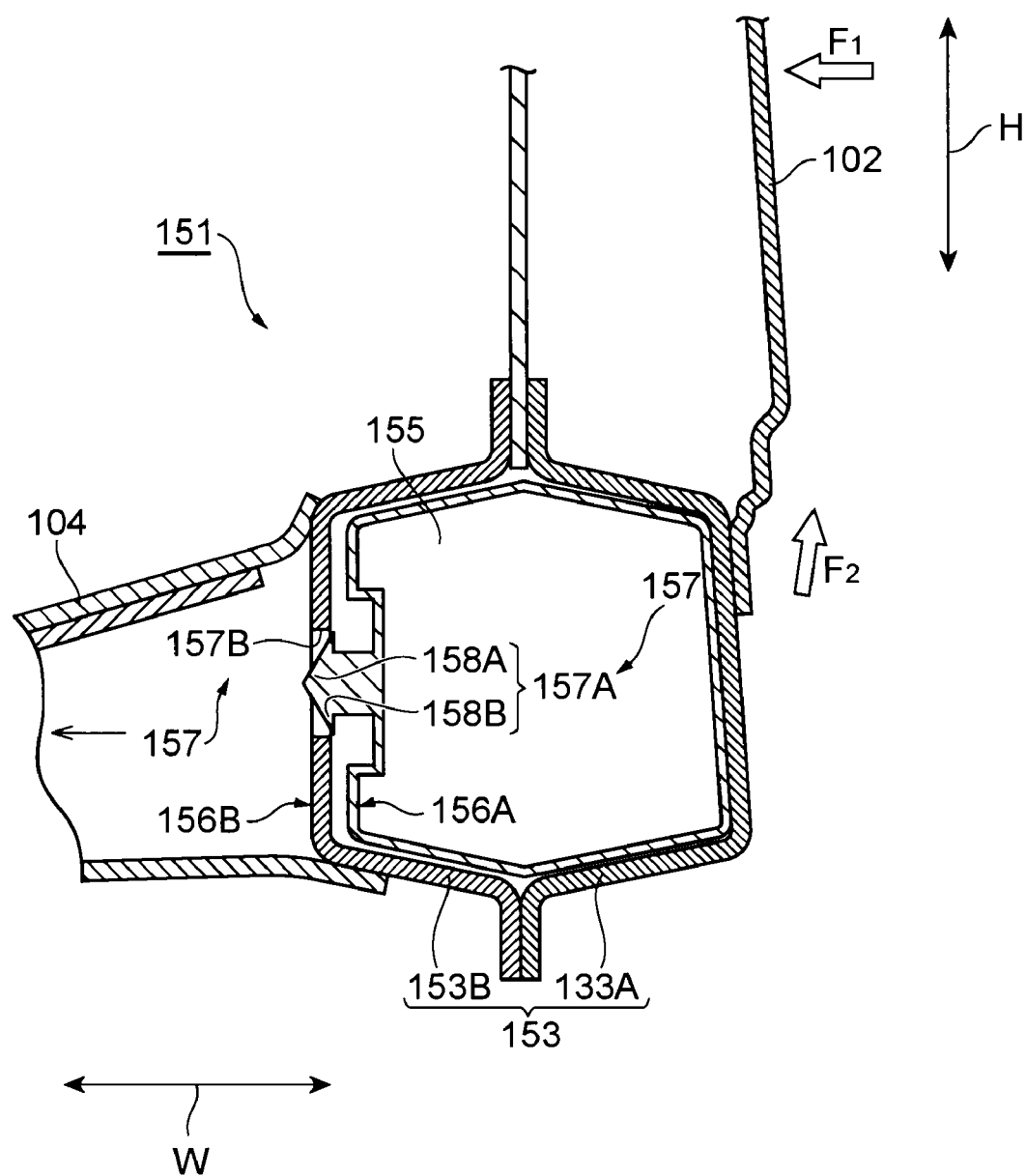
FIG. 31 is a sectional view showing a side part structure of a vehicle body related to a sixteenth embodiment of the invention, and showing a state before locking of proximity portions.
Figure 32:
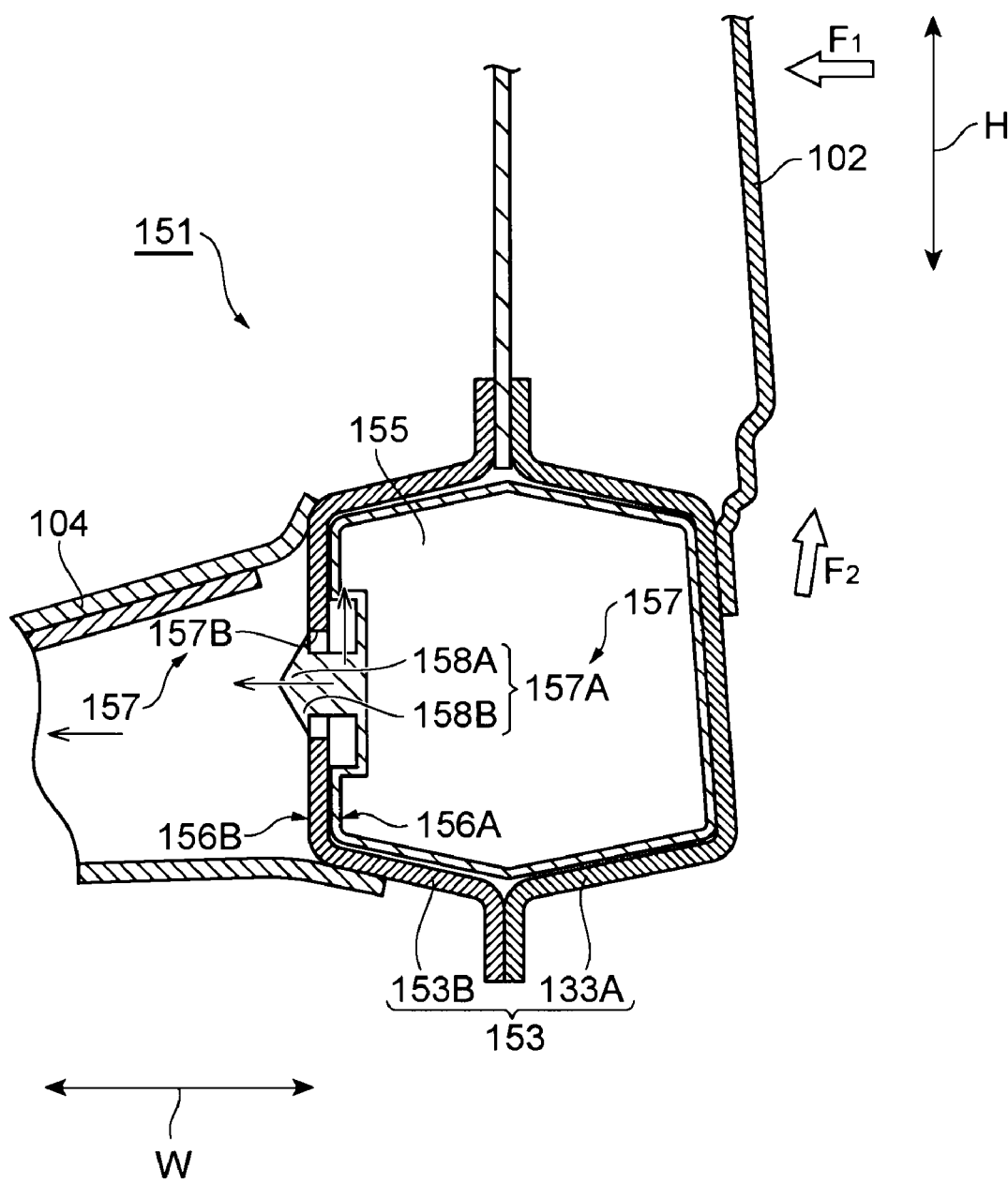
FIG. 32 is a sectional view showing the side part structure of a vehicle body related to the sixteenth embodiment of the invention, and showing a locking state of the proximity portions.

FIG. 31 is a sectional view showing a side part structure of a vehicle body related to a sixteenth embodiment of the invention, and showing a state before locking of proximity portions, and FIG. 32 is a sectional view showing the side part structure of a vehicle body related to the sixteenth embodiment of the invention, and showing a locking state of the proximity portions. The side part structure 151 of the vehicle body of the sixteenth embodiment is different from the side part structure 141 of the vehicle body of the fifteenth embodiment in that the shapes of engageable proximity portions are different. As shown in FIGS. 31 and 32, the side part structure 151 of the vehicle body of the sixteenth embodiment includes a rocker 153 joined to a lower end of a center pillar 102 which is arranged on both sides in a vehicle width direction W, and extends in a vertical direction H.

The rocker 153 is a hollow member with a substantially O-shaped cross-section which is arranged at a side part of the vehicle body and extends in a anteroposterior direction L of the vehicle body. The rocker 153 has an outer rocker 133A which assumes a substantially U-shaped cross-section and is arranged outside in the vehicle width direction W, and an inner rocker 153B which assumes a substantially U-shaped cross-section and is arranged inside in the vehicle width direction W, and upper or lower ends of the outer rocker 133A and the inner rocker 153B are joined to each other to form a hollow member. Also, the lower end of the center pillar 102 is joined to an outer surface of the outer rocker 133A, and a floor cross member 104 is joined to an outer surface (an inside surface in the vehicle width direction W) of the inner rocker 153B.

A bulkhead 155 (a load transmission member) serving as a reinforcing member which is joined to the outer rocker 133A (the first rocker member) is arranged inside the rocker 153 in the vicinity of a connection position (and/or a connection position between the floor cross member 104 and the inner rocker 153B) between the center pillar 102 and the outer rocker 133A. The inner rocker 153B (the second rocker member) has a facing wall 156B which faces the bulkhead 155 and extends in the vertical direction H, and the bulkhead 155 has a facing wall 156A which faces the inner rocker 153B and extends in the vertical direction H. That is, the facing wall 156A of the bulkhead 155 and the facing wall 156B of the inner rocker 153B face each other.

The facing wall 156A of the bulkhead 155 is formed with a convex portion 157A which protrudes toward the inner rocker 153B and is engageable with the inner rocker 153B. Additionally, the facing wall 156B of the inner rocker 153B is formed with an opening portion 157B corresponding to the convex portion 157A of the bulkhead 155. The convex portion 157A and the opening portion 157B are formed at the center of the bulkhead 155 in the vertical direction H and are made engageable with each other. Also, the convex portion 157A formed on the bulkhead 155 and the opening portion 157B formed in the inner rocker 153B constitute proximity portions 157 which are engageable with each other.

The convex portion 157A has an arrow-shaped tip portion 158A. The tip portion 158A is formed with a locking claw 158B which protrudes in a direction (vertical direction in the drawing) which intersects the vehicle width direction W.

Next, the dispersing action of a collision load when a vehicle including the side part structure 151 of the vehicle body constructed in this way undergoes a side collision will be described. As shown in FIG. 31, for example, when a load $F_1$ is input to the center pillar 102 due to a side collision, an upward tensile load $F_2$ is input to the outer rocker 133A, and the load input to the outer rocker 133A is transmitted to the bulkhead 155.

The facing wall 156A of the bulkhead 155 is pushed inward and moves toward the inner rocker 153B due to a load in the vehicle width direction W in an early stage of collision, and as shown in FIG. 32, the convex portion 157A enters and is locked to the opening portion 157B. Specifically, the locking claw 158B advances inward of the peripheral edge of the opening portion 157B, and the locking claw 158B is locked to the peripheral edge of the opening portion 157B, whereby the collision load is transmitted to the inner rocker 153B. That is, the bulkhead 155 and the inner rocker 153B reliably mesh into each other, whereby the load is reliably transmitted. Additionally, the convex portion 157A and the opening portion 157B are locked to each other, so that it is possible to suppress the movement such that a lower end of the outer rocker 133A and a lower end of the inner rocker 153B tend to separate from each other.

Also, the load transmitted to the inner rocker 153B is transmitted and efficiently dispersed to the floor cross member 104. According to such a side part structure 151 of a vehicle body related to the sixteenth embodiment, a reaction force at a collision can be increased and a load caused by a side collision can be reliably dispersed to a skeleton member of the vehicle body.

Additionally, since the bulkhead 155 has the facing wall 156A, the inner rocker 153B has the facing wall 156B, and the outer rocker and the bulkhead are adapted to be engageable with each other, it is possible to efficiently perform the load transmission to the floor cross member 104 from the center pillar 102, and it is possible to prevent the cross-sectional collapse of the rocker 153 and the bulkhead 155.

Additionally, since the bulkhead 155 is formed with the convex portion 157A which is engageable with the inner rocker 153B, and a desired engagement force is obtained by engagement during assembly, a manufacturing process can also be simplified.

(Seventeenth Embodiment)

Figure 33:
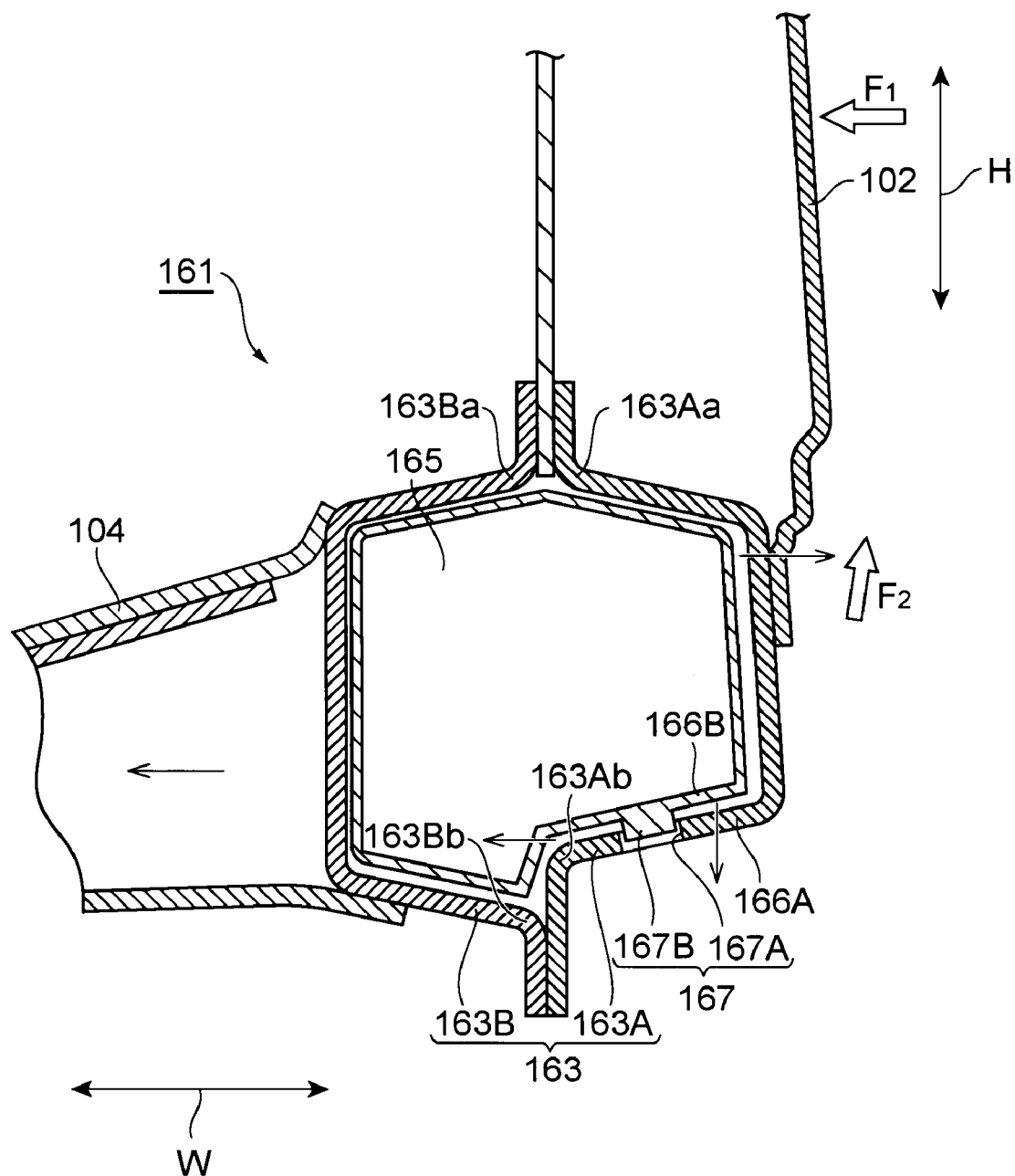
FIG. 33 is a sectional view showing a side part structure of a vehicle body related to a seventeenth embodiment of the invention.

FIG. 33 is a sectional view showing a side part structure of a vehicle body according to a seventeenth embodiment of the invention. The side part structure 161 of the vehicle body of the seventeenth embodiment is different from the side part structure 101 of the vehicle body of the eleventh embodiment in that the shapes of engageable proximity portions are different. As shown in FIG. 33, the side part structure 161 of the vehicle body of the seventeenth includes a rocker 163 joined to a lower end of a center pillar 102 which is arranged on both sides in a vehicle width direction W, and extends in a vertical direction H.

The rocker 163 is a hollow member which is arranged at a side part of the vehicle body and extends in a anteroposterior direction L of the vehicle body. The rocker 163 has an outer rocker 163A which assumes a substantially U-shaped cross-section and is arranged outside in the vehicle width direction W, and an inner rocker 163B which assumes a substantially U-shaped cross-section and is arranged inside in the vehicle width direction W, and upper or lower ends of the outer rocker 163A and the inner rocker 163B are joined to each other to form a hollow member. Also, the lower end of the center pillar 102 is joined to an outer surface of the outer rocker 163A, and a floor cross member 104 is joined to an outer surface (an inside surface in the vehicle width direction W) of the inner rocker 163B.

Additionally, the distance between open ends 163Aa and 163Ab of the outer rocker 163A is made shorter than the distance between open ends 163Ba and 163Bb of the inner rocker 163B. Additionally, in the vertical direction H, the position of the upper open end 163Aa of the outer rocker 163A and the position of the upper open end 163Ba of the inner rocker 163B are almost the same. Also, the position of the lower open end 163Ab of the outer rocker 163A is arranged higher than the position of the lower open end 163Bb of the inner rocker 163B.

A bulkhead 165 (a load transmission member) serving as a reinforcing member which is joined to the inner rocker 163B (the first rocker member) is arranged inside the rocker 163 in the vicinity of a connection position (and/or a connection position between the floor cross member 104 and the inner rocker 163B) between the center pillar 102 and the outer rocker 163A. The outer rocker 163A (the second rocker member) has a facing wall 166A which faces the bulkhead 165 and inclines with respect to the vertical direction H, and the bulkhead 165 has a facing wall 166B which faces the outer rocker 163A and inclines with respect to the vertical direction H. The facing walls 166A and 166B are inclined and face each other so that the lower side thereof is located further inside in the vehicle width direction W than the upper side thereof.

The facing wall 166B of the bulkhead 165 is formed with a convex portion 167B which protrudes obliquely downward toward the outer rocker 163A, and is engageable with the outer rocker 163A. Additionally, the facing wall 166A of the outer rocker 163A is formed with an opening portion 167A corresponding to the convex portion 167B. The convex portion 167B and the opening portion 167A are formed at the center of the bulkhead 165 in the vertical direction H and are made engageable with each other. Also, the opening portion 167A formed in the outer rocker 163A and the convex portion 167B formed on the bulkhead 165 constitute proximity portions 167 which are engageable with each other.

Next, the dispersing action of a collision load when a vehicle including the side part structure 161 of the vehicle body constructed in this way undergoes a side collision will be described. As shown in FIG. 33, for example, when a load $F_1$ is input to the center pillar 102 due to a side collision, an upward tensile load $F_2$ is input to the outer rocker 163A.

When the tensile load $F_2$ is input to the outer rocker 163A, the convex portion 167B of the bulkhead 165 is locked to the opening portion 167A of the outer rocker 163A, and the mutually facing walls 166A and 166B are brought into contact with each other, whereby the collision load is transmitted to the bulkhead 165. In this way, the convex portion 167B and the opening portion 167A are locked to each other, so that it is possible to suppress the movement such that a lower end of the outer rocker 3A and a lower end of the inner rocker 3B tend to separate from each other.

Also, the load transmitted to the bulkhead 165 is transmitted and efficiently dispersed to the inner rocker 163B and the floor cross member 104. According to such a side part structure 161 of a vehicle body related to the seventeenth embodiment, a reaction force at a collision can be increased and a load caused by a side collision can be reliably dispersed to a skeleton member of the vehicle body.

Additionally, since the outer rocker 163A has the facing wall 166A, the bulkhead 165 has the facing wall 166B, and the outer rocker and the bulkhead are adapted to be engageable with each other, it is possible to efficiently perform the load transmission to the floor cross member 104 from the center pillar 102, and it is possible to prevent the cross-sectional collapse of the rocker 163 and the bulkhead 165.

Additionally, since the bulkhead 165 is formed with the convex portion 167B which is engageable with the outer rocker 163A, and a desired engagement force is obtained by engagement during assembly, a manufacturing process can also be simplified.

Although the invention has been specifically described on the basis of its preferred embodiments, the invention is not limited to the above embodiments. For example, any proximity portions may be adopted so long as the proximity portions are engageable with each other, and the proximity portions may be in an engaged state or in a disengaged state, with a bulkhead attached to a vehicle body. Additionally, the joining of the bulkhead (including the inner bulkhead and the outer bulkhead) and the rocker (including the outer rocker and the inner rocker), and a joining method of the outer rocker and the inner rocker are not particularly limited so long as the bulkhead and the rocker are fixed by joining. For example, the joining and joining method may be performed by welding, may be performed by deposition, or may be performed by causing a shaft member to pass through the bulkhead or a rocker and fixing thereto.

Additionally, the rocker is not limited to, for example, the structure where the outer rocker 3A and the inner rocker 3B are joined as shown in FIG. 2. For example, the rocker may be a tubular integral structure. In FIG. 2, in a case where the tubular integral structure is used as the rocker 3, the outer bulkhead 5A is joined to the outside of the inner surface of the tubular rocker in the vehicle width direction W, and the inner bulkhead 5B is joined to the inside in the vehicle width direction W.

Industrial Applicability

According to the side part structure of a vehicle body of the invention, since the proximity portions which are engageable with each other are formed in the facing walls of the first load transmission member and the second load transmission member or in the facing walls of the load transmission member and the second rocker member, a collision load at a side collision is reliably transmitted to the inner rocker from the outer rocker via the proximity portions formed in the mutually facing walls. As a result, a collision load from the side of the vehicle can be reliably dispersed.

The invention claimed is:

1. A side part structure of a vehicle body comprising:
   a rocker that is a hollow member having an outer rocker and an inner rocker which are arranged at a side part of a vehicle body and extend in the anteroposterior direction of the vehicle body;
   a first load transmission member joined to the outer rocker, the first load transmission member being ring-shaped and including a first facing wall extending in a vertical direction, a first opposite wall extending in the vertical direction and opposite the first facing wall, a first upper connecting wall which connects an upper end of the first facing wall and an upper end of the first opposite wall, and a first lower connecting wall which connects a lower end of the first facing wall and a lower end of the first opposite wall so as to present a hollow interior; and
   a second load transmission member joined to the inner rocker, the second load transmission member being ring-shaped and including a second facing wall extending in the vertical direction and facing the first facing wall, a second opposite wall extending in the vertical direction and opposite the second facing wall, a second upper connecting wall which connects an upper end of the second facing wall and an upper end of the second opposite wall, and a second lower connecting wall which connects a lower end of the second facing wall and a lower end of the second opposite wall so as to present a hollow interior,
   wherein the first facing wall is formed with a convex portion which protrudes towards the second load transmission member and the second facing wall is formed with a concave portion which is recessed inward in a vehicle width direction,
   wherein the convex portion includes a first vertical wall which extends in the vertical direction and is further inside in the vehicle width direction than a center of the rocker, a first upper wall which is bent at an upper end of the first vertical wall, and a first lower wall which is bent at a lower end of the first vertical wall,
   wherein the concave portion includes a second vertical wall which extends in the vertical direction and is further inside in the vehicle width direction than the first vertical wall, a second upper wall which is bent at an upper end of the second vertical wall, and a second lower wall which is bent at a lower end of the second vertical wall, and
   wherein the convex portion and the concave portion are engageable with each other.

2. The side part structure of a vehicle body according to claim 1,
   wherein the first load transmission member is fixed to an inner surface of the outer rocker, and
   the second load transmission member is fixed to an inner surface of the inner rocker.

3. The side part structure of a vehicle body according to claim 1,
   wherein the convex portion is formed at a center of the first load transmission member in the vertical direction and the concave portion is formed at a center of the second load transmission member in the vertical direction.

4. The side part structure of a vehicle body according to claim 1,
   wherein the first and second upper walls and the first and second lower walls extend in the vehicle width direction.

5. The side part structure of a vehicle body according to claim 1,
   wherein a center pillar is joined to an outer surface of the outer rocker and a floor cross member is joined to an outer surface of the inner rocker.

* * * * *

UNITED STATES PATENT AND TRADEMARK OFFICE
CERTIFICATE OF CORRECTION

PATENT NO. : 8,308,227 B2
APPLICATION NO. : 12/678759
DATED : November 13, 2012
INVENTOR(S) : Takayuki Tsuruta et al.

Page 1 of 1

It is certified that error appears in the above-identified patent and that said Letters Patent is hereby corrected as shown below:

On the title page, Item (73), the Assignee's name is incorrect. Item (73), should read:

--(73) Assignee: Toyota Jidosha Kabushiki Kaisha,
Toyota-shi (JP)--

Signed and Sealed this
Fifth Day of February, 2013

Teresa Stanek Rea
*Acting Director of the United States Patent and Trademark Office*